US009911143B2

(12) United States Patent
Dereszynski et al.

(10) Patent No.: US 9,911,143 B2
(45) Date of Patent: Mar. 6, 2018

(54) METHODS AND SYSTEMS THAT CATEGORIZE AND SUMMARIZE INSTRUMENTATION-GENERATED EVENTS

(71) Applicant: ORACLE AMERICA, INC., Redwood Shores, CA (US)

(72) Inventors: Ethan Dereszynski, Oregon City, OR (US); Vladimir Brayman, Mercer Island, WA (US); Weng-Keen Wong, Corvallis, OR (US); Travis Walker Moore, Albany, OR (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 322 days.

(21) Appl. No.: 14/585,063

(22) Filed: Dec. 29, 2014

(65) Prior Publication Data

US 2015/0254328 A1 Sep. 10, 2015

(51) Int. Cl.

*G06Q 30/02* (2012.01)
*G06F 17/30* (2006.01)
*G06F 17/27* (2006.01)

(52) U.S. Cl.

CPC ..... *G06Q 30/0277* (2013.01); *G06F 17/2785* (2013.01); *G06F 17/3053* (2013.01); *G06F 17/30598* (2013.01); *G06F 17/30616* (2013.01); *G06F 17/30643* (2013.01); *G06F 17/30864* (2013.01); *G06F 17/30973* (2013.01)

(58) Field of Classification Search

CPC ............. G06F 17/2785; G06F 17/3053; G06F 17/30598; G06F 17/30616; G06F 17/30643; G06F 17/30864; G06F 17/30973; G06Q 30/0277

USPC ....... 707/739, 706, 708, 722, 723, 737, 748, 707/767, 770, E17.014, E17.089, 707/E17.119, 999.006

See application file for complete search history.

(56) References Cited

U.S. PATENT DOCUMENTS

| | | | | |
|---|---|---|---|---|
| 8,296,427 | B2 | 10/2012 | Hauser | |
| 8,327,385 | B2 | 12/2012 | Hauser | |
| 8,751,628 | B2 | 6/2014 | Hauser | |
| 8,832,257 | B2 | 9/2014 | Hauser | |
| 8,838,786 | B2 | 9/2014 | Hauser | |
| 9,285,869 | B2 | 3/2016 | Hauser | |
| 9,286,391 | B1 * | 3/2016 | Dykstra | G06F 17/30864 |

(Continued)

OTHER PUBLICATIONS

Blei et al, "Latent Dricichlet Allocation", Journal of Machine Learning Research, Published Jan. 2003, pp. 993-1022.*

(Continued)

*Primary Examiner* — Alex Gofman
*Assistant Examiner* — Kamal Dewan
(74) *Attorney, Agent, or Firm* — Kilpatrick Townsend & Stockton LLP

(57) ABSTRACT

The current document is directed to methods and systems that receive instrumentation-generated events and that employ statistical inference to discover event topics and to assign a topic or category to each of a number of events. In a described implementation, the events comprise key/value pairs. A seeded local/global-topic latent Dirichlet allocation methods is used to discover topics and assign topics to a set of events. The topic-assigned events are then processed to generate topic signatures, using which the methods and systems assign topics to subsequently received messages.

20 Claims, 68 Drawing Sheets

(56) References Cited

U.S. PATENT DOCUMENTS

| | | | | |
|---|---|---|---|---|
| 9,330,395 | B2 | 5/2016 | Hauser | |
| 9,336,191 | B2 | 5/2016 | Hauser | |
| 9,442,621 | B2 | 9/2016 | Hauser | |
| 9,489,468 | B2 | 11/2016 | Hauser | |
| 9,507,870 | B2 | 11/2016 | Hauser | |
| 9,524,284 | B2 | 12/2016 | Hauser | |
| 2003/0065520 | A1 | 4/2003 | Jutzi et al. | |
| 2003/0083951 | A1 | 5/2003 | Connelly | |
| 2010/0287228 | A1 | 11/2010 | Hauser | |
| 2010/0287229 | A1 | 11/2010 | Hauser | |
| 2010/0287566 | A1 | 11/2010 | Hauser | |
| 2011/0078167 | A1* | 3/2011 | Sundaresan | G06F 17/2785 707/765 |
| 2011/0202555 | A1* | 8/2011 | Cordover | G06Q 10/107 707/769 |
| 2012/0047256 | A1 | 2/2012 | Hauser | |
| 2012/0047257 | A1 | 2/2012 | Hauser | |
| 2012/0265824 | A1* | 10/2012 | Lawbaugh | G06F 11/3089 709/206 |
| 2013/0212106 | A1* | 8/2013 | Inagaki | G06F 17/3071 707/737 |
| 2013/0346625 | A1* | 12/2013 | Lam | G06F 9/542 709/231 |
| 2014/0074764 | A1* | 3/2014 | Duftler | G06N 5/025 706/47 |
| 2014/0129510 | A1* | 5/2014 | Vladislav | G06F 17/30011 706/52 |
| 2015/0066904 | A1* | 3/2015 | Asur | G06F 17/301 707/722 |

OTHER PUBLICATIONS

U.S. Appl. No. 14/667,651, Non-Final Office Action dated Jun. 29, 2017, 8 pages.

* cited by examiner

```
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8"  />
<title>Demo Web Site Confirmation | Widemile Optimization Platform</title>
<style type="text/css">
Body  {  margin:  0; padding:  0; background:  #b3b3b3; text-align:center;  }  img{  border:none;  }
#container{ background: #fff url (images/demo_site_bg.jpg) no-repeat 0 0; margin:36px auto;/*center*/height:660px; width:952px;  }
#header{  padding:24px 24px 0 24px;  }
#left{  float:left; width:369px; margin:36px 0px 0px 24px;  }  *  > #left  {margin:36px 0px 48px;  }/*reset ie6 double margin bug*/
#right{ float:right; width:459px; margin:36px 24px 0px 0px;  }  *  > #right {margin:36px 48px 0px 0px;  }/*reset ie6 double margin
bug*/
#button{ margin:36px 0px;  }
</style>
<!--insert: Widemile Optimization Platform Client Library - ->
<script type="text/javascript" scr="http://www.widemile.com/js/wm_capi.js"></script>
</head>
<body>
<!- - insert: Widemile conversion Tracking Code - ->
<script type="text/javascript"> WM.setup();</script>
<div id="main_ext">
        <div id="container">

        <div id="header">
        <div id="headliner">
                <img src="images/demo_site_confirmation_hd.jpg" alt="Confirmation" />
                        </div>
      </div>

      <div id="left">
        <div id="hero">
                <img src="images/demo_site_confimration_hs.jpg" alt="" />
                        </div>
      </div>

      <div id="right">
        <div id="offer">
                <img src="images/demo_site_confirmation_offer.jpg" alt="Thank You" / >
                        </div>
           <div id="button">
              <a href="index.htm">
                <img src="images/demo_site_confirmation_btn.jpg" alt="Home Button"  />
                           </a>
                        </div>
   </div>
  </div>
</div>
</body>
</html>
```

```
<!DOCTYPE html PUBLIC "-//W3C//DTD XHTML 1.0 transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site: Landing Page walkthrough | Widemile Optimization Platform</title>
<style type="text/css">
body { margin: 0; padding: 0; background: #b3b3b3; text-align:center; } img{ border:none; }
#container{ background: #fff url(images/demo_site_bg.jpg) no-repeat 0 0; margin:36px auto;/*center*/ height:660px; width:952px; }
#header{ padding:24px 24px 0 24px; }
#left{ float:left; width:369px; margin:36px 0px 24px; } * > #left { margin:36px 0px 0px 48px; }/*reset ie6 double margin bug*/
#right{ float:right; width:459px; margin:36px 24px 0px 0px; } * > #right { margin:36px 48px 0px 0px; }/*reset ie6 double margin bug*/
#wm_offer{ margin:36px 0px; }
</style>
<!-- insert: Widemile Optimization Platform Client Library - ->
<script type=:"text/javascript" src="http://www.widemile.com/js/wm_capi.js"></script>   ~1302
</head>
<body>
<!-- insert: Widemile PageView Tracking Code - ->
<script type="text/javascript">WM.setup();</script>   ~1304
<div id="main_ext">
                <div id="container">

                <div id="header">
                <div id="wm_headline">
                                <img src="images/demo_site_hd_green.jpg" alt="Green Headline 1" />
                        </div>
        </div>

        <div id="left">
                <div id="wm_hero">
                                <img src="images/demo_site_hs_green.jpg" alt="Green Hero 1" />
                        </div>
        </div>

        <div id="right">
                <div id="wm_offer">
                                <img src="images/demo_site_offer_green.jpg" alt="Green Offer 1" />
                        </div>

                                <a href="conversion.htm"><div id="wm_button">
                                        <span id="wm_INSERT_BUTTON">
                                                <img src="images/demo_site_btn_green.jpg" alt="Green Button 1" />
                                        </span>
                                </div></a>
        </div>
      <div>
>/div>
</body>
</html>
```

FIG. 13

```
{
    "meta" :                                    /─ 1612
    {
        "schema_version" : "2.0",
        "api_version" : "2.0",
        "message_type" : "event",
        "stream_type" : "content"
    },
    "data" :
    {
        "k1" : "xxxxxx",        ─── 1618
        "k2" : "xxxxxx",        ─── 1620
        "wt" :
        {                /─ 1630         /─ 1631
            "k3" : [ "xxxxxx", "xxxxxx"],          ─── 1628
            "k4" : "xxxxxx",            ─── 1626
            "k5" : [ "xxxxx ", "xxxxxx", "xxxxxx"],
            "k6" : [ "xxxxxx"]
        }
    }
}
```

1614 — "data" :
1616 — {
1622 — "wt" :
1624 — {
1625 — }
1617 — }

```
"meta" :                                    1640
{
    "schema_version" : "2.0",
    "api_version" : "2.0",
    "message_type" : "event",
    "stream_type" : "content"
},
"data" :
{
    "k1" : "xxxxxx",                        1642
    "k2" : "xxxxxx",
    "wt" : "xxxxxx",
    {
       "k3" : [ "xxxxxx" ],
       "k4" : "xxxxxx",
       "k5" : [ "xxxxxx", "xxxxxx", "xxxxxx" ],
    }
},
"ext" :
{                                           1644
    "geo" :
     {
          "k20" : "xxxxxx",
1646      "k21" : "xxxxxx",
    },           :
     "device" :
     {
          "k30" : " xxxxxx",
1648      "k31" : " xxxxxx",
     },          :
     "browser" :
     {
          "k40" : "xxxxxx",
1650      "k41" : "xxxxxx",
     }
  }              :
}
```

FIG. 16C

```
{
   "meta" :                                    1660
   {
        "schema_version" : "2.0",
        "api_version" : "2.0",
        "message_type" : "xxxxxx",
        "stream_type" : "xxxxxx"
   },
   "session_id" : "1353515717173",
   "visitor_id" : "216.64.169.240-4057458896.30216649",     } 1662
   "session_closed" : false,
   "session_summary" :
   {
        "events" :
1664    {
           "k1" :  "xxxxxx",
           "k2" :  "xxxxxx"
        },
        "k10" :
        {
           "k11" : "xxxxxx",
           "k12" : "xxxxxx"
        },
        "k20"
        {
           "k21" : "xxxxxx"
        }                             1666
   },
   "events" : [
        {
```

FIG. 16D-1

```
"k30" : "xxxxxx",
          "k31" : ["xxxxxx", "xxxxxx", "xxxxxx"],
          "data" :
          {
            "k32" : ["xxxxxx", "xxxxxx", "xxxxxx"],
            "wt" :
            {
                "k33" : ["xxxxxx", "xxxxxx", "xxxxxx"],
                "k34" : ["xxxxxx", "xxxxxx", "xxxxxx"],
            }
          },
          "ext" :
          {
            "geo"
            {
                "k35" : ["xxxxxx", "xxxxxx", "xxxxxx"],
                "k36" : ["xxxxxx", "xxxxxx", "xxxxxx"]
            },
            "source" :
            {
                "k38" : ["xxxxxx", "xxxxxx", "xxxxxx"],
                "k39" : ["xxxxxx", "xxxxxx", "xxxxxx"]
            },
            "device":
            {
                "k41" : "xxxxxx", "xxxxxx", "xxxxxx"],
                "k42" : ["xxxxxx", "xxxxxx", "xxxxxx"]
            },
            "browser":
            {
                "k44" : ["xxxxxx", "xxxxxx", "xxxxxx"],
                "k45" : ["xxxxxx", "xxxxxx", "xxxxxx"]
            }
          }
     },
     {
```

FIG. 16D-2

```
"k50" : "xxxxxx",
        "k51" : ["xxxxxx", "xxxxxx", "xxxxxx"],
        "data" :
        {
            "k52" : ["xxxxxx", "xxxxxx", "xxxxxx"],
           "wt" :
           {
                "k53" : ["xxxxxx", "xxxxxx", "xxxxxx"],
                "k54" : ["xxxxxx", "xxxxxx", "xxxxxx"]
           }
        },
        "ext" :
        {
           "geo"
           {
                "k55" : ["xxxxxx", "xxxxxx", "xxxxxx"],
                "k56" : ["xxxxxx", "xxxxxx", "xxxxxx"]
           },
           "source" :
           {
                "k58" : ["xxxxxx", "xxxxxx", "xxxxxx"],
                "k59" : ["xxxxxx", "xxxxxx", "xxxxxx"]
           },
           "device":
           {
                "k61" : "xxxxxx", "xxxxxx", "xxxxxx"],
                "k62" : ["xxxxxx", "xxxxxx", "xxxxxx"]
           }
           "browser":
           {
                "k64" : ["xxxxxx", "xxxxxx", "xxxxxx"],
                "k65" : ["xxxxxx", "xxxxxx", "xxxxxx"]
           }
        }
   }
 ]
}
```

FIG. 16D-3

```
function WebTrends() { var that = this; this.dcsid =
"dcscyjdor000004fu02p6j55k_7z2q"; this.domain = "statse.webtrendslive.com";
this.timezone = -8; this.fpcdom = ".motorcycle-superstore.com";
this.onsitedoms = (function () { return (window.RegExp ? new
RegExp(".*motorcycle-superstore.com", "i") : ""); })();this.downloadtypes =
"xls,doc,pdf,txt,csv,zip"; this.navigationtag = "div,table"; this.adclickparam
= "WT.ac"; this.trackevents = true; this.trimoffsiteparams = true;
this.enabled = true; this.i18n = false; this.fpc = "WT_FPC";
this.paidsearchparams = "gclid"; this.splitvalue = ""; this.preserve = true;
this.vid = { params: "WT.dcsvid,WT.i_e_dcsvid", name: "WT_VID", path: ";
path=/", expiry: "; expires=" + (function () { var cur = new Date(); var exp =
new Date(cur.getTime() + 315360000000); return exp.toGMTString(); })(),
domain: "; domain=" + this.fpcdom }; this.DCS = {}; this.WT = {}; this.DCSext
= {}; this.images = []; this.index = 0; this.qp = []; this.exre = (function ()
{ return (window.RegExp ? new
RegExp("dcs(uri)|(ref)|(aut)|(met)|(sta)|(sip)|(pro)|(byt)|(dat)|(p3p)|(cfg)|(
redirect)|(cip)", "i") : ""); })(); this.re = (function () { return
(window.RegExp ? (that.i18n ? { "%25": /\%/g, "%26": /\&/g} : { "%09": /\t/g,
"%20": / /g, "%23": /\#/g, "%26": /\&/g, "%2B": /\+/g, "%3F": /\?/g,
"%5C": /\\/g, "%22": /\"/g, "%7F": /\x7F/g, "%A0": /\xA0/g }) : ""); })(); }
```

1718

1716

```
WebTrends.prototype.dcsCreateImage = function (dcsSrc) {
    if (document.images) { this.images[this.index] = new Image();
this.images[this.index].src = dcsSrc; this.index++; }
    else { document.write('<img alt="" border="0" name="DCSIMG" width="1"
height="1" src="' + dcsSrc + '">'); }
}
```

1712

```
WebTrends.prototype.dcsTag = function () {
    if (document.cookie.indexOf("WTLOPTOUT=") != -1) { return; }
    var WT = this.WT; var DCS = this.DCS; var DCSext = this.DCSext; var i18n =
this.i18n; var P = "http" + (window.location.protocol.indexOf('https:') == 0 ?
's' : '') + "://" + this.domain + (this.dcsid == "" ? '' : '/' + this.dcsid) +
"/dcs.gif?"; if (i18n) { WT.dep = ""; }
    for (var N in DCS) { if (DCS[N] && (typeof DCS[N] != "function")) { P +=
this.dcsA(N, DCS[N]); } }
    for (N in WT) { if (WT[N] && (typeof WT[N] != "function")) { P +=
this.dcsA("WT." + N, WT[N]); } }
    for (N in DCSext) {
        if (DCSext[N] && (typeof DCSext[N] != "function")) {
            if (i18n) { WT.dep = (WT.dep.length == 0) ? N : (WT.dep + ";" +
N); }
-----------------------------------------------------------------
```

FIG. 17A

```
-------------------------------------------------------------------
            P += this.dcsA(N, DCSext[N]);
        }
    }
    if (i18n && (WT.dep.length > 0)) { P += this.dcsA("WT.dep", WT.dep); }
    if (P.length > 2048 && navigator.userAgent.indexOf('MSIE') >= 0) { P =
P.substring(0, 2040) + "&WT.tu=1"; }
    this.dcsCreateImage(P); this.WT.ad = "";
}
WebTrends.prototype.dcsCollect = function () {
    if (this.enabled) {
        this.dcsVar(); this.dcsMeta(); this.dcsAdv(); if (typeof
(this.dcsCustom) == "function") { this.dcsCustom(); }
        this.dcsTag();
    }
}


    <script type="text/javascript">        var _tag = new WebTrends();
_tag.dcsGetId();</script>
    <script type="text/
javascript">_tag.trackAllEvents=true;_tag.dcsCollect();</script>
```

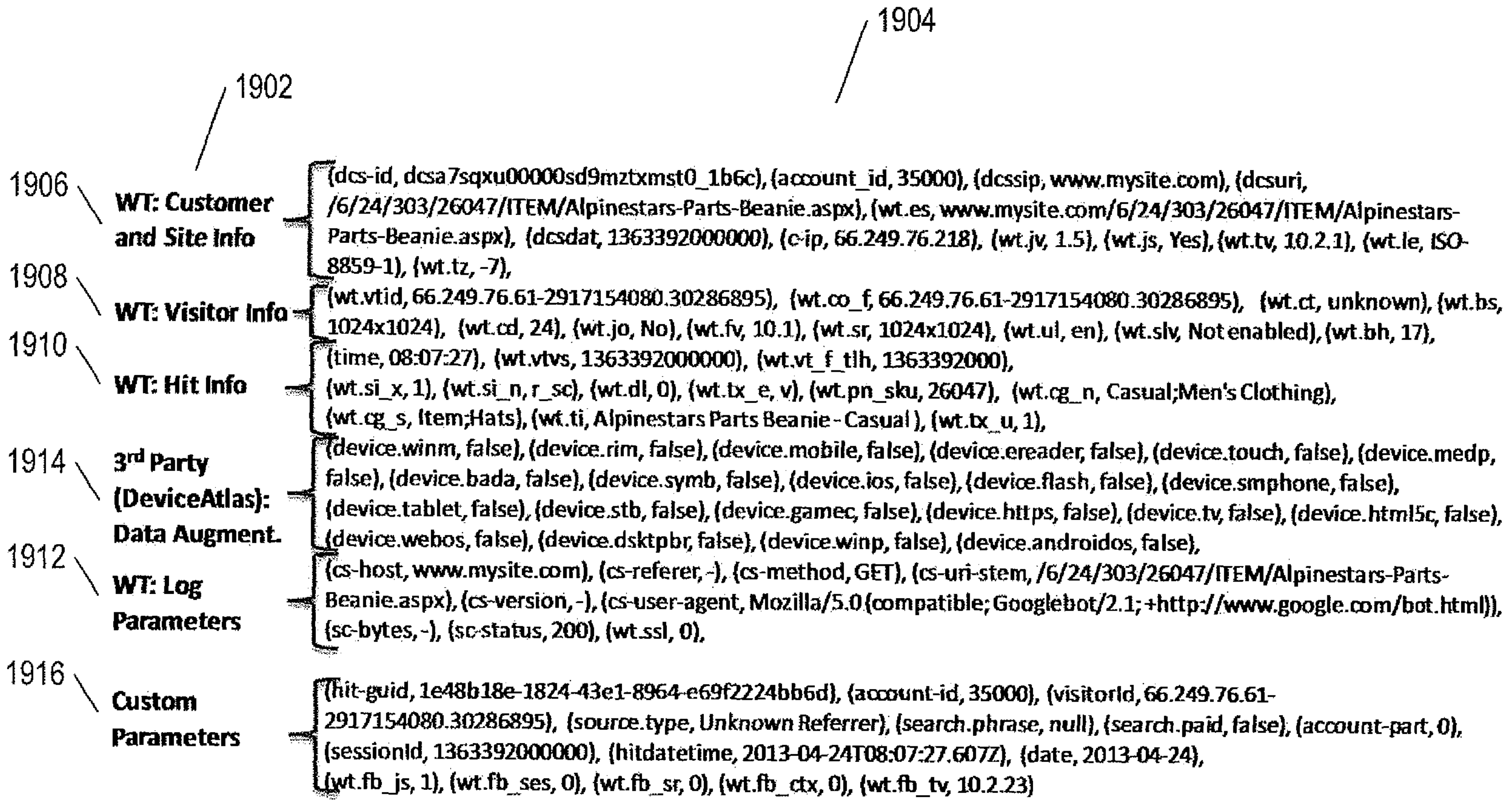

FIG. 19A

1906 — WT: Customer and Site Info
{dcs-id, dcsa7sqxu00000sd9mztxmst0_1b6c}, (account_id, 35000), (dcssip, www.mysite.com), (dcsuri, /6/24/303/26047/ITEM/Alpinestars-Parts-Beanie.aspx), (wt.es, www.mysite.com/6/24/303/26047/ITEM/Alpinestars-Parts-Beanie.aspx), (dcsdat, 1363392000000), (c-ip, 66.249.76.218), (wt.jv, 1.5), (wt.js, Yes), (wt.tv, 10.2.1), (wt.le, ISO-8859-1), (wt.tz, -7), 1908 — WT: Visitor Info
{wt.vtid, 66.249.76.61-2917154080.30286895}, (wt.co_f, 66.249.76.61-2917154080.30286895), (wt.ct, unknown), (wt.bs, 1024x1024), (wt.cd, 24), (wt.jo, No), (wt.fv, 10.1), (wt.sr, 1024x1024), (wt.ui, en), (wt.slv, Not enabled), (wt.bh, 17), 1910 — WT: Hit Info
{time, 08:07:27}, (wt.vtvs, 1363392000000), (wt.vt_f_tlh, 1363392000), (wt.si_x, 1), (wt.si_n_r_sc), (wt.dl, 0), (wt.tx_e, v), (wt.pn_sku, 26047), (wt.cg_n, Casual;Men's Clothing), (wt.cg_s, Item;Hats), (wt.ti, Alpinestars Parts Beanie - Casual), (wt.tx_u, 1), 1914 — 3rd Party (DeviceAtlas): Data Augment.
{device.winm, false}, (device.rim, false), (device.mobile, false), (device.touch, false), (device.ereader, false), (device.medp, false), (device.bada, false), (device.symb, false), (device.ios, false), (device.flash, false), (device.smphone, false), (device.tablet, false), (device.stb, false), (device.gamec, false), (device.https, false), (device.tv, false), (device.html5c, false), (device.webos, false), (device.dsktpbr, false), (device.winp, false), (device.androidos, false), 1912 — WT: Log Parameters
{cs-host, www.mysite.com}, (cs-referrer, -), (cs-method, GET), (cs-uri-stem, /6/24/303/26047/ITEM/Alpinestars-Parts-Beanie.aspx), (cs-version, -), (cs-user-agent, Mozilla/5.0(compatible; Googlebot/2.1;+http://www.google.com/bot.html)), (sc-bytes, -), (sc-status, 200), (wt.ssl, 0), 1916 — Custom Parameters
{hit-guid, 1e48b18e-1824-43e1-8964-e69f2224bb6d}, (account-id, 35000), (visitorid, 66.249.76.61-2917154080.30286895), (source.type, Unknown Referrer), (search.phrase, null), (search.paid, false), (account-part, 0), (sessionId, 1363392000000), (hitdatetime, 2013-04-24T08:07:27.607Z), (date, 2013-04-24), (wt.fb_js, 1), (wt.fb_ses, 0), (wt.fb_sr, 0), (wt.fb_ctx, 0), (wt.fb_tv, 10.2.23)

1920

1922

| dcs-id | account_id | dcssip | dcsuri | wt.es | dcsdat | wt.jv | wt.js | wt.tv |
|---|---|---|---|---|---|---|---|---|
| dcsa7sqxu00000sd9mztxmst0_1b6c | 35000 | www.motorcycle-superstore.com | 6/24/303/26047/ITEM/Alpinestars-Parts-Beanie.aspx | www.motorcycle-superstore.com/6/24/303/26047/ITEM/Alpinestars-Parts-Beanie.aspx | 1363392000000 | 1.5 | Yes | 10.2.1 |
| dcsa7sqxu00000sd9mztxmst0_1b6c | 35000 | www.motorcycle-superstore.com | 6/24/303/26047/ITEM/Alpinestars-Parts-Beanie.aspx | www.motorcycle-superstore.com/6/24/303/26047/ITEM/Alpinestars-Parts-Beanie.aspx | 1363392000000 | 1.5 | Yes | 10.2.1 |
| ⋮ | ⋮ | ⋮ | ⋮ | ⋮ | ⋮ | ⋮ | ⋮ | ⋮ |

FIG. 19B

Multinomial distribution

2502

$$f(x_1, \ldots, x_k, n, p_1, \ldots, p_k) = \Pr(X_1 = x_1 \text{ and } \ldots \text{ and } X_k = x_k)$$

$$= \begin{cases} \frac{n!}{x_1! \cdots x_k!} p_1^{x_1} \cdots p_k^{x_k}, & \text{when } \sum_{i=1}^{k} x_i = n \\ 0 & \text{otherwise,} \end{cases}$$

for non-negative integers $x_1, \ldots, k_x$.

The probability mass function can be expressed using the gamma function as:

$$f(x_1, \ldots, x_k, p_1, \ldots, p_k) = \frac{\Gamma(\Sigma_i x_i + 1)}{\Pi_i \Gamma(x_i + 1)} \prod_{i=1}^{k} p_i^{x_i}.$$

| | |
|---|---|
| Parameters | $n > 0$ number of trials (integer)<br>$p_1, \ldots, p_k$ event probabilities $(\Sigma p_i = 1)$ |
| Support | $X_i \in \{0, \ldots, n\}$<br>$\Sigma X_i = n$ |
| pmf | $\frac{n!}{x_1! \cdots x_k!} p_1^{x_1} \cdots p_k^{x_k}$ |
| Mean | $E\{X_i\} = np_i$ |
| Variance | $\mathrm{Var}(X_i) = np_i(1 - p_i)$<br>$\mathrm{Cov}(X_i, X_j) = -np_i p_j \ (i \neq j)$ |

Dirichlet distribution $$f(x_1,\ldots,x_{K-1};a_1,\ldots,a_K)=\frac{1}{\mathrm{B}(a)}\prod_{i=1}^{K}x_i^{a_i-1},$$

on the open $(K\text{-}1)$-dimensional simplex defined by:

$x_1,\cdots,x_{K-1}>0$
$x_1+\cdots x_{K-1}<1$
$x_K=1-x_1-\cdots-x_{K-1}$ and zero elsewhere.

The normalizing constant is the multinomial Beta Function, which can be expressed in terms of the gamma function:

$$\mathrm{B}(a)=\frac{\Pi_{i=1}^{K}\Gamma(a_i)}{\Gamma\Sigma_{i=1}^{K}(a_i)},\quad a=(a_1,\cdots,a_K).$$

$\psi(\Sigma_k a_k)$

| | |
|---|---|
| Parameters | $K \geq 2$ number of categories (integer)<br>$a_1,\cdots,a_K$ concentration parameters, where $a_i>0$ |
| Support | $x_1,\cdots,x_K$ where $x_i\in[0,1]$ and $\prod_{i=1}^{K}x_i=1$ |
| pmf | $\frac{1}{\mathrm{B}(a)}\prod_{i=1}^{K}x_i^{a_i-1}$<br>where $\mathrm{B}(a)=\frac{\Pi_{i=1}^{K}\Gamma(a_i)}{\Gamma\Sigma_{i=1}^{K}(a_i)}$<br>where $a=(a_1,\ldots,a_K)$ |
| Mean | $\mathrm{E}[X_i]=\frac{a_i}{\Sigma_k a_k}$<br>$\mathrm{E}[\ln X_i]=\psi(a_i)-\psi(\Sigma_k a_k)$<br>(see digamma function) |
| Variance | $\mathrm{Var}[X_i]=\frac{a_i(a_0-a_i)}{a_0^2(a_0+1)},$<br>where $a_0=\sum_{i=1}^{K}a_i$<br>$\mathrm{Cov}X_i,X_j=\frac{-a_i a_j}{a_0^2(a_0+1)}(i\neq j)$ |

2602
$$\text{for } (i = 1;\ i <= M;\ i{+}{+})$$
$$\{$$
$$\theta_i \sim \text{Dirichlet } (\alpha);$$
$$\}$$

2606
$$\text{for } (k=1;\ k <= K;\ k{+}{+})$$
$$\{$$
$$\varphi_k \sim \text{Dirichlet } (\beta);$$
$$\}$$

2608
$$\text{for } (i=1;\ i <= M;\ i{+}{+})$$
$$\{$$
$$\text{for } (j=1; j <= N_i; j{+}{+})$$
$$\{$$
$$z_{i,j} = \text{ topic selected based on } \theta_j;$$
$$w_{i,j} = \text{word selected based on } \varphi_{z_{i,j}};$$
$$\}$$
$$\}$$

2702

$$P(\mathbf{W},,\theta,\varphi,\alpha,\beta)=\prod_{i=1}^{K}(P\varphi_i;\beta)\prod_{j=1}^{M}P(\theta_j;\alpha)\prod_{t=1}^{N}P(Z_{j,t}|\theta_j)P(W_{j,t}|\varphi_{Z_{j,t}}),$$

$$P(\mathbf{Z},\mathbf{W};\alpha,\beta)=\int_\theta\int_\varphi P(\mathbf{W},\mathbf{Z},\theta,\varphi,\alpha,\beta)\,d\varphi\,d\theta$$

$$=\int_\varphi\prod_{i=1}^{K}(P\varphi_i;\beta)\prod_{j=1}^{M}\prod_{t=1}^{N}P(W_{j,t}|\varphi_{Z_{j,t}})d\varphi\int_\theta\prod_{j=1}^{M}P(\theta_j;\alpha)\prod_{t=1}^{N}P(Z_{j,t}|\theta_j)d\theta,$$

2704

$$P(\mathbf{Z},\mathbf{W};\alpha,\beta)$$

$$=\prod_{j=1}^{M}\frac{\Gamma\left(\Sigma_{i=1}^{K}\alpha_i\right)\Pi_{i=1}^{K}\Gamma\left(n_{j_{(\cdot)}}^{i}+\alpha_i\right)}{\Pi_{i=1}^{K}\Gamma(\alpha_i)\Gamma\left(\Sigma_{i=1}^{K}n_{j_{(\cdot)}}^{i}+\alpha_i\right)}\times\prod_{i=1}^{K}\frac{\Gamma\left(\Sigma_{r=1}^{V}\beta_r\right)\Pi_{r=1}^{V}\Gamma\left(n_{(\cdot),r}^{i}+\beta_r\right)}{\Pi_{r=1}^{V}\Gamma(\beta_r)\Gamma\left(\Sigma_{r=1}^{V}n_{(\cdot),r}^{i}+\beta_r\right)},$$

2706 where $\Gamma(r)=\int_0^\infty x^{r-1}e^{-x}dx;$ $n_j^i,r$ = number of words in the $j^{th}$ document equal to word $r$ in the vocabulary and assigned to the $i^{th}$ topic;

$n_j^i,(\cdot)$ = number of words in the $j^{th}$ document equal to word $r$ in the vocabulary; and;

$n_{(\cdot)}^i,r$ = number of words equal to word $r$ in the vocabulary and assigned to the $i^{th}$ topic.

FIG. 27

$$p\left(z_{i,j}=k \mid \mathbf{Z}^{\neg i,j},\mathbf{W};\alpha,\beta\right)=\frac{a_{k,j}b_{w,k}}{\sum_k a_{k,j}b_{w,k}}$$ 2802 where $Z^{\neg i,j}$ is the vector $\mathbf{Z}$ exclusing $Z_{i,j}$;

$a_{k,j} = N_{k,j}^{\neg i,j}+\alpha$;

$b_{w,k} = \dfrac{N_{w,k}^{\neg i,j}+\beta}{N_k^{\neg i,j}+V\beta}$;

$N_{w,k,j}$ = number of instances of word $w$ in document $j$ assigned to topic $k$;

$N_{w,k}$ = number of instances of word $w$ assigned to topic $k$;

$N_k$ = number of words in vocabulary assigned to topic k; and $N_{x,y,z}^{\neg i,j}$ = $N_{x,y,z}$ disregarding word $w_{i,j}$.

2804
```
int select_k( )
{
    double u = randomReal (0,1);                          2806
    int k;                                                2808
    double p[K+1];                                        2808
    p[0] = 0;
    for (k = 1; k <= K; k++)                              2810
    {
        p[k]=p[k-1]+(N_{k,j}^{¬i,j} + α)(N_{w_{i,j},k}^{¬i,j} + β)/(N_k^{¬i,j} + Vβ);
    }
    for (k = 1; k <= K; k++)                              2812
    {
        if u <= p[k]/p[K]
        {
            return k;
        }
    }
}
```

2814

$$\hat{\varphi}_{w,k} = \frac{N_{w,k}+\beta}{N_k+V\beta}$$

$$\hat{\varphi}_{k,j} = \frac{N_{k,j}+\alpha}{N_j+K\alpha}$$

FIG. 28

Beta distribution

Probability density function

The probability density function of the beta distribution, for $0 \leq x \leq 1$, and shape parameters α, β > 0, is a power function of the variable x and of its reflection (1-x) like follows:

$$\begin{aligned} f(x;\alpha,\beta) &= \text{constant} \cdot x^{\alpha-1}(1-x)^{\beta-1} \\ &= \frac{x^{\alpha-1}(1-x)^{\beta-1}}{\int_0^1 u^{\alpha-1}(1-u)^{\beta-1}\,du} \\ &= \frac{\Gamma(\alpha+\beta)}{\Gamma(\alpha)\Gamma(\beta)} x^{\alpha-1}(1-x)^{\beta-1} \\ &= \frac{1}{B(\alpha,\beta)} x^{\alpha-1}(1-x)^{\beta-1} \end{aligned}$$

where Γ(*z*) is the gamma function. The beta function B is a normalization constant to ensure that the total probability integrates to 1. In the above equations *x* is a realization – an observed value that actually occurred – of a random process *X*.

| | |
|---|---|
| Parameters | $\alpha > 0$ shape (real)<br>$\beta > 0$ shape (real) |
| Support | $x \in (0,1)$ |
| pdf | $\frac{x^{\alpha-1}(1-x)^{\beta-1}}{\mathrm{B}(\alpha,\beta)}$ |
| Mean | $\mathrm{E}[X] = \frac{\alpha}{\alpha+\beta}$<br>$\mathrm{E}[\ln X] = \psi(\alpha) - \psi(\alpha+\beta)$ |
| Median | $I_{\frac{1}{2}}^{[-1]}(\alpha,\beta)$ (in general)<br>$\approx \frac{\alpha - \frac{1}{3}}{\alpha+\beta-\frac{2}{3}}$ for $\alpha,\beta > 1$ |
| Variance | $\mathrm{var}[X] = \frac{\alpha\beta}{(\alpha+\beta)^2(\alpha+\beta+1)}$<br>$\mathrm{var}[\ln X] = \psi_1(\alpha) - \psi_1(\alpha+\beta)$ |

FIG. 31

Bernoulli distribution $$Pr(X=1) = 1 - Pr(X=0) = 1 - q = p$$

| | |
|---|---|
| Parameters | $0 < p < 1, p \in \mathbb{R}$ |
| Support | $k \in (0,1)$ |
| pmf | $\begin{cases} q = 1 - p & \text{for } k = 0 \\ p & \text{for } k = 1 \end{cases}$ |
| Mean | $p$ |
| Median | $\begin{cases} 0 & \text{if } q > p \\ 0.5 & \text{if } q = p \\ 1 & \text{if } q < p \end{cases}$ |
| Variance | $p(1 - p)$ |

FIG. 32

```
3302 { θ ~ Dirichlet (α);
       λ ~ Beta (d,δ);

3304 { for (k = 1; k < K; k++)
       {
             s = 1;
             while (next = getNextSeedWord( ): = -1)
             {
                   S[k][s++] = next;
             }
             numS[k] = s – 1;
       }

3306 — π ~ Multinomial with K entries;
3308 { φ^r_G ~ Dirichlet (β);
       φ^s_G ~ Dirichlet (β);
       for (k = 1; k < K; k++)
       {
             φ^r_k ~ Dirichlet (β);
             φ^s_k ~ Dirichlet (β);
       }

3310 { for (i = 1; i <= M; i++)                           — 3312
       {
             z_i = topic selected based on θ;              — 3314
             λ_i = noise rate selected based on λ;

  3316 {     for (j = 1; j <= N_i; j++)                                        — 3318
             {
                   x_i,j = noise indicator selected based on a Bernoulli (λ_i);
                   y_i,j = seed indicator selected from the z_i^th entry in π;  — 3320
                   if (x_i,j = = 0)                          φ^r_{z_i}
                   {                                  φ^s_{z_i}
                         if (y_i,j = = 0) w_i,j = word selected based on    ;  } 3321
                         else w_i,j = word selected based on    ;              }
                   }
                   else
                   {
                         if (y_i,j = = 0) w_i,j = word selected based on φ^r_G;  } 3322
                         else w_i,j = word selected based on φ^s_G;              }
                   {
             }
       }
```

FIG. 33

WORD DISTRIBUTION

We consider the following product of terms in the joint distribution:

$$P\left(\phi_G^r \mid \beta\right) P\left(\phi_G^s \mid \beta\right)\left(\bar{\phi}^r \mid \beta\right)\left(P\bar{\phi}^s \mid \beta\right) P\left(\mathbf{W} \mid \mathbf{X},\mathbf{Y},\bar{\phi},\bar{z}\right). \qquad (1)$$

The first term is a Dirichlet distribution parameterized by $\beta$, the second term is a product of Dirichlet distributions (each also parameterized by $\beta$), and the final term is a mixture of multinomial distributions. Specifically, $$P\left(\phi_G^r \mid \beta\right) \sim \mathrm{Dir}(\beta) \qquad (2)$$

$$= \frac{1}{\mathrm{B}(\beta)} \prod_{v=1}^{V} \phi_{G_v}^r, \beta_v - 1 \qquad (3)$$

$$P\left(\phi_G^s \mid \beta\right) \sim \mathrm{Dir}(\beta) \qquad (4)$$

$$= \frac{1}{\mathrm{B}(\beta)} \prod_{v=1}^{V} \phi_{G_v}^s, \beta_v - 1 \qquad (5)$$

$$P\left(\bar{\phi}^r \mid \beta\right) \sim \prod_{c=1}^{K} \mathrm{Dir}(\beta) \qquad (6)$$

$$= \frac{1}{\mathrm{B}(\beta)}^{K} \prod_{c=1}^{K} \prod_{v=1}^{V} \phi_{c_v}^r, \beta_v - 1 \qquad (7)$$

$$P\left(\bar{\phi}^s \mid \beta\right) \sim \prod_{c=1}^{K} \mathrm{Dir}(\beta) \qquad (8)$$

$$= \frac{1}{\mathrm{B}(\beta)}^{K} \prod_{c=1}^{K} \prod_{v=1}^{V} \phi_{c_v}^s, \beta_v - 1 \qquad (9)$$

$$P\left(\mathbf{W} \mid \mathbf{X},\mathbf{Y},\bar{\phi},\bar{z}\right) = \prod_{i=1}^{M} \left(P\bar{w}_i \mid \bar{x}_i, \bar{y}_i, \bar{\phi}, z_i\right) \qquad (10)$$

$$= \prod_{i=1}^{M} \prod_{j=1}^{N_i} \left(1 - x_{i,j}\right)\left[\left(1 - y_{i,j}\right) P\left(w_{i,j} \mid \phi_G^r\right) + \left(y_{i,j}\right) P\left(w_{i,j} \mid \phi_G^s\right)\right] \qquad (11)$$

$$+ \left(x_{i,j}\right)\left[\left(1 - y_{i,j}\right) P\left(w_{i,j}, \phi_{Z_i}^r\right) + \left(y_{i,j}\right) P\left(w_{i,j} \mid \phi_{Z_i}^s\right)\right],$$

where $P\left(w_{i,j} \mid \phi_G^r\right)$ is the probability of drawing word $w_{i,j}$ from the multinomial distribution parameterized by the "global" regular topic, and $P\left(w_{i,j} \mid \phi_{Z_i}^s\right)$ is the probability of drawing $w_{i,j}$ from the multinomial distribution indexed by the seed topic label $z_i \in \{1,\ldots,K\}$. Note that the expression $B(\cdot)$ refers to the Beta function (not to be confused with the hyperparameter $\beta$). While the first two terms index over the dictionary $(v = 1,\ldots,V)$ and topic indices $(c = 1,\ldots,K)$, the term in $(11)$ indexes over the number of documents, $M$, and words per document, $N_i$.

We argue that equation (11) can be re-indexed as $$\prod_{v=1}^{V} P\left(v \mid \phi_G^r\right)^{\bar{v}_G^r} P\left(v \mid \phi_G^s\right)^{\bar{v}_G^s} \prod_{c=1}^{K} P\left(v \mid \phi_c^r\right)^{\bar{v}_c^r} P\left(v \mid \phi_c^s\right)^{\bar{v}_c^s} \qquad (12)$$

$$\prod_{v=1}^{V} \phi_{G_v}^r \bar{v}_G^r \phi_{G_v}^s \bar{v}_G^s \prod_{c=1}^{K} \phi_{c_v}^r \bar{v}_c^r \bar{v}_c^s \qquad (13)$$

FIG. 34A where $\overline{v}_G^r$ is a count for the number of occurrences of word $v$ labeled as coming from the *regular* global topic across all documents ($\overline{v}_G^s$ is the equivalent count for the occurences ofword $v$ from the *seed* global topic. Similarly, we define $\overline{v}_c^r$ as the number of times word $v$appeared in documents that were assigned to the *regular* topic $c$ across all documents in the corpus. More formally, let $$\overline{v}_G^r = \sum_{i=1}^{M}\sum_{j=1}^{N_i}\left(1-x_{i,j}\right)\left(1-y_{i,j}\right)I\left(w_{i,j}=v\right)$$

$$\overline{v}_G^s = \sum_{i=1}^{M}\sum_{j=1}^{N_i}\left(1-x_{i,j}\right)\left(y_{i,j}\right)I\left(w_{i,j}=v\right)$$

$$\overline{v}_c^r = \sum_{i=1}^{M}\sum_{j=1}^{N_i}\left(x_{i,j}\right)\left(1-y_{i,j}\right)I\left(w_{i,j}=v\right)$$

$$\overline{v}_c^s = \sum_{i=1}^{M}\sum_{j=1}^{N_i}\left(x_{i,j}\right)\left(y_{i,j}\right)I\left(w_{i,j}=v\right).$$

The full expression for the product $$\mathrm{P}\left(\phi_G^r \mid \beta\right)\mathrm{P}\left(\phi_G^s \mid \beta\right)\mathrm{P}\left(\overline{\phi}^r \mid \beta\right)\mathrm{P}\left(\overline{\phi}^s \mid \beta\right)P\left(\mathbf{W} \mid \mathbf{X},\mathbf{Y},\overline{\phi},\overline{z}\right)$$

is then $$\left(\frac{1}{B(\beta)}\right)^{2K+2}\prod_{v=1}^{V}\left(\phi_{G_v}^r\right)^{\overline{v}_G^r+\beta_v-1}\left(\phi_{G_v}^s\right)^{\overline{v}_G^S+\beta_v-1}\prod_{c=1}^{K}\left(\phi_{G_v}^r\right)^{\overline{v}_c^r+\beta_v-1}\left(\phi_{c_v}^s\right)^{\overline{v}_c^S+\beta_v-1}$$

NON-COLLAPSED SAMPLER

FULL JOINT DISTRIBUTION: NON-COLLAPSED $$\left(\frac{1}{B(\beta)}\right)^{2K+2}\prod_{v=1}^{V}\left(\phi_{G_v}^r\right)^{\overline{v}_G^r+\beta_v-1}\left(\phi_{G_v}^s\right)^{\overline{v}_G^S+\beta_v-1}\prod_{c=1}^{K}\left(\phi_{G_v}^r\right)^{\overline{v}_c^r+\beta_v-1}\left(\phi_{c_v}^s\right)^{\overline{v}_c^S+\beta_v-1}$$

$$\times\frac{\Gamma\left(\sum_{C=1}^{K}\alpha_C\right)M!\,\Pi_{C=1}^{K}\Gamma\left(\alpha_C+\overline{z}_C\right)}{\Pi_{C=1}^{K}\Gamma\left(\alpha_C\right)\overline{z}_C!\,\Gamma\left(M+\sum_{C=1}^{K}\alpha_C\right)}$$

$$\times\frac{1}{B(\delta,\gamma)^M}\prod_{i=1}^{M}\lambda_i^{\delta+\overline{x}_i^G-1}\left(1-\lambda_i\right)^{\gamma+\overline{x}_i^C-1}$$

$$\times\prod_{i=1}^{M}\pi_{z_i}^{\overline{y}_i^r}\left(1-\pi_{z_i}\right)^{\overline{y}_i^S}$$

3.2 SAMPLING DISTRIBUTION: TOPICS $$P\left(z_j \mid \overline{z}^{(-j)},\mathbf{X}^{(-j)},\mathbf{W}\left(^{-j}\right),\mathbf{Y}\left(^{-j}\right),\overline{\lambda}^{(-j)},\overline{\phi};\alpha,\beta,\delta,\gamma\right)$$

$$=\frac{\left[P\left(\mathbf{W} \mid \mathbf{X},\mathbf{Y},\overline{z},\overline{\phi};\beta\right)\right]\left[P\left(\mathbf{X} \mid \overline{\lambda};\delta,\gamma\right)\right]\left[P\left(\mathbf{Y};\overline{\pi}\right)\right]\left[P\left(\overline{z};\alpha\right)\right]}{\left[P\left(\mathbf{W}^{(-j)} \mid \mathbf{X}^{(-j)},\overline{z},\overline{\phi};\beta\right)\right]\left[P\left(\mathbf{X}^{(-j)} \mid \overline{\lambda}^{(-j)};\delta,\gamma\right)\right]\left[P\left(\mathbf{Y}^{(-j)};\overline{\pi}^{(-j)}\right)\right]\left[P\left(\overline{z}^{(-j)};\alpha\right)\right]}$$

The first ratio of terms simplifies to

FIG. 34B $$\frac{\left[P\left(\mathbf{W}\mid\mathbf{X},\mathbf{Y},\vec{z},\vec{\phi};\beta\right)\right]}{\left[P\left(\mathbf{W}^{(-j)}\mid\mathbf{X}^{(-j)},\mathbf{Y}^{(-j)},\vec{z},\vec{\phi};\beta\right)\right]}$$

$$=\frac{\left(\frac{1}{B\beta}\right)^{2K+2}\prod_{v=1}^{V}\left(\phi_{G_v}^{r}\right)^{\vec{v}_G^r+\beta v-1}\left(\phi_{G_v}^{S}\right)^{\vec{v}_G^S+\beta v-1}\prod_{C=1}^{K}\left(\phi_{C_v}^{r}\right)^{\vec{v}_C^r+\beta v-1}\left(\phi_{C_v}^{S}\right)^{\vec{v}_C^S+\beta v-1}}{\left(\frac{1}{B\beta}\right)^{2K+2}\prod_{v=1}^{V}\left(\phi_{G_v}^{r}\right)^{\vec{v}_G^r+\beta v-1}\left(\phi_{G_v}^{S}\right)^{\vec{v}_G^S+\beta v-1}\prod_{C=1}^{K}\left(\phi_{C_v}^{r}\right)^{\vec{v}_C^r+\beta v-1}\left(\phi_{C_v}^{S}\right)^{\vec{v}_C^S+\beta v-1}}$$

$$=\prod_{v=1}^{V}\left(\phi_{G_v}^{r}\right)^{\vec{v}_G^r}\left(\phi_{G_v}^{S}\right)^{\vec{v}_{G_j}^S}\prod_{C=1}^{K}\left(\phi_{C_v}^{r}\right)^{\vec{v}_{C_j}^r}\left(\phi_{C_v}^{S}\right)^{\vec{v}_{C_j}^S},$$

where $\vec{v}_{Cj}^{S}$ is the number of occurrences of the $v^{th}$ word in the withheld document $j$ assigned to *seed* topic $c$, $\vec{v}_{Cj}^{r}$ is the number of occurrences of the $v^{th}$ word in the withheld document $j$ assigned to *regular* topic c. $\vec{v}_{Cj}^{S}$ and $\vec{v}_{Cj}^{S}$ represent the analogous counts for the global topic. The second ratio of terms simiplifies as $$\frac{\left[P\left(\mathbf{X}\mid\vec{\lambda};\delta,\gamma\right)\right]}{\left[P\left(\mathbf{X}^{(-j)}\mid\vec{\lambda}^{(-j)};\delta,\gamma\right)\right]}$$

$$=\frac{\frac{1}{B(\delta,\gamma)^{M}}\prod_{i=1}^{M}\lambda_i^{\delta+\vec{x}_i^G-1}\left(1-\lambda_i\right)^{\gamma+\vec{x}_i^C-1}}{\frac{1}{B(\delta,\gamma)^{M-1}}\prod_{i=1,i\neq j}^{M}\lambda_i^{\delta+\vec{x}_i^G-1}\left(1-\lambda_i\right)^{\gamma+\vec{x}_i^C-1}}$$

$$=\frac{1}{B(\delta,\gamma)}\lambda_i^{\delta+\vec{x}_j^G-1}\left(1-\lambda_i\right)^{\gamma+\vec{x}_j^C-1}.$$

The third ratio of terms is identical to that in equation ??:

$$\frac{\left[P\left(\vec{z};\alpha\right)\right]}{\left[P\left(\vec{z}^{(-j)};\alpha\right)\right]}=\frac{M\left(\alpha_j+\vec{z}j-1\right)}{\vec{z}_j\left(M-1+\sum_{C=1}^{K}\alpha_c\right)}.$$

The fourth ration of terms is $$\frac{P\left(\mathbf{Y};\vec{\pi}\right)}{P\left(\mathbf{Y}^{(-j)};\vec{\pi}^{(-j)}\right)}$$

$$=\frac{\prod_{i=1}^{M}\pi_{z_i}^{\vec{y}_i^r}\left(1-\pi_{z_i}\right)^{\vec{y}_i^S}}{\prod_{i=1 i\neq j}^{M}\pi_{z_i}^{\vec{y}_i^r}\left(1-\pi_{z_i}\right)^{\vec{y}_i^S}}$$

$$=\pi_{z_j}^{\vec{y}_j^r}\left(1-\pi_{z_j}\right)^{\vec{y}_j^S},$$

where $\vec{y}_j^r$ and $\vec{y}_i^S$ are the number of occurrences of words from the seed distribution and from the regular distribution in the $j^{th}$ document, respectively. The full conditional distribution is

FIG. 34C then
$$P_{x_j}\left(\bar{z} \mid^{(-j)}, \mathbf{X}^{(-j)}, \mathbf{W}^{(-j)}, \mathbf{Y}^{(-j)}, \bar{\lambda}^{(-j)}, \bar{\phi}, \phi_G; \alpha, \beta, \delta, \gamma\right)$$
$$= \lambda_i^{\delta+\bar{x}_j^G-1}\left(1-\lambda_i\right)^{\gamma+\bar{x}_j^C-1} \pi_{z_j}^{\bar{y}_j^r}\left(1-\pi_{z_j}\right)^{\bar{y}_j^S}$$
$$\frac{M\left(\alpha_j+\bar{z}_j-1\right)}{\bar{z}_j\left(M-1+\sum_{C=1}^{K}\alpha_c\right)} \prod_{v=1}^{V}\left(\phi_{G_v}^r\right)^{\bar{v}_{G_j}^r}\left(\phi_{G_v}^S\right)^{\bar{v}_{G_j}^S} \prod_{c=1}^{K}\left(\phi_{C_v}^r\right)^{\bar{v}_{C_j}^r}\left(\phi_{C_v}^S\right)^{\bar{v}_{C_j}^S}$$

The log-conditional distribution is given by
$$\log P\left(z_j \mid \bar{z}^{(-j)}, \mathbf{X}^{(-j)}, \mathbf{W}^{(-j)}, \mathbf{Y}^{(-j)}, \bar{\lambda}^{(-j)}\bar{\phi}, \phi_G; \alpha, \beta, \delta, \gamma\right)$$
$$= \left[-\log B(\delta,\gamma) + \left(\delta+\bar{x}_j^G-1\right)\log\lambda_i + \left(\gamma+\bar{x}_j^C-1\right)\log\left(1-\lambda_i\right)\right]$$
$$+\left[\bar{y}_j^r \log\pi_{z_j} + \bar{y}_j^S \log\left(1-\pi_{z_j}\right)\right]$$
$$+\left[\log\left(M\left(\alpha_j+\bar{z}_j-1\right)\right) - \log\left(\bar{z}_j\left(M-1+\sum_{c=1}^{K}\alpha_c\right)\right)\right]$$
$$+\left[\sum_{v=1}^{V}\bar{v}_{G_j}^r \log\left(\phi_{G_v}^r\right) + \bar{y}_{G_j}^s \log\left(\phi_{G_v}^s\right) + \sum_{c=1}^{K}\bar{v}_{c_j}^r \log\left(\phi_{c_v}^r\right) + \bar{v}_{Cj}^S \log\left(\phi_{C_v}^S\right)\right]$$

JOINT SAMPLING DISTRIBUTION: NOISE & LOCAL/SEED TOPIC INDICATOR $$P\left(x_{i,j}, y_{i,j} \mid \bar{z}, \mathbf{X}^{-(i,j)}, \mathbf{W}^{-(i,j)}, \mathbf{Y}^{-(i,j)}, \bar{\lambda}, \bar{\phi}; \alpha, \beta, \delta, \gamma\right)$$
$$= \frac{\left[P\left(\mathbf{W} \mid \mathbf{X}, \mathbf{Y}, \bar{z}, \bar{\phi}; \beta\right)\right]\left[P\left(\mathbf{X} \mid \bar{\lambda}; \delta, \gamma\right)\right]\left[P\left(\mathbf{Y}; \bar{\pi}\right)\right]\left[P\left(\bar{z}; \alpha\right)\right]}{\left[P\left(\mathbf{W}^{-(i,j)} \mid \mathbf{X}^{-(i,j)}, \mathbf{Y}^{-(i,j)}, \bar{z}, \bar{\phi}; \beta\right)\right]\left[P\left(\mathbf{X}^{-(i,j)} \mid \bar{\lambda}; \delta, \gamma\right)\right]\left[P\left(\mathbf{Y}^{-(i,j)}; \bar{\pi}\right)\right]\left[P\left(\bar{z}; \alpha\right)\right]}$$

We address the ratio of each term independently. The first ratio is given by
$$\frac{\left[P\left(\mathbf{W} \mid \mathbf{X}, \mathbf{Y}, \bar{z}, \bar{\phi}; \beta\right)\right]}{\left[P\left(\mathbf{W}^{-(i,j)} \mid \mathbf{X}^{-(i,j)}, \mathbf{Y}^{-(i,j)}, \bar{z}, \bar{\phi}; \beta\right)\right]}$$
$$= \frac{\left(\frac{1}{B\beta}\right)^{2K+2} \prod_{v=1}^{V}\left(\phi_{G_v}^r\right)^{\bar{v}_G^r+\beta_v-1}\left(\phi_{G_v}^s\right)^{\bar{v}_G^s+\beta_v-1} \prod_{c=1}^{K}\left(\phi_{c_v}^r\right)^{\bar{v}_c^r+\beta_v-1}\left(\phi_{c_v}^s\right)^{\bar{v}_c^s+\beta_v-1}}{\left(\frac{1}{B\beta}\right)^{2K+2} \prod_{v=1}^{V}\left(\phi_{G_v}^r\right)^{\bar{v}_{G-(i,j)}^r+\beta_v-1}\left(\phi_{G_v}^s\right)^{\bar{v}_{G-(i,j)}^s+\beta_v-1} \prod_{c=1}^{K}\left(\phi_{c_v}^r\right)^{\bar{v}_{c-(i,j)}^r+\beta_v-1}\left(\phi_{c_v}^s\right)^{\bar{v}_{c-(i,j)}^s+\beta_v-1}}$$
$$= \left(\phi_{G_{x_{i,j}}}^r\right) \text{ if } x_{i,j}=0 \text{ and } y_{i,j}=0,$$
$$= \left(\phi_{G_{x_{i,j}}}^s\right) \text{ if } x_{i,j}=0 \text{ and } y_{i,j}=1,$$
$$= \left(\phi_{(z_i)_{x_{i,j}}}^r\right) \text{ if } x_{i,j}=1 \text{ and } y_{i,j}=0,$$
$$= \left(\phi_{(z_i)_{x_{i,j}}}^s\right) \text{ if } x_{i,j}=0 \text{ and } y_{i,j}=1.$$

FIG. 34D

We derive the second term $$\frac{\left[P\left(\mathbf{X}\mid\bar{\lambda};\delta,\gamma\right)\right]}{\left[P\left(\mathbf{X}^{-(i,j)}\mid\bar{\lambda};\delta,\gamma\right)\right]}$$

$$=\frac{\frac{1}{B(\delta,\gamma)^{M}}\prod_{i=1}^{M}\lambda_i^{\delta+\bar{x}_i^G-1}\left(1-\lambda_i\right)^{\gamma+\bar{x}_i^C-1}}{\frac{1}{B(\delta,\gamma)^{M}}\lambda_j^{\delta+\bar{x}_j^G-(1+x_{i,j})}\left(1-\lambda_j\right)^{\gamma+\bar{x}_j^C-(1+x_{i,j})}\prod_{i=1,i\neq j}^{M}\lambda_i^{\delta+\bar{x}_i^G-1}\left(1-\lambda_i\right)^{\gamma+\bar{x}_i^C-1}}$$

$$=\lambda_i \text{ if } x_{i,j}=0,$$

$$=1-\lambda_i \text{ if } x_{i,j}=1.$$

The third term is $$\frac{\left[P\left(\mathbf{Y};\bar{\pi}\right)\right]}{\left[P\left(\mathbf{Y}^{-(i,j)};\bar{\pi}\right)\right]}$$

$$=\frac{\prod_{i=1}^{M}\pi_{z_i}^{\bar{y}_i^r}\left(1-\pi_{z_i}\right)^{\bar{y}_i^s}}{\prod_{i=1}^{M}\pi_{z_i}^{\bar{y}_i^r-(1-y_{i,j})}\left(1-\pi_{z_i}\right)^{\bar{y}_i^s-y_{i,j}}}$$

$$=\pi_{z_i} \text{ if } y_{i,j}=0, \text{ else,}$$

$$=\left(1-\pi_{z_i}\right)\text{if } y_{i,j}=1.$$

The fourth term is not impacted by $x_{i,j}$ or $y_{i,j}$ and so cancels out in the ratio. The full expression for the conditional distribution is then $$P\left(x_{i,j}y_{i,j}\mid\bar{z},\mathbf{X}^{-(i,j)},\mathbf{W}^{-(i,j)},\mathbf{Y}^{-(i,j)}\bar{\lambda},\bar{\phi};\alpha,\beta,\delta,\gamma\right)$$

$$=\left(\phi_{G_{x_{i,j}}}^{r}\right)\lambda_i\pi_{z_i} \text{ if } x_{i,j}=0 \text{ and } y_{i,j}=0,$$

$$=\phi\left(_{G_{x_{i,j}}}^{s}\right)\lambda_i\left(1-\pi_{z_i}\right) \text{ if } x_{i,j}=0 \text{ and } y_{i,j}=1,$$

$$=\left(\phi_{(z_i)_{x_{i,j}}}^{r}\right)\left(1-\lambda_i\right)\pi_{z_i} \text{ if } x_{i,j}=1 \text{ and } y_{i,j}=0,$$

$$=\left(\phi_{(z_i)_{x_{i,j}}}^{s}\right)\left(1-\lambda_i\right)\left(1-\pi_{z_i}\right) \text{ if } x_{i,j}=1 \text{ and } y_{i,j}=1.$$

FIG. 34E

METHODS AND SYSTEMS THAT CATEGORIZE AND SUMMARIZE INSTRUMENTATION-GENERATED EVENTS

CROSS-REFERENCE TO RELATED APPLICATION

This application claims the benefit of Provisional Application No. 61/920,965, filed Dec. 26, 2013.

TECHNICAL FIELD

The current document is directed to processing data in a distributed computing environment and, in particular, to a method and system for categorizing and summarizing events generated by instrumentation embedded in encoded information.

BACKGROUND

During the past 20 years, the continued evolution of computer processors, data-storage devices and subsystems, and networking, together with the emergence of the World Wide Web and broad consumer acceptance of the Internet, have created a vast new Internet-based retailing infrastructure that represents a significant portion of current retail transactions for products and services. In certain retail sectors, including books and recorded music, Internet-based retail transactions now rival or have surpassed traditional retailing media, including physical retail establishments and catalog-based mail-order and telephone transactions. It is expected that Internet-based retailing will continue to grow and assume increasingly greater shares of the total retail-transaction volumes on a worldwide basis, including retailing of products and goods as well as retailing of services, and including commercial activities of many different types of industries and commercial organization, including financial services providers, travel services, and healthcare.

As Internet-based retailing of products and services has evolved and increased in market share, a variety of new support industries have grown up around Internet-based retailing, including cloud computing, website-development services, Internet-transaction services, automated testing and optimization services, and web-analytics services. Automated data-collection-and-data-processing, testing, and optimization services provide tools and infrastructure to allow owners and managers of websites to carry out experiments in which websites are systematically instrumented in order to generate data from which the automated testing and optimization services determine salient features and characteristics of websites, remote users, markets, and other entities involved in online activities. The results of analysis of the data generated by instrumentation guide modification of websites to improve website users' experience and website owner's return on investment. Existing automated data-collection-and-data-processing, testing, and optimization services may, however, be seriously challenged by the volume and complexity of the data generated by instrumented web pages. Organization involved data-collection and data-processing from instrumented computational entities, web-site testing, web-site optimization, and other data-driven activities seek methods and systems to facilitate extraction of information from instrumentation-generated data and other types of data collected by data-collection-and-data-processing systems and services.

SUMMARY

The current document is directed to methods and systems that receive instrumentation-generated events and that employ statistical inference to discover event topics and to assign a topic or category to each of a number of events. In a described implementation, the events comprise key/value pairs. A seeded local/global-topic latent Dirichlet allocation method is used to discover topics and assign topics to a set of events. The topic-assigned events are then processed to generate topic signatures, using which the methods and systems assign topics to subsequently received messages.

BRIEF DESCRIPTION OF THE DRAWINGS

FIG. 9 shows the contents of an HTML file that encodes the exemplary web page shown in FIG. 8 and that includes simple modifications.

FIG. 13 shows the HTML modifications used to virtually incorporate a testing service into a web site.

FIGS. 16A-E illustrate the various types of data messages that are transmitted between computers in the example system shown in FIG. 14.

FIGS. 17A-B provide an example of the instrumentation inserted within a web page that carries out data collection.

FIGS. 19A-B illustrate an event comprising key/value pairs.

FIGS. 25A-B provide information about the multinomial distribution and its conjugate-prior Dirichlet distribution.

FIG. 27 shows joint-probability expressions for the LDA model.

FIG. 28 provides additional expressions used by the LDA method to determine topic assignments for the words in each of the M documents.

FIGS. 31 and 32 provide information about the beta distribution and the Bernoulli distribution using the same illustration conventions as used for the multinomial distribution and Dirichlet distribution of FIGS. 25A-B.

FIG. 33 provides pseudocode for the generator for the GLT-LDA method.

FIGS. 34A-E show derivations for the model probability and the conditional topic-assignment probability.

DETAILED DESCRIPTION

The current document is directed to automated methods and systems for categorizing events generated by instrumentation embedded in computational entities, including web pages. In a first subsection, a distributed computing system is described that generates, collects, and analyzes events. In a following subsection, methods and systems for event categorization, to which the current document is directed, are discussed.

Event Generation and Processing in a Distributed Computer System

It should be noted, at the onset, that the currently disclosed methods carry out real-world operations within physical systems and that the currently disclosed systems are real-world physical systems. Implementations of the currently disclosed subject matter may, in part, include computer instructions that are stored on physical data-storage media and that are executed by one or more processors in order to carry out website testing and to analyze results accumulated during website testing. These stored computer instructions are neither abstract nor characterizable as "software only" or "merely software." They are control components of the systems to which the current document is directed that are no less physical than processors, sensors, and other physical devices.

Overview of Website-Testing Systems and Other Service Systems

Figure 1:
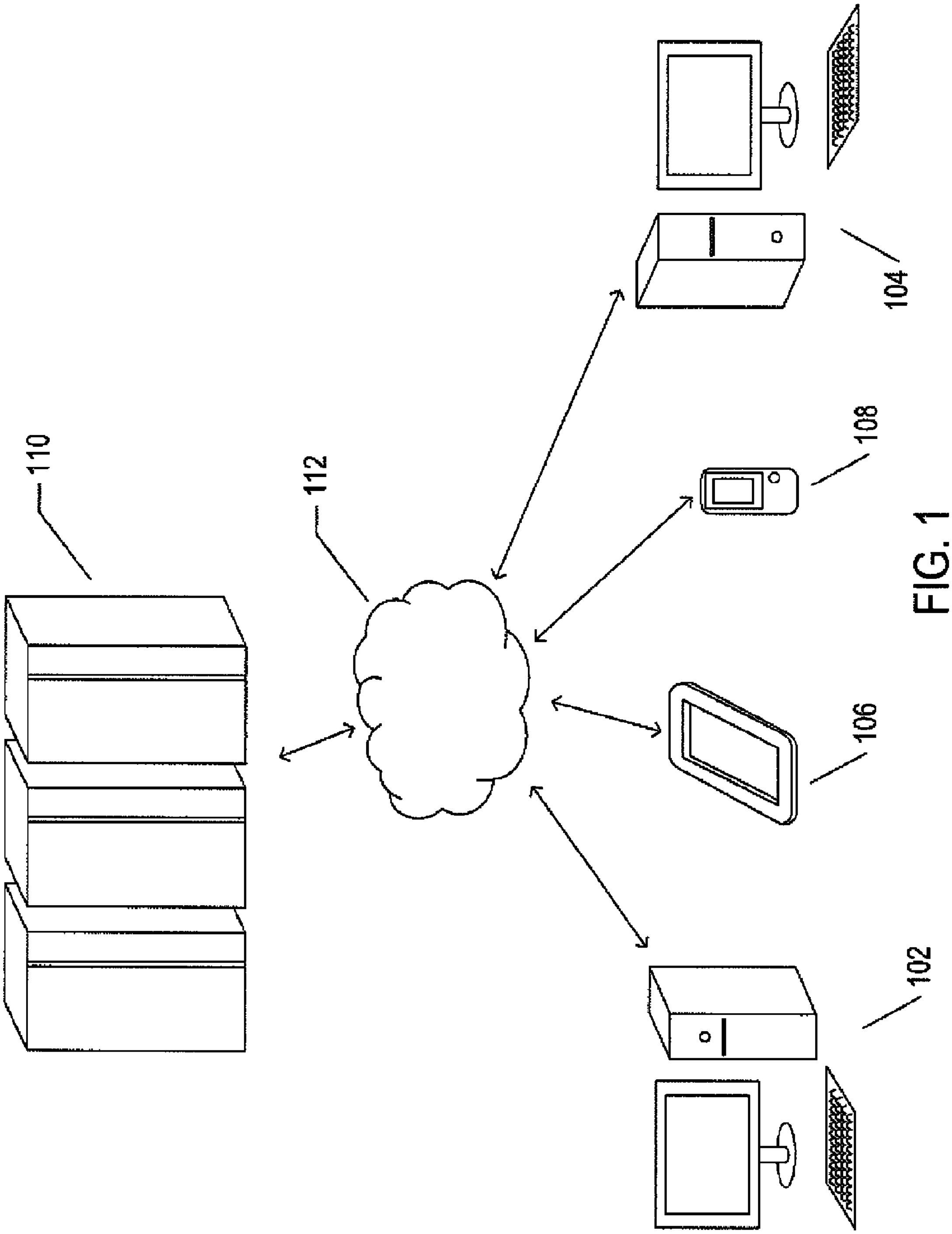
FIG. 1 illustrates an environment in which web analytics are conducted.

FIG. 1 illustrates an environment in which web analytics are conducted. Various users of a website employ a variety of different types of user devices, including personal desktop computers 102 and 104, electronic tablets 106, smart phones 108, and other such processor-controlled electronic devices to connect to a remote computer system 110 in order to access the pages of a website served by the remote computer system 110 through the Internet 112. Of course, each of the user devices, the remote computer system, and the Internet are extremely complex systems that would require thousands, tens of thousands, or more pages to describe in detail. As one example, a particular user device may access the websites served by the remote computer system through a local area network, various bridge and router systems, multiple wide-area networks, various routing systems, and a second local area network. In other cases, these systems may further include mobile-cell systems and/or public switched telephone networks.

The remote computational system 110 may be a single server computer, a larger system that includes multiple server computers, and an even larger, distributed system that may include a variety of different types of computer systems interconnected with local and wide-area networks, or server computers and other types of computers of a cloud-computing facility that provide virtual web servers and other virtual systems to a website owner. As another example, the remote computer system 110 may include hundreds of blade servers within blade-server enclosures, complex power supplies and other support components, network-attached mass-storage devices, including disk arrays, and many internal layers of control processes and application programs. In certain cases, the collection of data and the analysis of the collected data involved in web-analytics-based analysis of one or more tests may be carried out within the same remote computer system that serves web pages to users. In other cases, as discussed below, a separate web-analytics system carries out all or a portion of the website testing.

Figure 2:
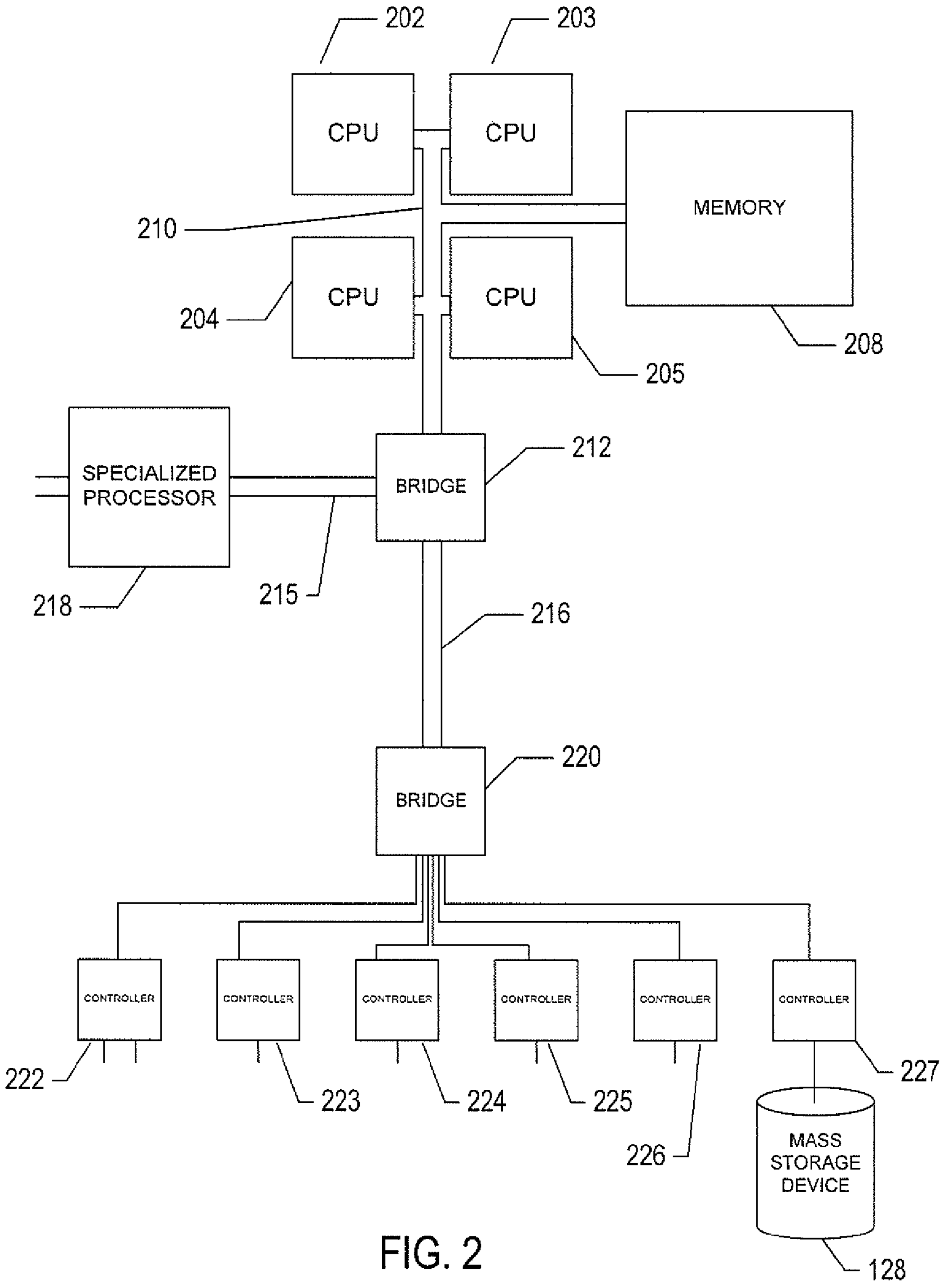
FIG. 2 provides a general architectural diagram for various types of computers.

FIG. 2 provides a general architectural diagram for various types of computers. The computer system shown in FIG. 2 contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational resources.

Figure 3:
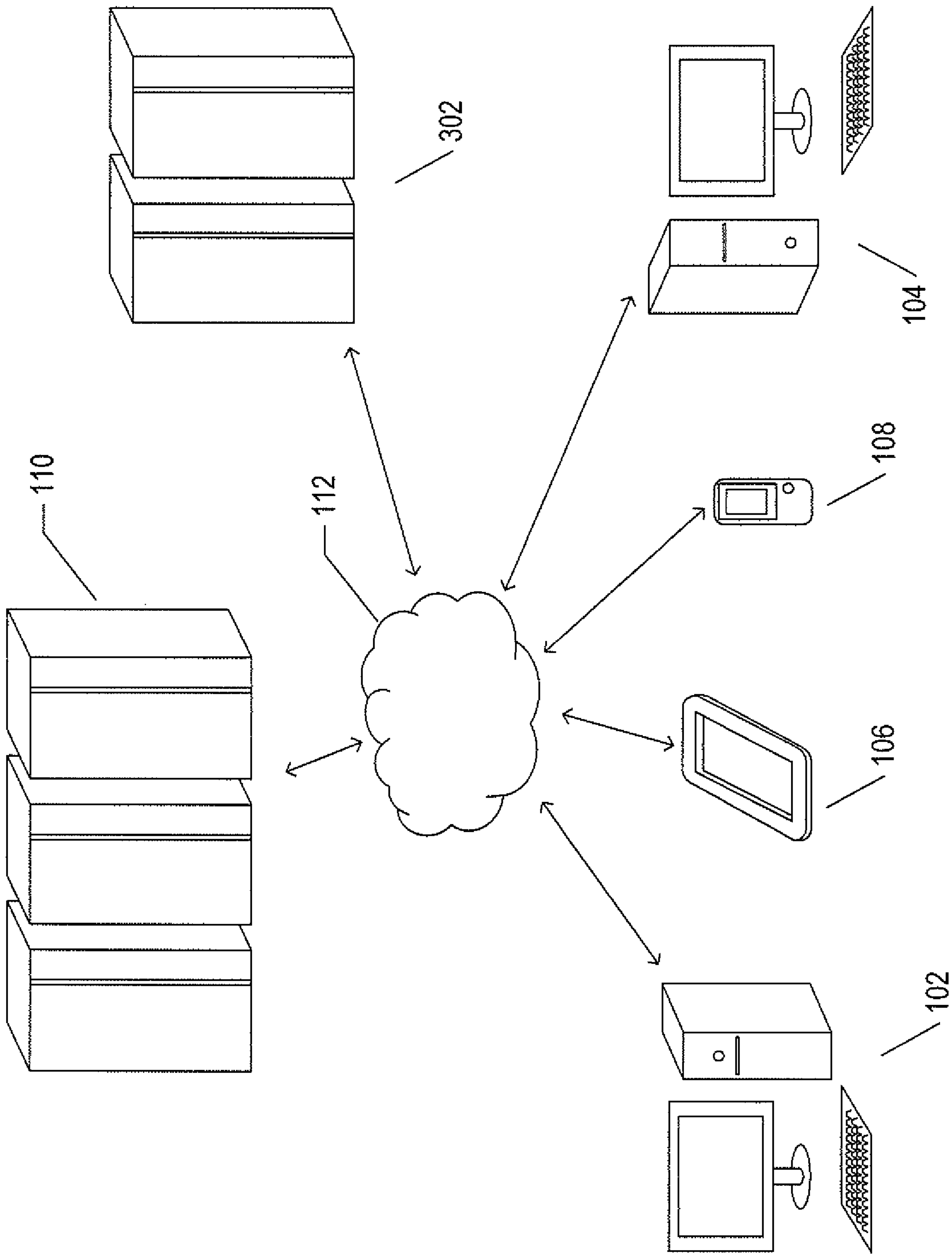
FIG. 3 illustrates a second type of environment in which tests are conducted to provide data for an automated web-analytics system.

FIG. 3 illustrates a second type of environment in which tests are conducted to provide data for an automated web-analytics system. FIG. 3 uses the same illustration conventions as used in FIG. 1 and shows the same different types of user devices 102, 104, 106, and 108, the remote computer system 110 that serves a website accessed by users using these devices, and the Internet 112. The computational environment also includes another remote computer system 302 that carries out all or a portion of website testing and analysis of test results. This remote system, just as the website-serving system 110, may be a single computer system, multiple interconnected computer systems, a geographically distributed computer system, virtual computers and data-processing facilities provided by a cloud-computing facility, and other types of computational facilities.

Figure 4A:
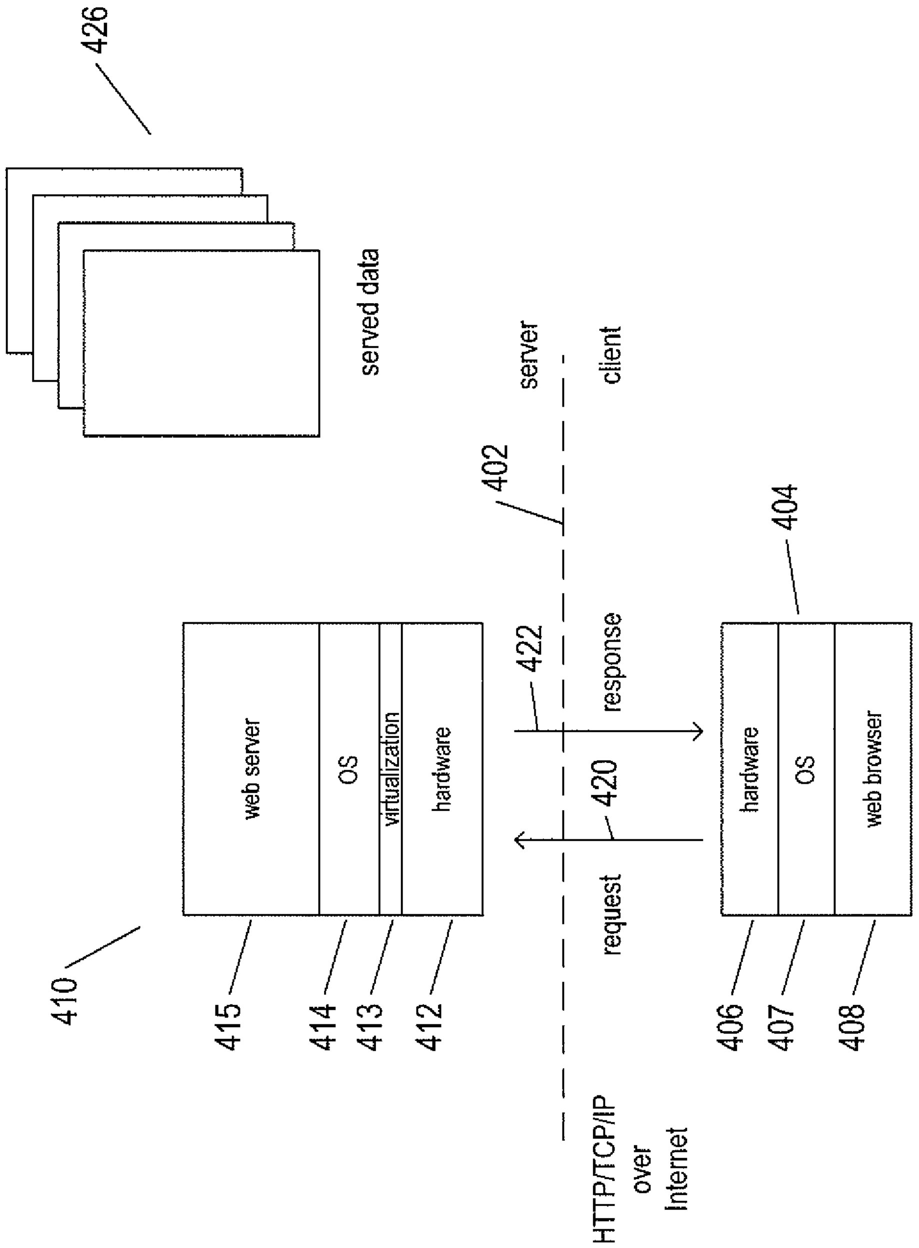
FIGS. 4A-C illustrate the exchange of information between a user of a website and the remote computer system that serves the website both under normal conditions as well as during testing of a website.
Figure 4B:
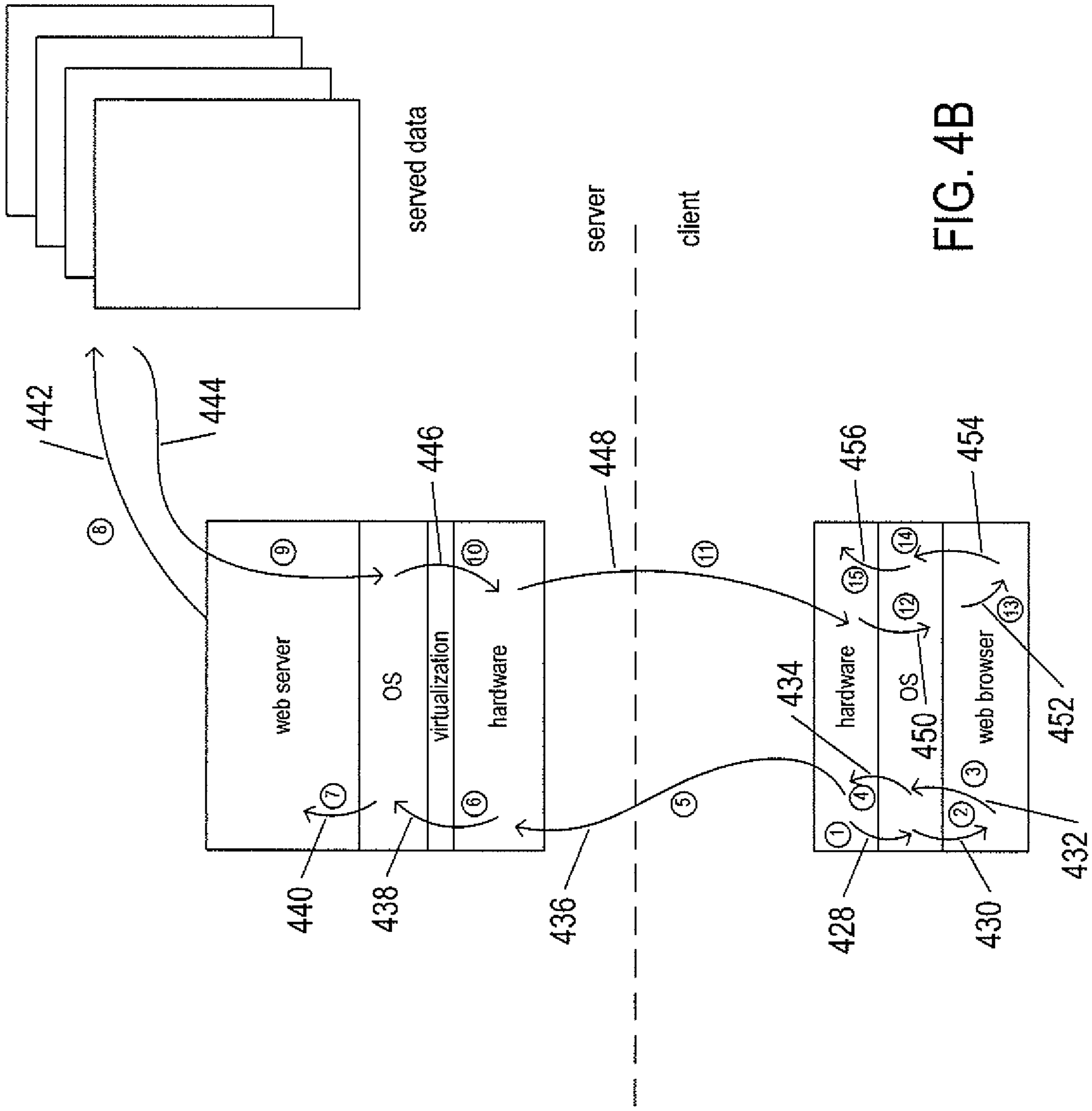
Figure 4C:
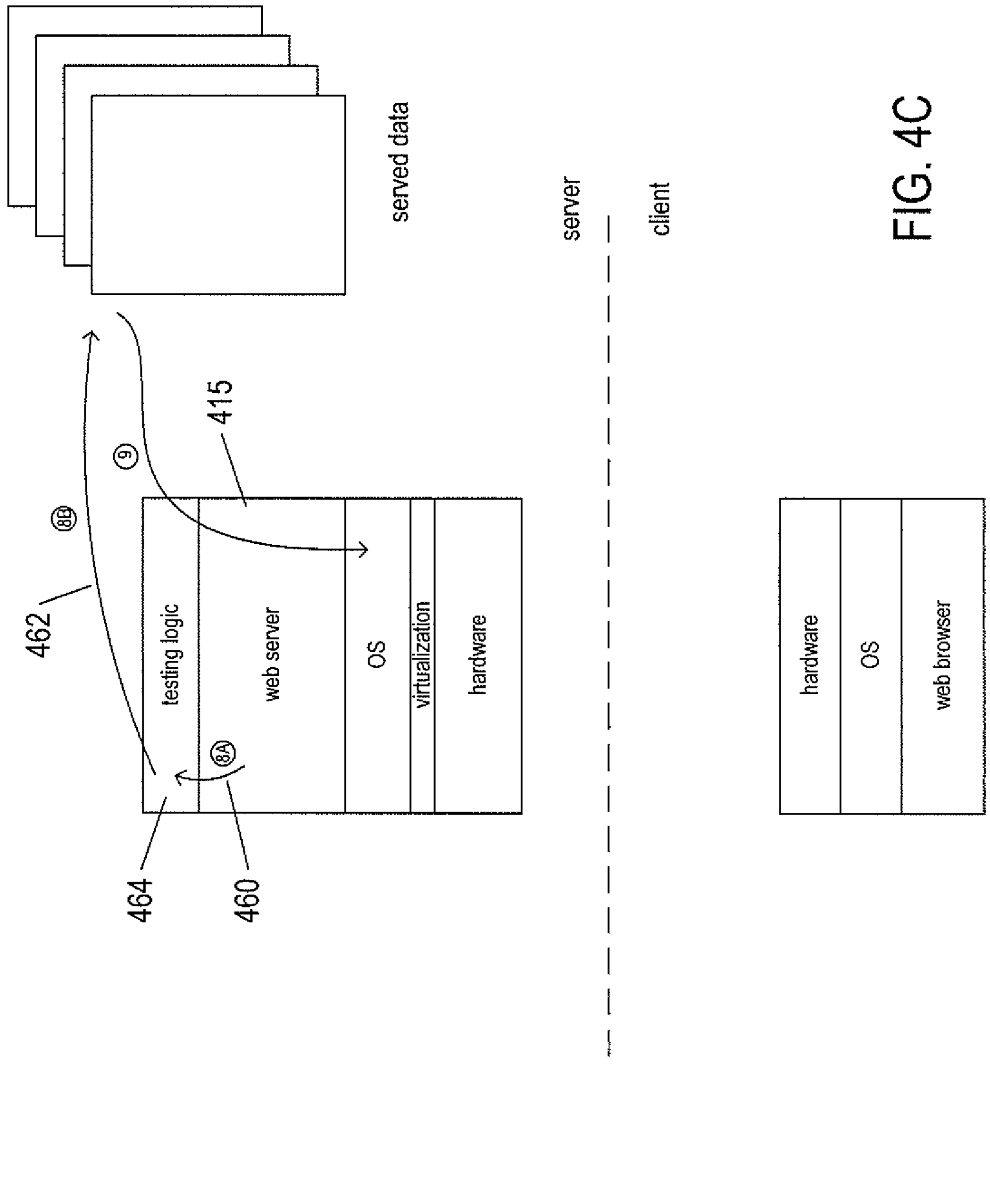

FIGS. 4A-C illustrate the exchange of information between a user of a website and the remote computer system that serves the website both under normal conditions as well as during testing of a website. FIG. 4A shows the basic components within the user device and remote web server. In FIG. 4A, dashed horizontal line 402 represents the boundary between the user or client device, below the dashed line, and the remote website-serving system, above the dashed line. The user device 404 is illustrated as having three fundamental layers: (1) a hardware layer 406; (2) an operating-system layer 407; and (3) a web-browser application program 408. The remote web-serving computer system 410 is similarly illustrated as having four fundamental layers: (1) a hardware layer 412; (2) a virtualization layer 413; (3) an operating-system layer 414; and (4) a web-server application program 415. The basic interaction between users, or clients, and the web-serving computer system is a client/server request/response protocol. In this protocol, clients initiate information exchange by making a request 420 to the server and receive the requested information in a response 422 transmitted from the web server to the client device. In order for the web browser of the client device to receive the information needed to display a particular web page to a user, a large number of request/response transactions may be carried out. Many different types of information may be requested by client devices and furnished by web servers, including hypertext markup language ("HTML") files, any of various different types of image files, such as jpg files, executable code, audio files, streaming video, and other types of data. Often, the client/server protocol used for website access is a logical stack of protocols described as HTTP/TCP/IP over the Internet, where HTTP is the high-level hypertext transport protocol, TCP is a lower-level transmission control protocol, and IP is the still-lower-level Internet protocol. However, for any particular client and web server, many additional protocol layers may be involved to provide the high-level client/server request/response communications between a user device and the website-serving computer system. In general, the website-serving computer system 410 also stores at least a portion of the data 426 that is exchanged with user devices in order to display web pages on the user devices.

FIG. 4B illustrates a generalized sequence of events that occur during a single request/response transaction between the client and server. FIG. 4B, and FIG. 4C that follows, uses the same illustration conventions as used in FIG. 4A. In the example shown in FIG. 4B, the request sent from the client to the server is initiated by a user input, such as the click of a mouse when the mouse cursor overlays a hyperlink. The user's mouse click is sensed by the mouse controller in a first step represented by arrow 428. Note that, in FIG. 4B, and in FIG. 4C that follows, each step is represented by a curved arrow that is additionally annotated with a step number to indicate the sequence of operations underlying the request/response transaction. Hardware detection of the mouse-click event results in an interrupt being sent to the operating system. The operating system fields the interrupt, in a second step 430, determines that the interrupt represents an event to be handled by the web browser application running within the client device, and notifies the web browser of the occurrence of the event through a software interrupt, asynchronous call back, or some other mechanism by which events are transferred from the operating system to the application program to which the events are related. In a third step 432, the web browser handles the mouse-click event, using the mouse-cursor position to determine that the mouse-click event was directed to a hyperlink and then formulates a request to send to the web server that serves the web page represented by the hyperlink and requests transmission of the request from the operating system by calling a system call for transmitting the request message. In general, there may be additional transactions between the client device and a DNS server in order for the IP address of the web-serving computer system to be identified so that the request message can be directed to the website-serving computer system. Those additional request/response transactions are omitted from FIG. 4B in the interest of clarity and simplicity of illustration.

The operating system then processes the request through numerous protocol layers and passes the processed request to the hardware, in a fourth step 434, which carries out several additional lower-level protocol-based processing steps before transmitting the request message to a communications media that results in the request message traversing the Internet and arriving at the web server, in a fifth step 436. In this case, the primary hardware component involved in the message transmission, aside from internal busses or serial connections, is a network interface controller or wireless interface controller. Within the web server, the message is received by a complementary hardware controller and passed, in a sixth step 438, to the operating system of the web server. The operating system processes the received message and, in a seventh step 440, transfers the message to the web-server application running on the web server along with some type of software interrupt or asynchronous call back to alert the web-server application that a new message is available for processing. The web-server application processes the message contents and determines that the message represents a request for the HTML file that encodes a particular web page that is represented by the hyperlink initially clicked by the user of the user device. The web-server application, in an eighth step 442 then retrieves the HTML file and creates a response message containing the file, in a ninth step 444 that the web-server application passes to the operating system. The operating system then applies various protocol layers and passes the processed response message to the hardware layer, in a tenth step 446 for transmission back to the client device. In many cases, although not shown in FIG. 4B, the various protocol layers executed within the operating system result in the response message being broken up into a sequence of data messages, each containing a portion of the HTML file, which are then transferred one after another to the client device in multiple steps, all represented by the single eleventh step 448 in FIG. 4B.

When the HTML file has been received, possibly through multiple low-level messages, and assembled into memory by the client hardware layer and operating system, in a twelfth step 450, the HTML file is passed to the requesting web-browser application in a thirteenth step 452. The web browser then processes the HTML file in order to generate a series of commands to the operating system, in a fourteenth step 454, that result in the operating system transmitting a large number of low-level display commands to the display device, in a fifteenth step 456 that result in display of the requested web page to the user on the client-device display screen. In many cases, during processing of the HTML file, the web-browser application may need to carry out many additional request/response transactions in order to fetch image files and other files that contain content displayed within the web page in addition to the basic web-page description contained in the HTML file.

FIG. 4C illustrates additional operations carried out within the web server in order to conduct website testing under certain types of website-testing-service implementations. The same actions that occur for general serving of a web page, illustrated in FIG. 4B, also occur during testing of the website. However, as shown in FIG. 4C, the eighth step (442 in FIG. 4B) is now expanded to include two separate steps 460 and 462 and the web-server application 415 includes, or runs in parallel with, an additional layer of testing logic 464. When the web-server application receives the request for a web page, the request is forwarded to the testing logic in step 460. The testing logic then determines, from the identity of the requesting client or client device and the identity of the web pages being accessed, whether the access to the web page represents a testing event or, in other words, whether the web page and requesting client represent a user access that falls under monitoring of events that together comprise a website test. If so, then the testing logic may access different content, in step 462, for return to the client device than the content that would be accessed for a non-test request for the web page. In other words, the testing logic may systematically alter the web page returned to the client device as a portion of an experiment conducted within a time interval corresponding to a test of the web page. The testing logic may also, in certain cases, consider the web-page access to be the start of a session during which other requests made by the same client device are monitored and combined together as a logical user session from which test results can be derived. For example, in a certain class of web-analytics experiments, the test data may include an indication of whether or not the user purchases a product or service during a session while the web page is under test, referred to as a "conversion" event when the user purchases a product or service during the session.

Thus, website testing can be carried out by testing logic included within the web server that serves the web pages under test. After the test period has been completed, or as the test data is being recorded by testing logic, various types of analytical processing may be performed on the test data to derive various types of analytical results.

In many cases, however, the testing of websites and the analysis of test data involves significant complexities and the development of large and complex testing and analysis methodologies. It has therefore become increasingly popular for website testing and the analysis of data collected during website testing to be fully or partially carried out by website-testing services that execute on different, discrete website-testing-service computer systems.

Figure 5A:
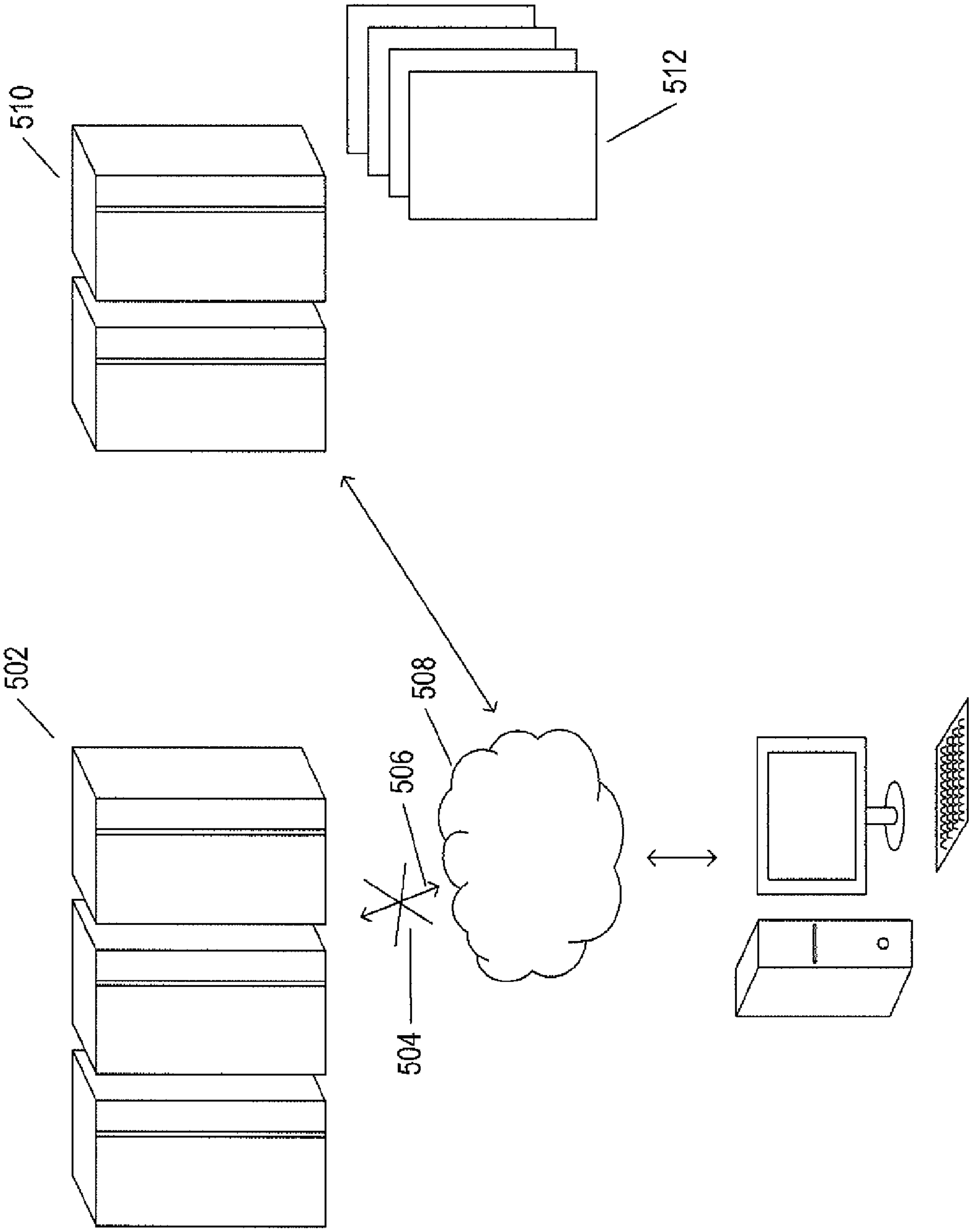
FIGS. 5A-C illustrate three of many different possible methods by which website-testing services carry out tests of web pages served by remote web servers.
Figure 5B:
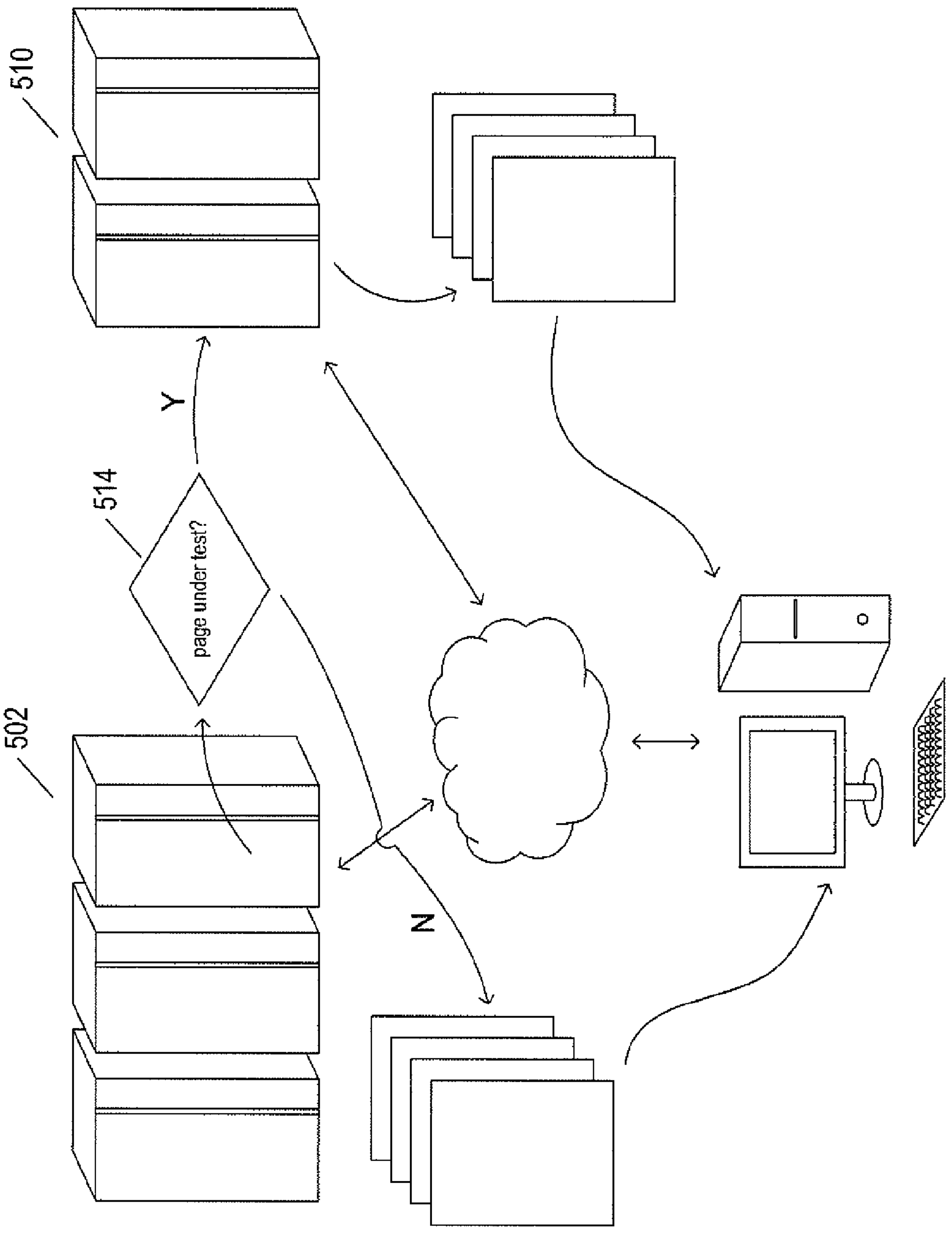
Figure 5C:
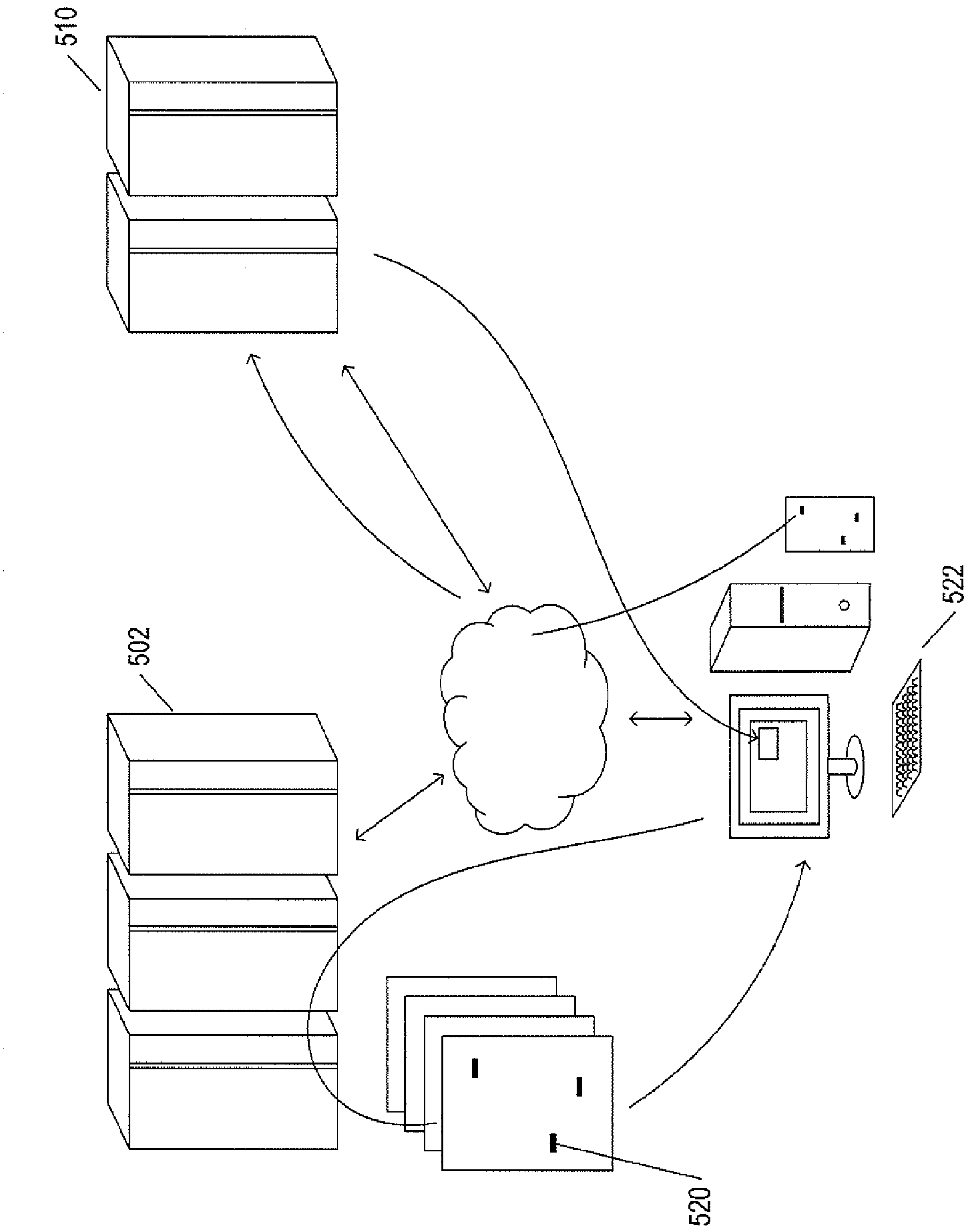

There are many methods for testing web pages by website-testing services. FIGS. 5A-C illustrate three of many different possible methods by which website-testing services carry out tests of web pages served by remote web servers. As shown in FIG. 5A, one approach is that, during the testing of a particular website, the web-server system 502 discontinues serving web pages, as indicated by the "X"-like symbol 504 overlying the double-headed arrow 506 representing request/response traffic between the web-server system 502 and the Internet 508. During testing, requests for web pages under test are redirected to the website-testing-service computer system 510, which serves the web pages under test to client devices in a fashion similar to that in which the web server 502 would normally serve web pages to requesting clients. In this case, the website-testing-service computer system 510 is provided, by the website owner, data for the web pages 512, including various alternative forms of web pages under test, as well as a test design so that the website-testing-service computer systematically provides altered web pages to clients and records client activities with respect to the web pages.

FIG. 5B illustrates a second approach to website testing. In this approach, client requests are initially forwarded to the web-server system 502. The web-server system includes logic to determine whether or not a requested page is current under test 514. When the web page is under test, then the request is forwarded to the website-testing-service computer system 510 which transfers the requested web page back to the client device. Otherwise, when the requested page is not under test, the page is returned to the requesting client device by the web-server system 502. There are many different variations of this general scheme involving various types of proxy servers and reverse proxy servers.

FIG. 5C illustrates yet an additional type of implementation of a website-testing service. In this approach, various tags, represented in FIG. 5C by the small dark rectangles, such as rectangle 520, within HTML files that encode web pages are introduced into the web pages by the web-server system. These tags indicate portions of the web page that are varied during testing of the web page. When a client device 522 requests the web page, the request is handled by the web-server system 502 in the normal fashion, but the client device receives a tagged web page. As the browser on the client device begins to process the HTML file corresponding to a requested web page under test, the browser identifies and processes the tags by requesting the website-testing-service computer system 510 to return an encoding of the object represented by the tag for display by the browser. The website-testing-service computer system also can use information transferred by the client-device browser in order to monitor user activities, within user sessions, related to web pages under test and collect and process the test data to provide various types of analysis.

Figure 6:
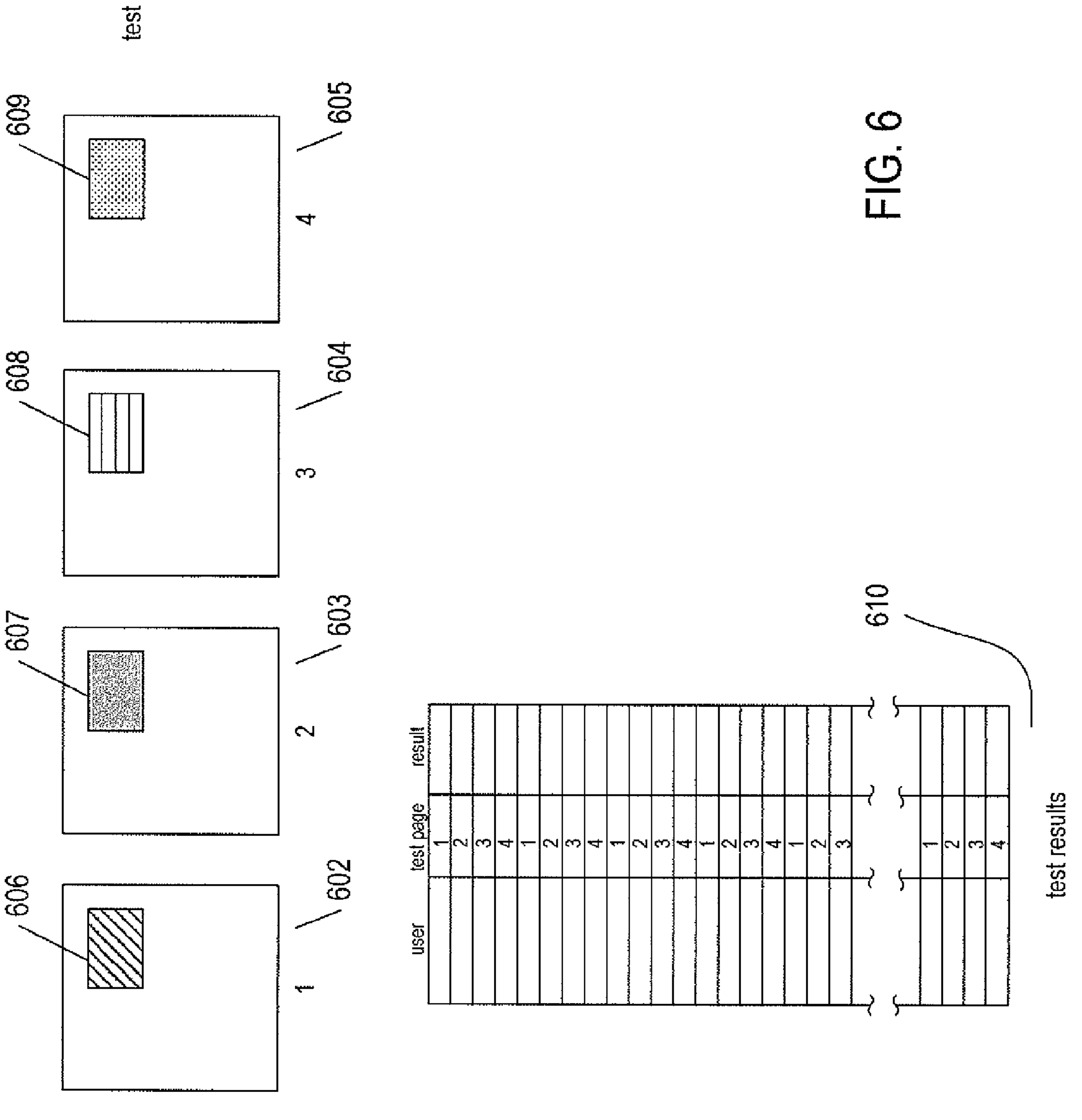
FIG. 6 illustrates single-factor testing.

There are two different fundamental types of testing that are commonly carried out on web pages. A first type of test varies a single object, region, or feature of a web page and is referred to as a "single factor" test. FIG. 6 illustrates single-factor testing. As shown in FIG. 6, the test may involve serving each of multiple different variants of a single web page 602-605. Each web page includes a particular object or region 606-609, the contents of which is varied to generate the multiple web-page variations. Then, a website-testing service or website-testing logic incorporated within a web server provides generally equal numbers of the different web-page variants to users who access the page during a testing interval, often randomly selecting a particular web-page variant to return to each next user who accesses the web page. Ultimately, the accumulated test results can be thought of as comprising a test-result table 610. In the example results table shown in FIG. 6, each row of the table represents an observation, and includes an indication of the user who accessed the test page, an indication of the particular test-page variant served to the user, and a result. As one example, the result may be a binary indicator that indicates whether or not the user completed a retail transaction within a session or time interval following access of the web page. There are many other different types of results that may be derived during web-page testing.

Figure 7:
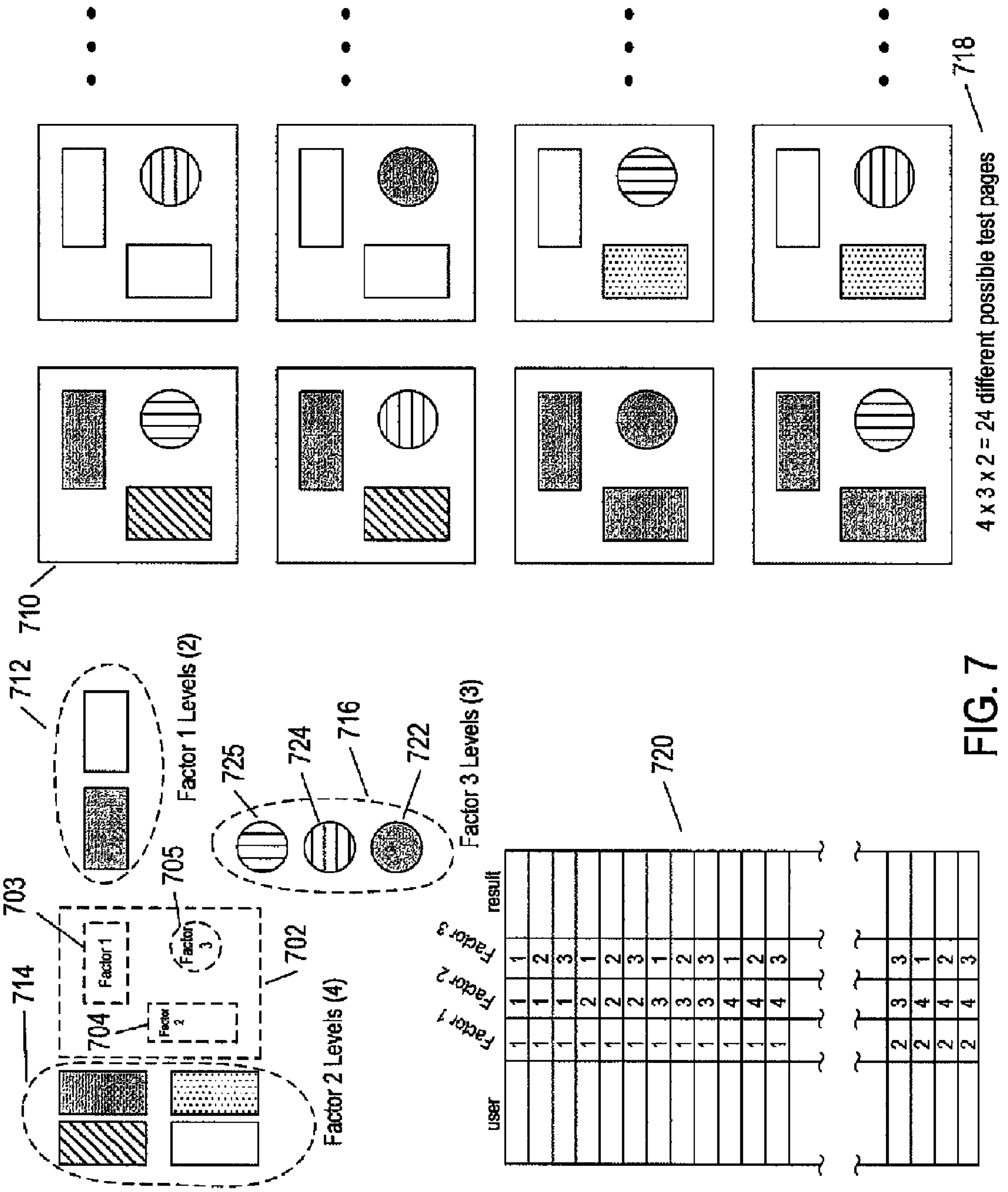
FIG. 7 illustrates a second type of web-page test, referred to as a "multi-factor/multi-level" test.

FIG. 7 illustrates a second type of web-page test, referred to as a "multi-factor/multi-level" test. In the second type of web-page testing, the web page being tested 702 includes multiple items, objects, or features 703-705 that are systematically varied to produce a relatively large number of different web-page variants, a portion of which 710 are shown in the right-hand portion of FIG. 7. The first object that is varied, factor 1 (703 in FIG. 7), includes two different variants, or levels 712, the second item or object within the web page that is varied, factor 2 (704 in FIG. 7), includes four different variants or levels 714, and the third item or object that is varied, factor 3 (705 in FIG. 7), includes three different variants or levels 716. As a result, there are 4×3×2=24 different possible test-page variants 718. Again, a website-testing service or website-testing logic embedded within the web server randomly selects a web-page variant from among the 24 different possible web-page variants to return to each next accessing user during a test interval, and collects observations or results that can be thought of as comprising a test-results table 720. In this test-results table, each row specifies an observation and includes an indication of the user, the level of each factor in the web-page variant served to the user, and a test result.

The goal of website testing is often to try various types of variants in a systematic fashion in order to identify factors that appear to be relevant with respect to a measured result as well as to identify particular levels of significant factors that positively contribute to desired results. For example, in the web-page-testing example of FIG. 7, it may be the case that of the three factors, only factor 3 significantly impacts whether or not users end up completing retail transactions. Furthermore, it may be determined that a solid-colored factor 3 (722 in FIG. 7) results in a larger percentage of completed retail transactions than either of the striped factor 3 variants 724-725. Thus, website testing may allow the website owner to determine that, by including a solid-colored factor 3 object in web pages, a greater proportion of accessing users will end up completing retail transactions through the website. Alternatively, the result of the experiment illustrated in FIG. 7 may encourage the website owner to devise additional tests to test a greater number of possible variants for factor 3, having concluded that factor 3 is the significant factor that determines whether or not retail transactions are completed by those who access the web page. Note that, although factor levels are illustrated in FIG. 7 as different colors or patterns within a rectangular object, factor levels may include one or more of a wide variety of differences, including differences in textural content of features, different images, different colors and shading, different font sizes, and many other such differences.

Figure 8:
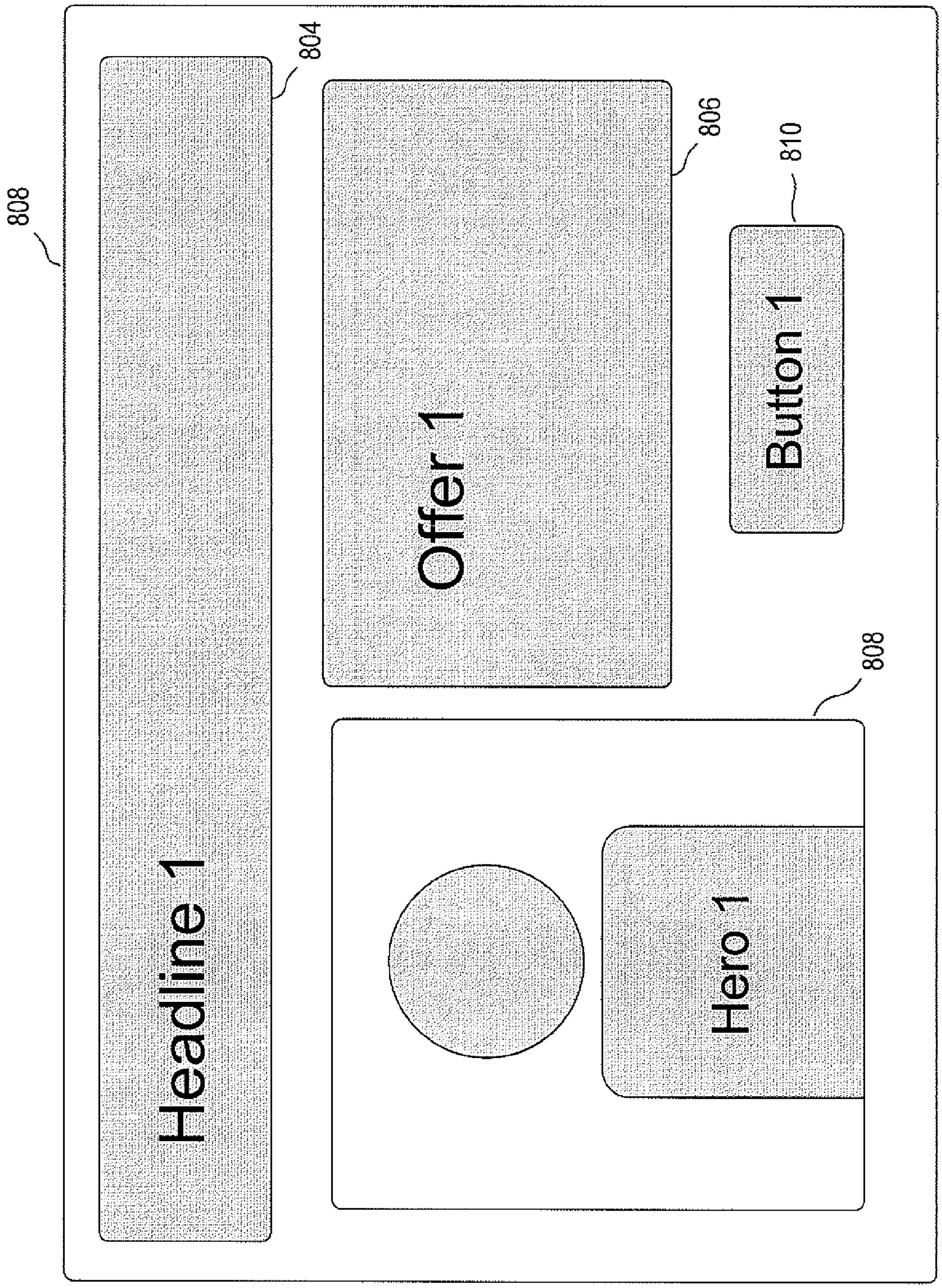
FIG. 8 shows a simple, exemplary web page.

Collection of Information by Instrumentation and Supplementation of Collected Information FIG. 8 shows a simple, exemplary web page. A web page is described by an HTML file, discussed below, which is processed by a web browser executing on a computer in order to generate a web page, as shown in FIG. 8, that is displayed to a user on a display device. The exemplary web page 802 includes a headline graphic 804, an offer graphic 806, a hero graphic 808, and a button graphic 810. The exemplary web page is subsequently discussed in the context of tests and experiments in which altered versions of the web page are provided to users of the web server that serves the web page in order to test the effects of modifications to the web page.

FIG. 9 shows the contents of an HTML file that encodes the exemplary web page shown in FIG. 8 and that includes simple modifications. The modifications, used to virtually incorporate a testing service into a website are discussed below, with reference to FIG. 14 FIG. 13.

A complete discussion of HTML is beyond the scope of the current discussion. In FIG. 9, portions of the HTML file are correlated with features in the displayed web page shown in FIG. 8. In addition, general features of HTML are illustrated in FIG. 9. HTML is hierarchical, in nature. In FIG. 9, double-headed arrows, such as double-headed arrow 902, have been drawn to the left of the HTML code in order to illustrate tags and tag scoping within the HTML file. In general, HTML statements are delimited by a pair of tags, and are hierarchically organized by scope. For example, an outermost statement begins with a first tag of a tag pair that begins with the text "<html xmlns=" (904 in FIG. 9) and ends with a last tag of the tag pair that begins with the text "</HTML" (906 in FIG. 9). The scope of outermost statement encompasses nearly the entire HTML code. The double-headed arrow 902 at the left of the HTML code, which represents the scope of this statement, spans the entire HTML file. A second-level that begins with the first tag of a tag pair "<head>" 908 and ends with the last tag of the tag pair "</head>" 910 spans a first portion of the HTML file, as indicated by double-headed arrow 912, and a second statement bounded by the first and last tags of a tag pair "<body>" 914 and "</body>" 916 span a second portion of the HTML file, indicated by double-headed arrow 918. By examining the tags within the exemplary HTML file, shown in FIG. 9, and the double-headed indications of the scope of tag-delimited statements, the hierarchical nature of HTML can be readily appreciated.

Figure 10:
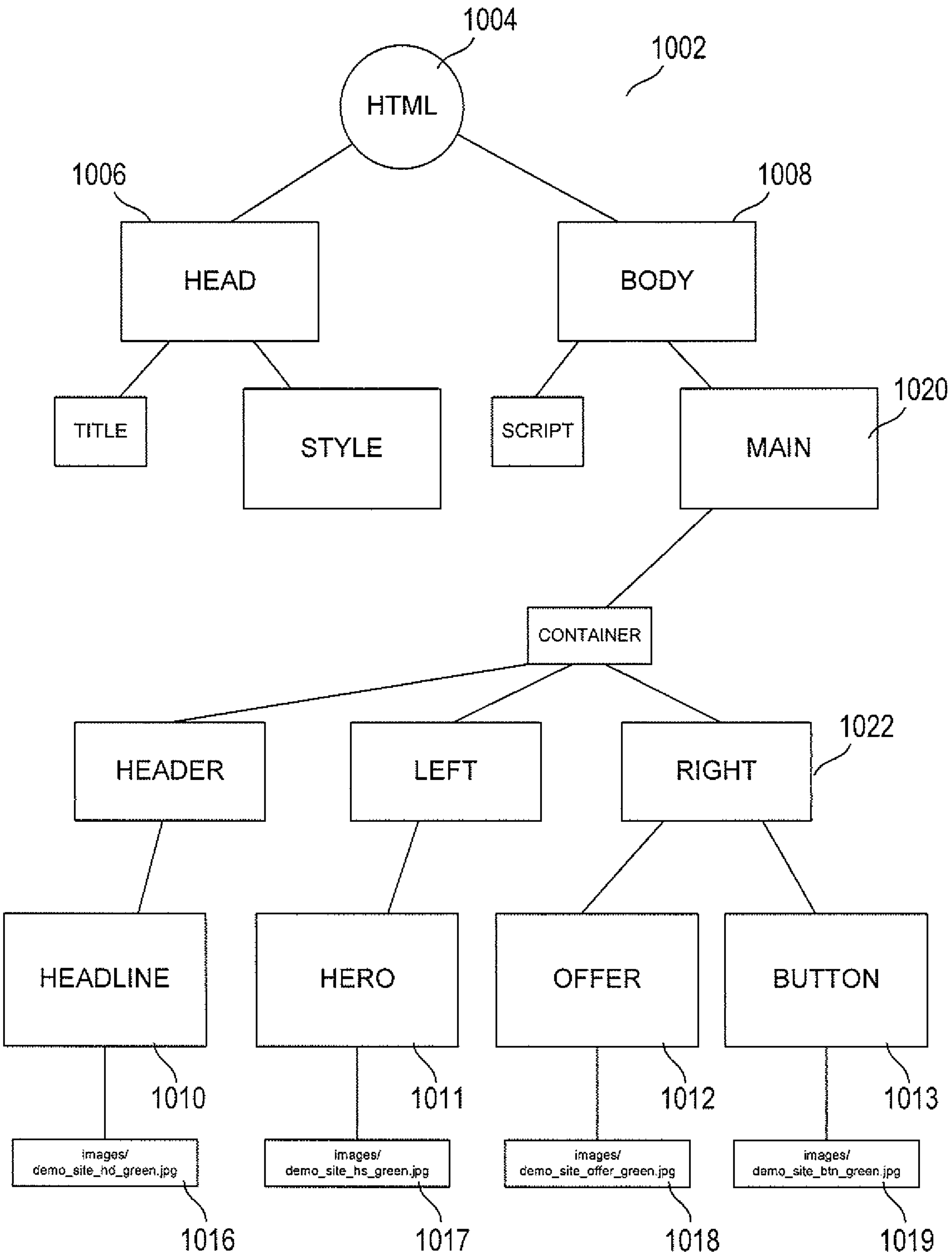
FIG. 10 provides a tree-like representation of the contents of the exemplary HTML file shown in FIG. 9.

FIG. 10 provides a tree-like representation of the contents of the exemplary HTML file shown in FIG. 9. The tree 1002 shown in FIG. 10 is constructed from the double-headed arrows that annotate the HTML code, in FIG. 9, that span the scopes of tag-delimited statements in the exemplary HTML file. For example, the root node 1004 corresponds to double-headed arrow 902, and the second level "head" 1006 and "body" 1008 nodes correspond to double-headed arrows 912 and 918 in FIG. 9, respectively. Note that, at the very bottom of the tree representation of the HTML file, shown in FIG. 10, the four leaf nodes 1016-1019 represent the four features 804, 806, 808, and 810 of the displayed web page encoded by the exemplary HTML file, shown in FIG. 8. Each of these nodes is essentially a reference to an image file that contains a jpeg image of the corresponding web-page feature. The head statement, represented by node 1006 in FIG. 10, includes formatting information, references to highest-level resource-location directories, and a great deal of additional information that is used by a browser to plan construction of a displayed web page. The body statement, represented by node 1008 in FIG. 10, includes references to image files, text, and other features that are rendered by the browser into displayed features of the web page. Intermediate nodes include identifiers, particular met-data information, and references to scripts that are downloaded and run by the web browser during web-page rendering and/or display.

As a specific example, node 1016, a direct and only descendant of the node labeled "headline" 1010 in FIG. 10, corresponds to the headline feature 804 displayed in the exemplary web page shown in FIG. 8. This node also corresponds to double-headed arrow 920 in FIG. 9. The statement "<img src="images/demo_site_hd_green.jpg" indicates that the displayed object is encoded as a jpeg image "demo_site_offer_green.jpg" that can be found in a file-system sub-directory "images."

In order to transform an HTML file into a displayed web page, a web browser constructs a tree-like binary-encoded data object referred to as a "document object model" ("DOM.") The exact contents and structure of a DOM is beyond the scope of the present document. However, implementations of testing and analytics services may rely on standardized DOM-editing interfaces that provide routines to identify nodes and subtrees within a DOM and to edit and modify identified nodes and subtrees. Once a browser has created a DOM from the exemplary HTML file shown in FIG. 9, DOM-editing routines can be used to locate the node in the DOM corresponding to the node "headline" 1010 in FIG. 10 and replace or modify that node to reference a different image. Following modification, the web browser would then display a modified web page in which the headline image 804 in FIG. 8 is replaced by a different image. To effect more dramatic changes, an entire subtree of a DOM, such as the subtree rooted by a node corresponding to the node "right" 1022, can be removed or replaced, to change groups of display features. While various testing and analytics systems, discussed below, uses DOM tree modification techniques, other types of modification techniques provided by interfaces to other types of binary representations of web pages may be used, in alternative implementations. The DOM is only one of many possible binary representations that may be constructed and employed by web browsers.

Another feature of the exemplary HTML file shown in FIG. 9 is that the various features displayed in FIG. 8 are, in HTML, wrapped by tag-delimited identifiers. For example, the "headliner" tag indicated by double-headed arrow 920 and by node 1010 in FIG. 10 is an identifier for the headline-image-reference statement 922. Alphanumeric identifiers, such as the identifier "headliner," are introduced into an HTML file in order to give easy-to-understand and easy-to-use labels or handles for various objects, particularly objects that correspond to displayed features in a web page. Although objects can be easily identified in this manner, other methods for identifying objects within an HTML file, as well as corresponding nodes of DOM trees and other such binary representations of a rendered page, can be used to reference display objects.

Figure 11A:
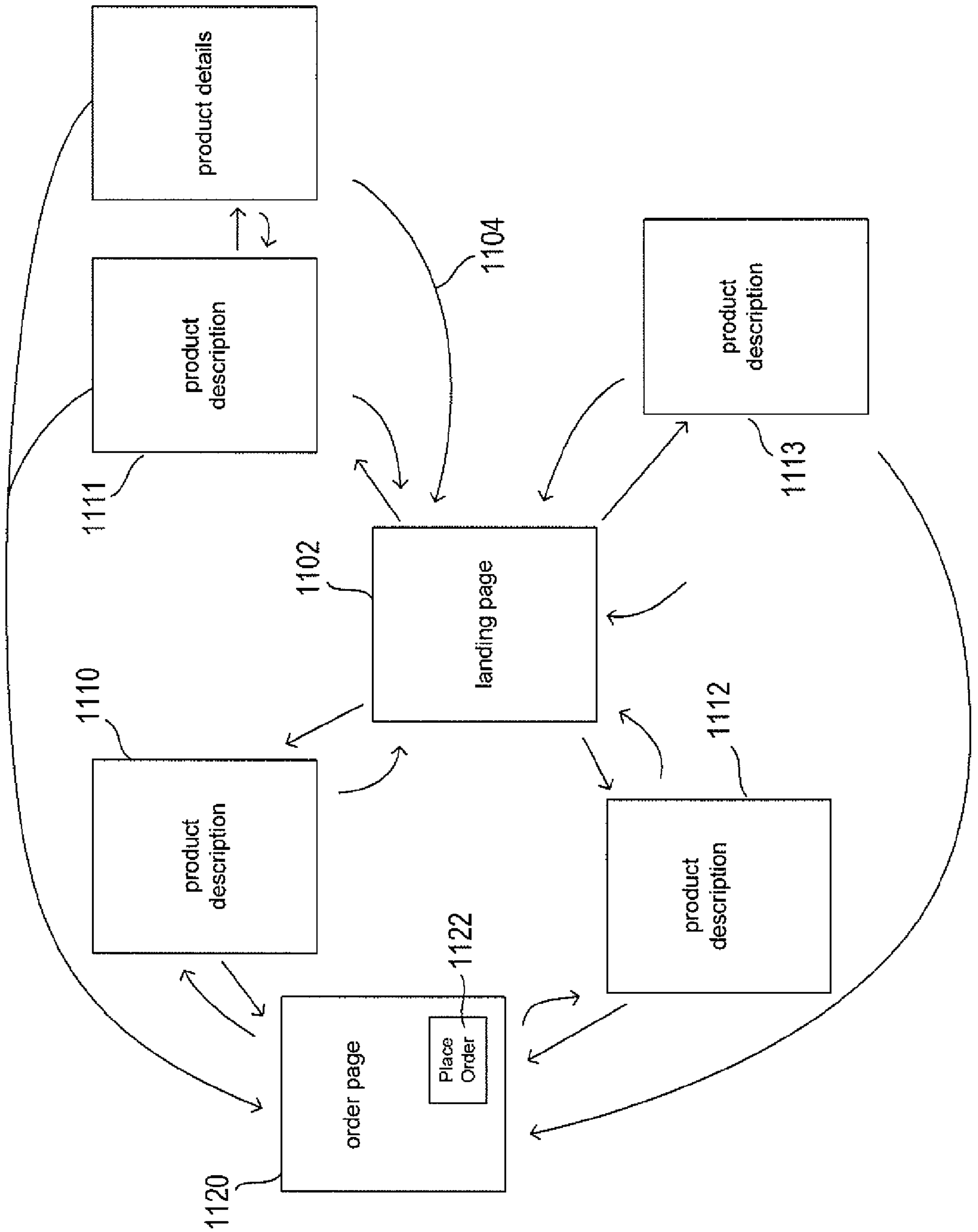
FIG. 11A illustrates a simple web site comprising seven web pages.

FIG. 11A illustrates a simple web site comprising seven web pages. Each web page, such as web page 1102, is represented by a rectangle in FIG. 11A. Curved arrows, such as curved arrow 1104, indicate navigational paths between the web pages. Accessing the web site illustrated in FIG. 11A, a user generally first accesses a landing page 1102 as a result of clicking a link provided by another web page, such as a web page provided by a search engine, or provided in a list of bookmarked links by a web browser. The landing page is often, but not necessarily, a home page for the website. A home page is a central portal for access to all of the remaining web pages in the web site. In general, a user navigates through the web site by clicking on displayed links embedded in web pages. For example, the web site illustrated in FIG. 11A is a retailing web site. The landing page provides links to four different pages 1110-1113 that provide product descriptions for four different products. A user, after viewing the landing page 1102, may click a link in order to navigate to a display of a product-description page 1110. In the exemplary web site shown in FIG. 11A, a user may subsequently navigate from a product-description page or product-details page to a central order page 1120 that contains a button or feature 1122 to which the user can input a mouse click in order to order one or more products. In certain cases, web sites may comprise a single page and, in other cases, a web site may comprise tens to hundreds or more pages, linked together in a network-like graph describing various navigational paths between web pages.

An example application of web-site testing would be to monitor access, by users, of the web pages shown in FIG. 11A in order to attempt to determine how often users end up navigating to the order page and clicking the place-order button 1122. One might then modify one or more of the pages, and again monitor users' access to the pages and subsequent input to the place-order button 1122. In this way, by testing collective user response various alternative web pages, web-site developers and managers may be able to determine an optimal set of web pages that provides the highest ratio of inputs to the place-order button 1122 to user accesses of the landing page 1102. In testing parlance, clicking the place-order button 1122, in the exemplary web site shown in FIG. 11A, is, in this example, considered to be a conversion event. One goal of optimizing the web site might be to increase the percentage of users clicking on the place-order button 1122 after initially accessing the landing page 1102. However, conversion events may be arbitrarily defined, and there may be multiple conversion events for a particular web site. Optimization of a web site may also involve multiple, often at-least partially contradictory goals. One goal may be to increase the number of accesses to any page other than the landing page by users who have initially accessed the landing page. Another goal may be to increase total accesses to the landing page, regardless of subsequent page accesses by users accessing the landing page. Another goal may be to obtain maximum possible conversion rates, even at the expense of decreasing the overall rate of page accesses.

Figure 11B:
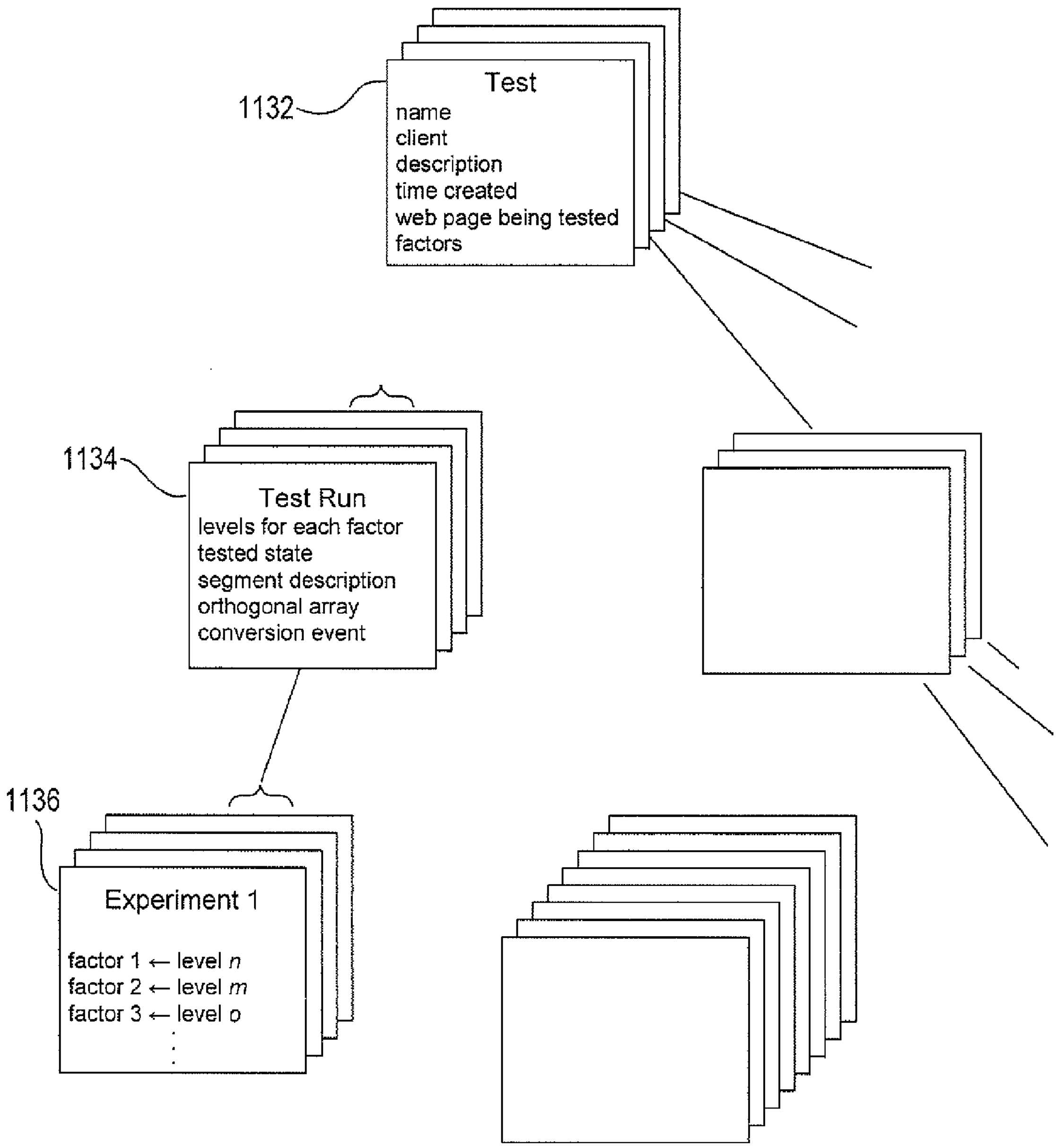
FIG. 11B illustrates the data and data structures that define tests, test runs, and experiments.

FIG. 11B illustrates the data and data structures that define tests, test runs, and experiments. A testing service may, at any given time, carry out a large number of different tests for many different client web-site-based organizations. Each test is defined by a test record, such as test record 1132 in FIG. 11B. Information contained in the test record includes an alphanumeric name of the test, an identifier for the client on behalf of whom the test has been created, a description of the test, an indication of the time that the test was created, an indication of the web page that is tested by the test, and a list of the factors that may be involved in any particular test run associated with the test. Note that the factors can be specified by the identifiers associated with features or objects displayed in the web page. For example, referring to FIGS. 8-10, a list of factors for a test of the exemplary web page shown in FIG. 8 may include the alphanumeric strings: "headline," "hero," "offer," and "button."

Any particular test may be carried out over a series of test runs. For example, each test run may be carried out at a different time, with respect to a different segment of users, and may test a different array of features and feature levels. Thus, each test record, such as test record 1132 in FIG. 11B, may be associated with one or more test-run records, such as test-run record 1134 in FIG. 11B. Test-run records include information such as the levels to be used for each factor, with the levels specified as URLs, or other references to images and other resources, or as text strings or other data directly displayed by the browser, a current state of the test run, a description of the segment to which the test run is directed, an indication of the particular orthogonal-array basis or other test design for the test run, and an indication of one or more conversion events for the test run. Finally, using an orthogonal-array basis or other test design selected for the test run, a test run is associated with a set of experiments, such as experiment 1136 in FIG. 11B. Each experiment corresponds to an altered web page that is displayed to users during the test run. An experiment is essentially defined by associating each factor, tested in the test run, with a particular level, or referenced resource, according to a matrix of test pages generated by the orthogonal-array basis or other test design selected for the test run.

Figure 11C:
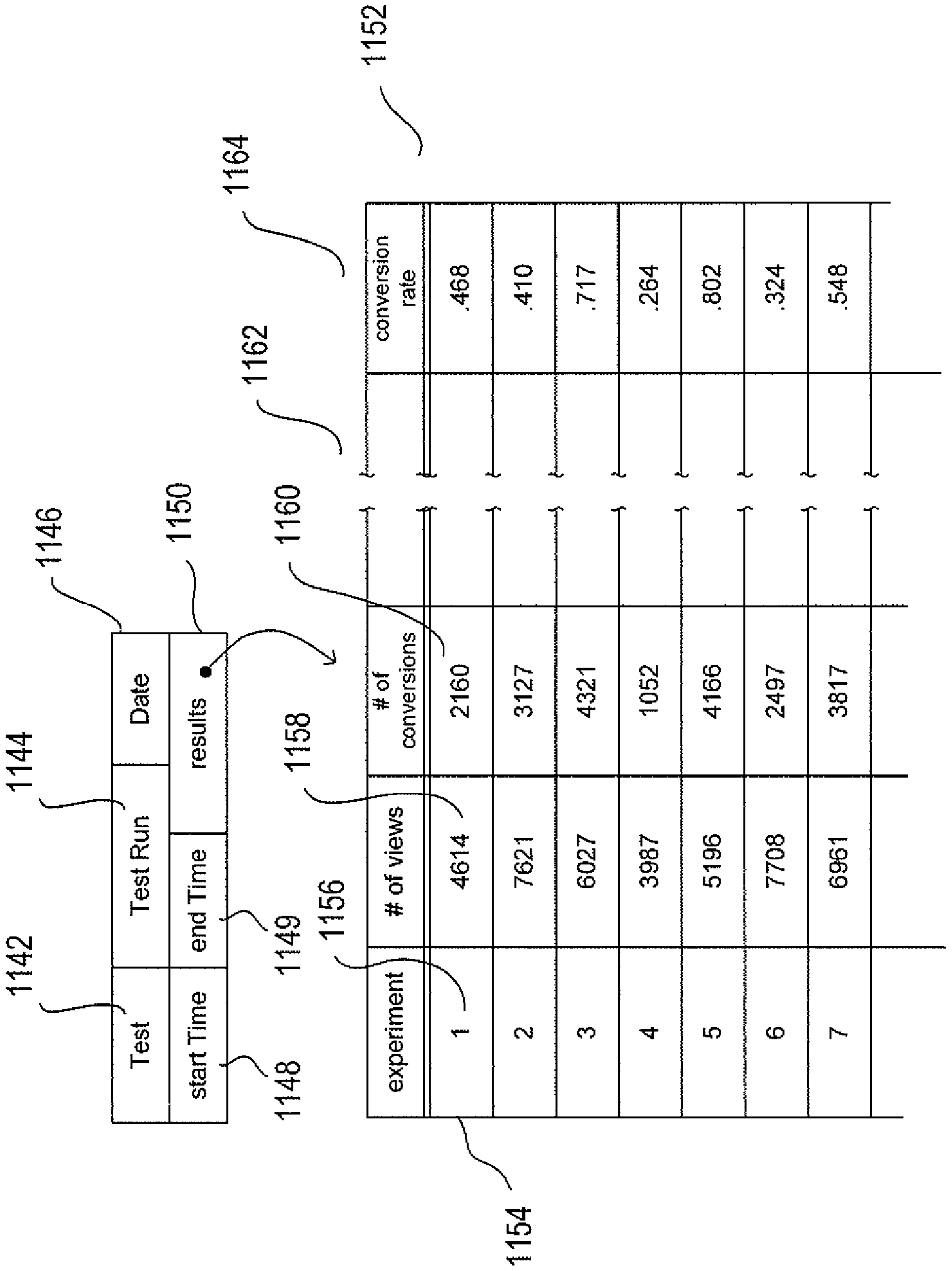
FIG. 11C illustrates the nature of the statistics, or test results, that are collected for a particular test run.

FIG. 11C illustrates the nature of the statistics, or test results, that are collected for a particular test run. The results include indications of the test 1142 and test run 1144, the date on which the test run was conducted 1146, a start time and an end time for the test run 1148-1149, and a reference 1150 to a results table 1152 in which test results are tabulated. The test results table includes a row for each experiment associated with the test run, such as row 1154 in experimental-results table 1152. The row includes an indication of the experiment to which the row corresponds 1156, a count of the number of the times that the page corresponding to the experiment was accessed by a user of an active segment 1158, an indication of the number of times that a user who accessed the test page generated a corresponding conversion event 1160, other similar numerical information in additional columns 1162, and, finally, a computed conversion rate 1164 for each experiment. The test results shown in FIG. 11C are but one example of the type of statistics and data that can be collected during a test run. Different or additional statistics may be collected by different implementations of testing and analytics, or according to different test configurations created by test-service clients.

There are many different possible ways of testing a web server in order to accumulate test results, discussed above with reference to FIG. 11C, for tests defined for particular web pages and factors associated with those web pages, as discussed above with reference to FIG. 11B. One method would require the web server to design a test by creating all or a subset of possible alternative test pages and to then develop a test-page-serving system that would execute concurrently with, or as part of, the web server on an intermittent or continuous basis. As discussed above, testing methods and systems that require the web server to develop and run tests may be prohibitively expensive, both in time and resources, for web-site owners or web-site-based organizations. Furthermore, such testing methods can inadvertently cause serious financial losses and other non-financial damage to a web site. For example, were the test pages improperly constructed or served, sales or other activities generated by real-time users may be lost and, in worst cases, the web site could potentially lose business from particular customers and users altogether. Real-time testing additionally involves significant security risks. A malicious hacker or employee might be able to alter the test system to display fraudulent or offensive test pages, for example. Finally, similar to problems encountered in a variety of physical and behavioral systems, poorly or improperly design tests may so perturb the system being tested that the statistics collected from the tests are meaningless or, in worst cases, lead to false conclusions. For example, a poorly designed test engine may introduce significant delays in web-page service to customers or users. As a result, the conversion rate measured during a test run may fall precipitously, not because of particular alterations made to test web pages, but instead because the significant time delay encountered by users for whom the test page is constructed and to whom the test web page is transmitted. For these, and many other reasons, web-site-based-organization test design and execution can be undesirable and, in worst cases, disruptive and damaging to the web-site-based organization.

An alternative approach involves using a third-party testing service, in tandem with the web server that serves the web site to be tested. However, simply conducting tests by a third-party server does not guarantee that the many pitfalls and disadvantages discussed above with respect to web-site-based-organization test design and execution are necessarily avoided. In fact, in many cases, the pitfalls and disadvantages discussed in the preceding paragraph may be exacerbated by third-party testing of web sites and web servers. For example, in the case that a test web page, requested by a customer, needs to be prepared by the third-party server, in response to a request generated by the web site as a result of a user request for the web page being tested, test-page serving may be significantly delayed, deleteriously perturbing the users' interaction with the web server to the point that the test statistics end up meaningless or misleading. As another example, security issues may be compounded by distributing testing tasks between a web-server computer system and a third-parting testing server. Currently discussed implementations employ an array of techniques and features that address these pitfalls and disadvantages, and that provide minimally intrusive and cost-effective testing for web sites and web servers.

FIGS. 12A-H illustrate a general method and system for web-site testing. FIGS. 12A-H all use the same illustration conventions, in which large rectangles 1202, 1206, 1212, and 1216 represent a client computer, client web server, web-server customer, and a testing service. The client computer and client web server are operated by a web-site owner or organization that is a client of the testing service. The web-server customer is a user who accesses a web site served by the client web server.

Figure 12A:
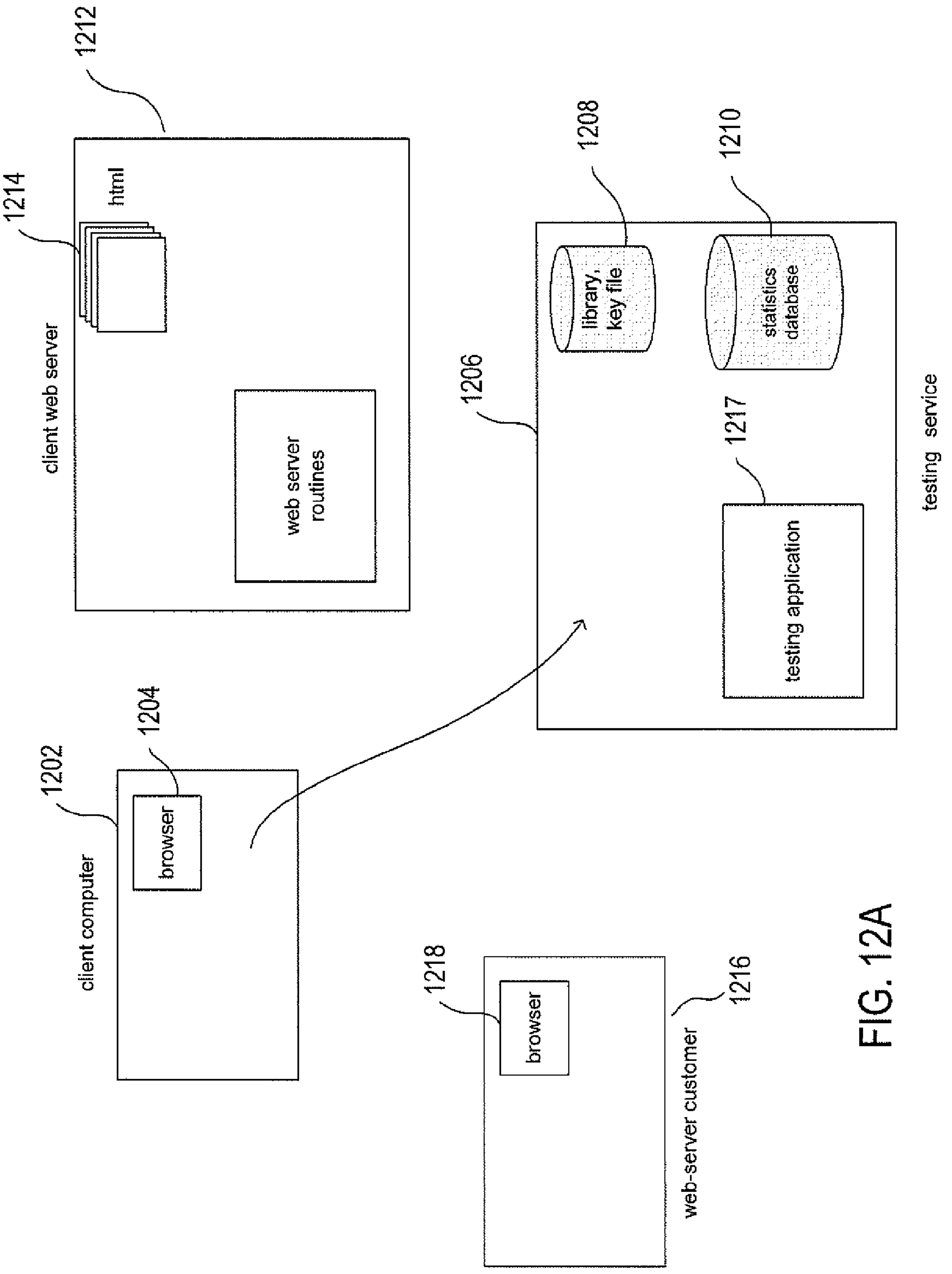
FIGS. 12A-H illustrate a general method and system for web-site testing.

A client establishes a relationship with the testing service, as shown in FIG. 12A, by accessing the testing service through a browser executing on the client computer. As shown in FIG. 12A, an employee or owner of the client web server uses the client computer 1202 to access a testing-service web site, via a browser 1204 running on the client computer, which allows the client web server to register as a client of the testing service. The testing service 1206 includes one or more databases 1208 and 1210 that store information used to construct library and key files that are downloaded to client web servers, store statistics collected during testing, and store various different data objects and records that describe clients, tests, test runs, experiments, and other data used to conduct web-site testing. The client web server 1212 serves a number of different web pages described by HTML files 1214 to users, represented by user 1216 who access the web pages served by the client-web server through a browser 1218 running on the customer computer 1216. The testing service and client web server additionally include web-server engines, application programs, and other components of servers and computer systems.

Figure 12B:
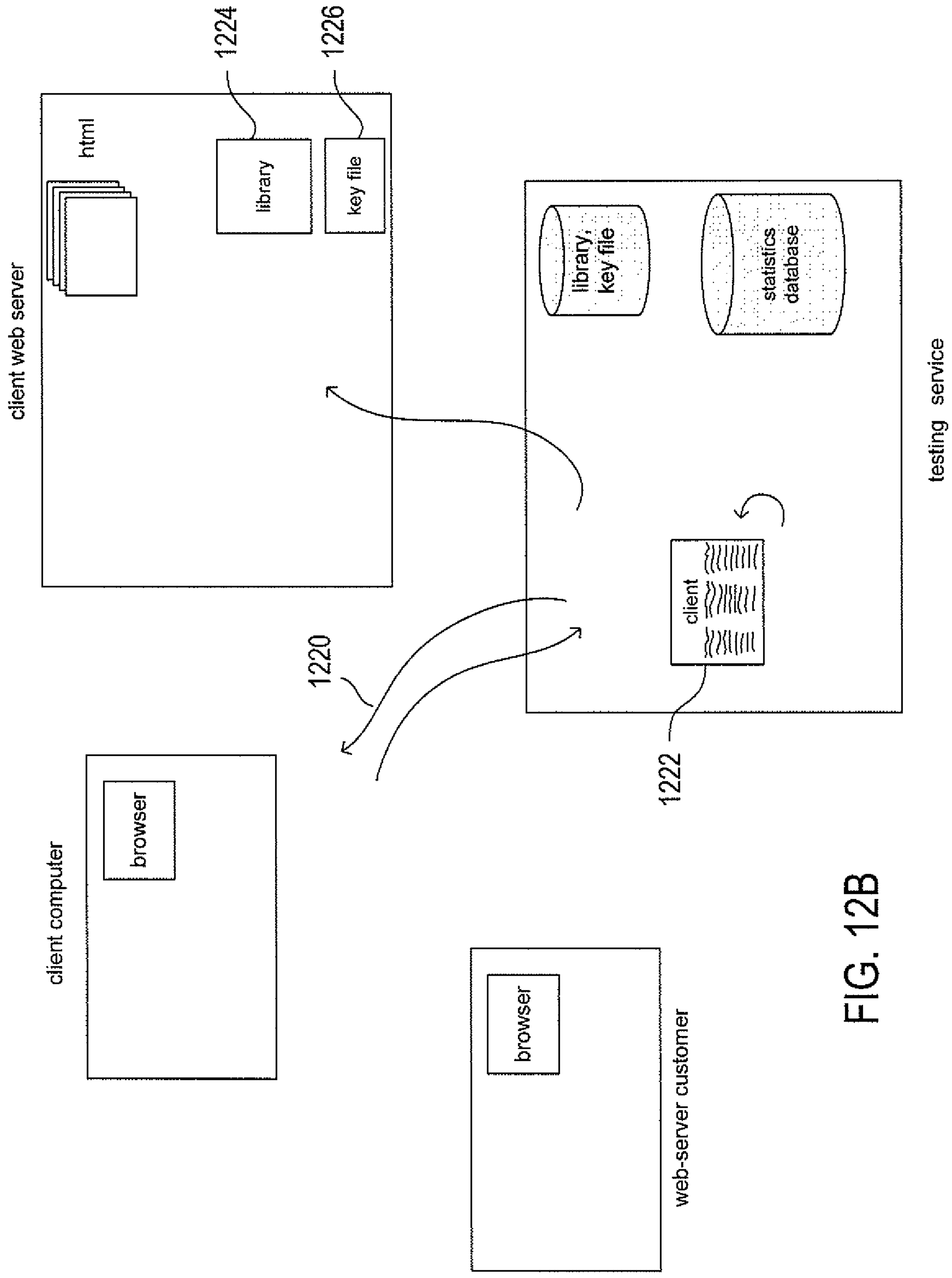

As shown in FIG. 12B, the client carries out a dialog 1220 with the testing service in order to provide the testing service with information about the client that allows the testing service to prepare a client record or records 1222 that describe the client and to store the client record or records in the database. In addition, the testing service may undertake various authorization and authentication steps to ensure that the client web server is a valid web server and that the client can transmit remuneration for testing services to the testing service. As part of client initialization, the testing service prepares a script library 1224 and a key file 1226 that the testing service downloads to the client web server. The script library 1224 includes routines that are called by client-web-server users during web-site testing. This library is referred to as a "script library" because script routines are often provided to browsers for execution. The key file 1226 includes cryptographic information that ensures that all information exchanges that occur between client users and the testing service are secure.

Figure 12C:
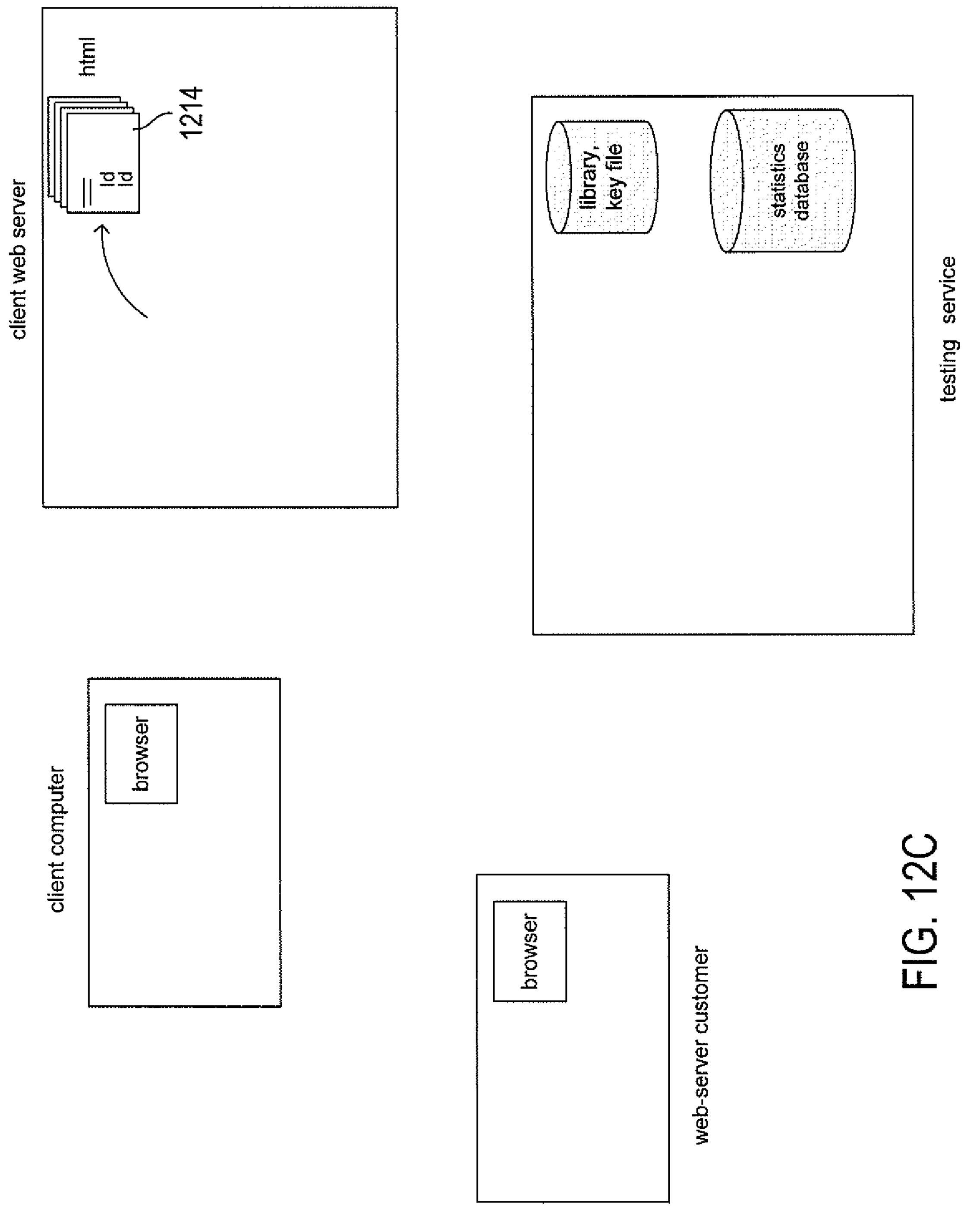

As shown in FIG. 12C, following client initialization, the client modifies any of the HTML encodings of web pages that may be altered during testing of the client-web server by the testing service. The alternations are minimal. To each HTML file that encodes a web page that may be tested, the client generally adds only two single-line statements and, in the case that display objects are not associated with identifiers, as discussed above with reference to FIG. 9, the client web server provide identifiers for each of the objects that may be specified as factors for testing of web pages. The single-line statements are generally identical for all client web pages, greatly simplifying the web-page modification carried out by the client. The first statement results in downloading of a script library from the client web server, and the second script launches one or more information exchanges between the testing server and user computer. In the case that a conversion event is tied to a specific user-activated display device, such as a button, a call to a conversion script is inserted into the HTML file, so that user activation of the user-activated display device generates an information-exchange transaction with the testing service corresponding to a conversion event. As discussed above, these may be the HTML identifiers discussed with reference to FIG. 9, or other types of identifiers. In many cases, simple changes to the HTML files can be automatically carried out by a script or by routines provided by a content-management-service application-programming interface.

Figure 12D:
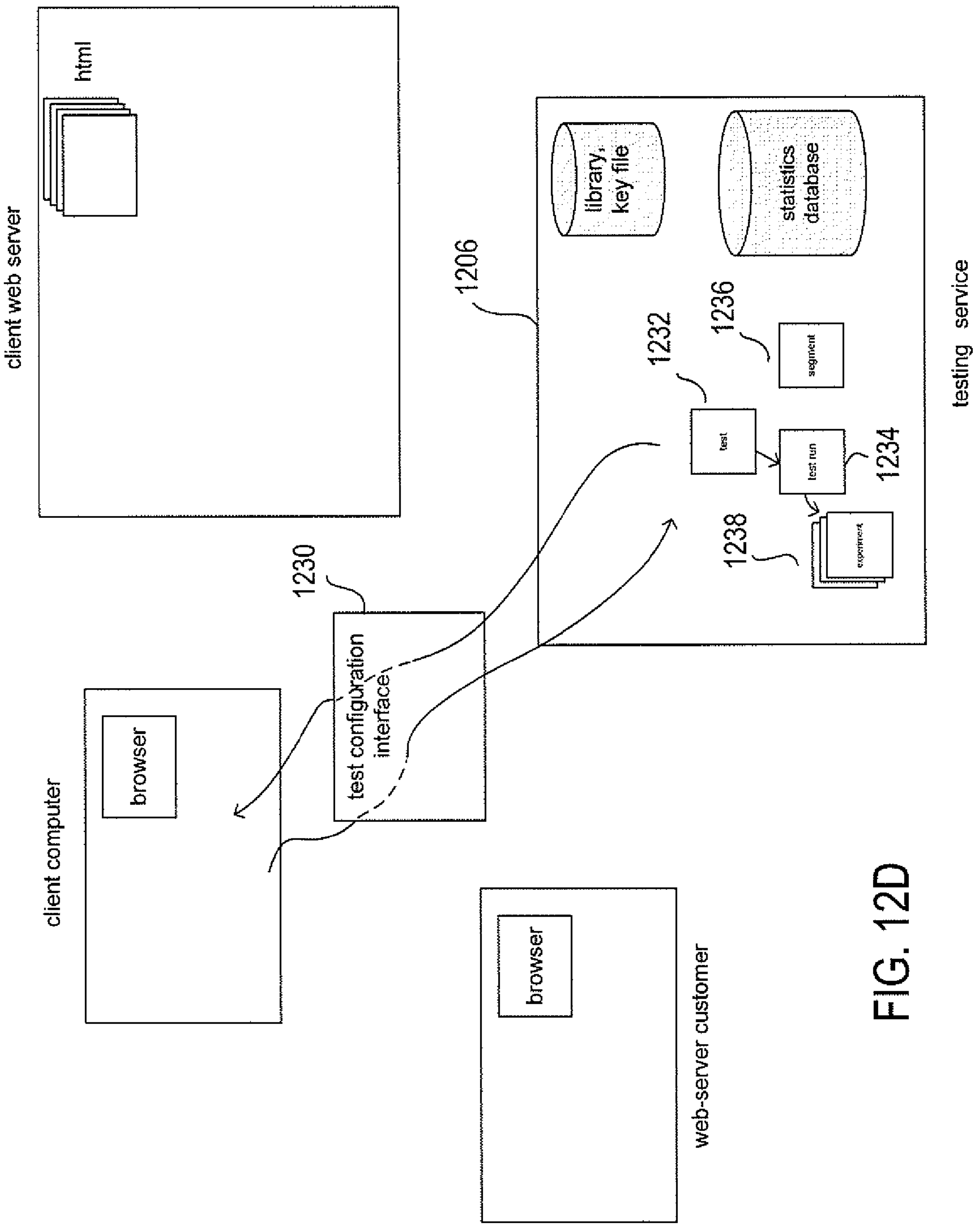

Following client initialization and modification of the HTML-file encodings of web pages that may be subsequently tested, the client can configure and run tests through a test-configuration interface provided as a website by the testing service to clients, as shown in FIG. 12D. The test configuration interface 1230 allows the client computer to define tests 1232, specify and modify already-specified test runs 1234, and specify segments 1236, and, using client-supplied test and test-run specifications, the testing service generates the experiments 1238 associated with each test run. All of the test, test-run, and segment information is stored in records associated with a reference to the client in one or more databases within the testing service. The test-configuration interface 1230 additionally provides run-time information to the client web server and allows the client web server to launch trial runs and test runs.

When a client web server has created a test and launched a test run for the test, the testing service provides modifications of the tested web page to users of the client-web-server during the test in order that the users receive altered web pages that constitute test experiments, and the testing service collects statistics based on users' access to web pages under test. This process is next described, with reference to FIGS. 12E-G.

Figure 12E:
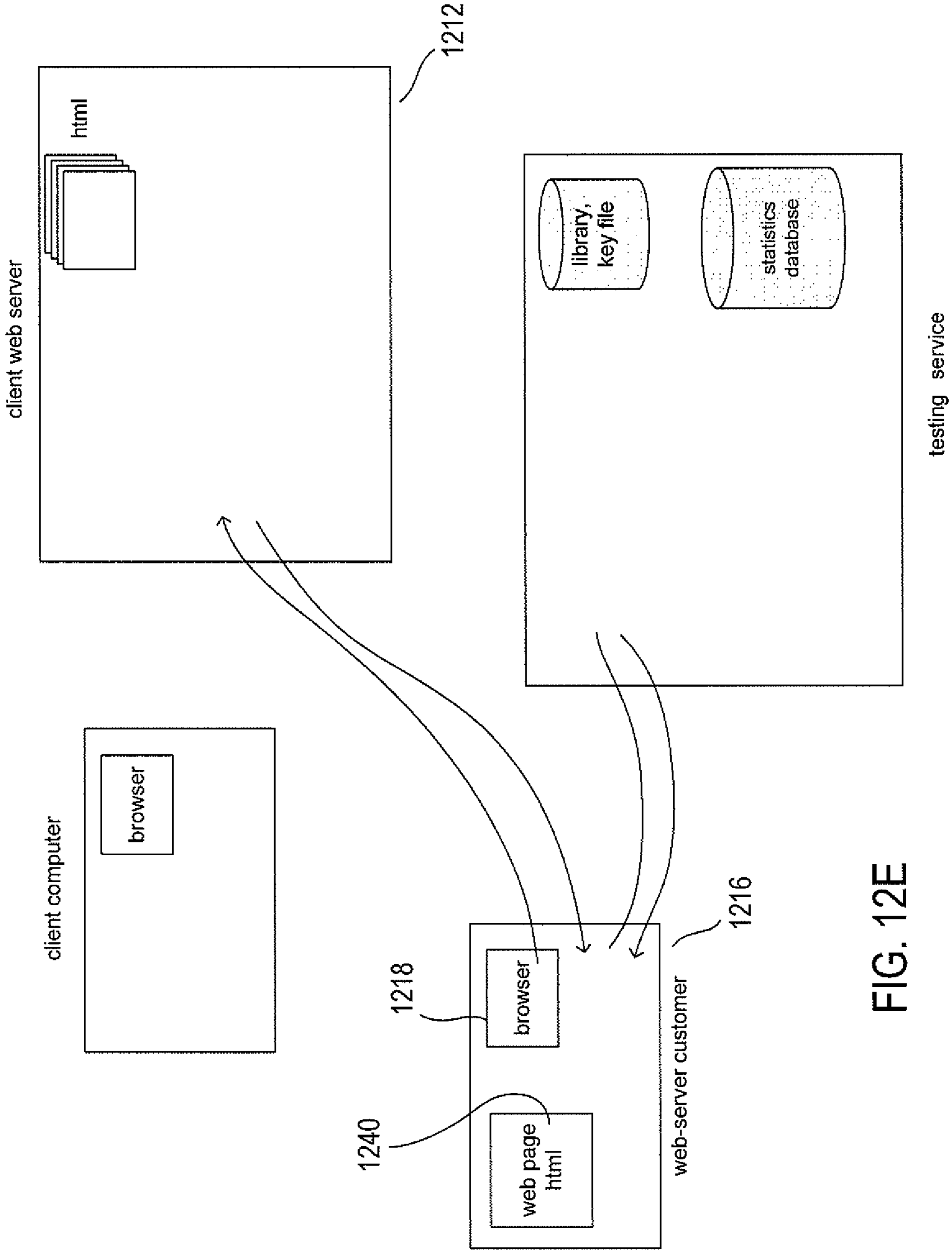

When a client-web-server user 1216 accesses a test web page, the client-web-server user sends an HTML-file request through the Internet to the client web server 1212, as shown in FIG. 12E, which returns the requested HTML page to the client-web-server user 1216 for rendering and display by the browser 1218 executing within the user's computer. As the browser begins to process the HTML file, the browser encounters a statement 1240 that causes the browser 1218 to request the script library from the client web server. When the script library is downloaded by the client web server, the HTML file is modified, on the user computer, to launch an additional information exchange with the testing service to download additional library routines from the testing service. This additional information exchange is carried out only when the web page being processed is an active test page, the user computer is a valid test subject for an active test, and the additional library routines are not already cached in the user computer's browser. Insertion of the library-routine-fetch statement is one of the two modifications to the HTML files corresponding to tested web pages made by the client.

Figure 12F:
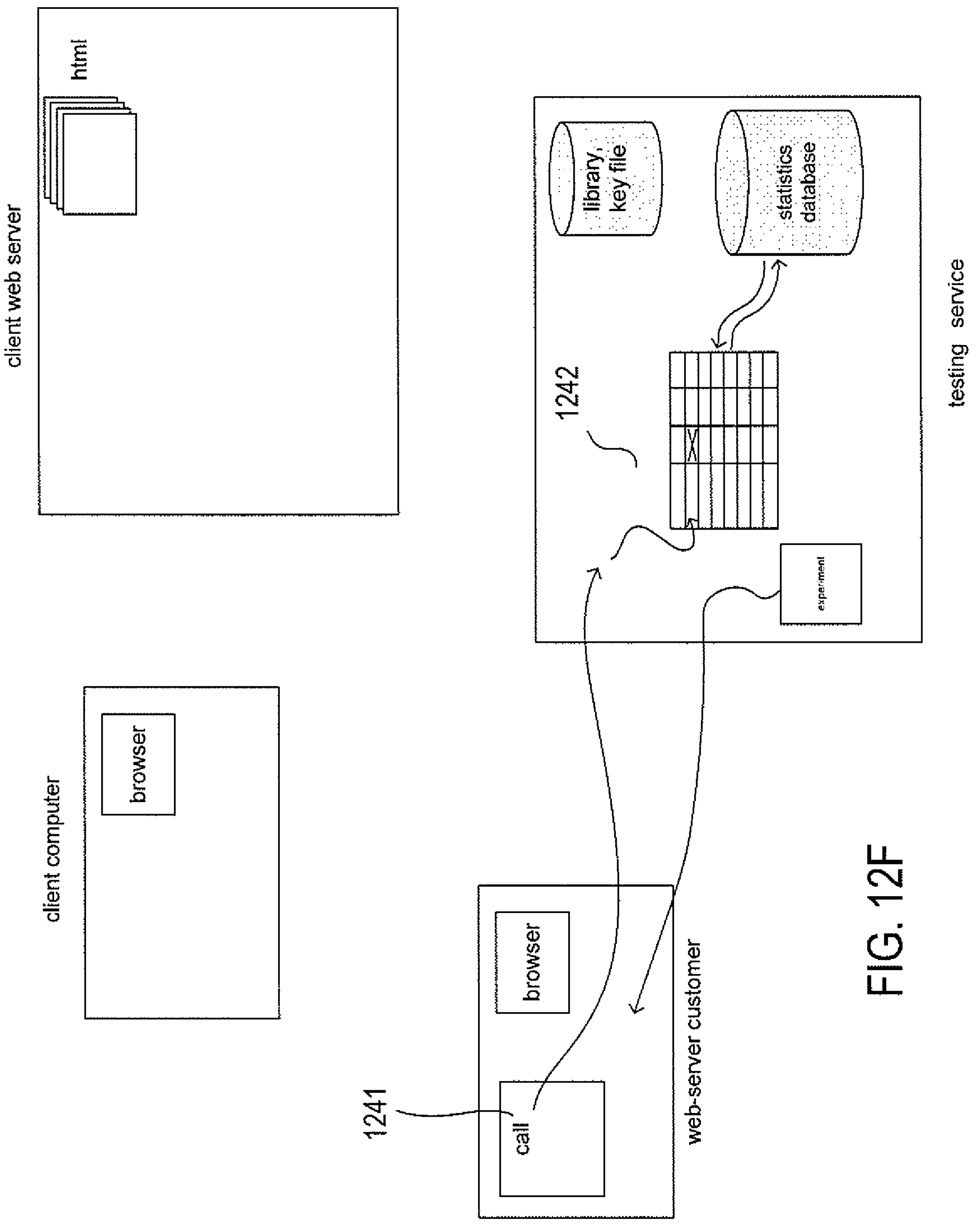
Figure 12G:
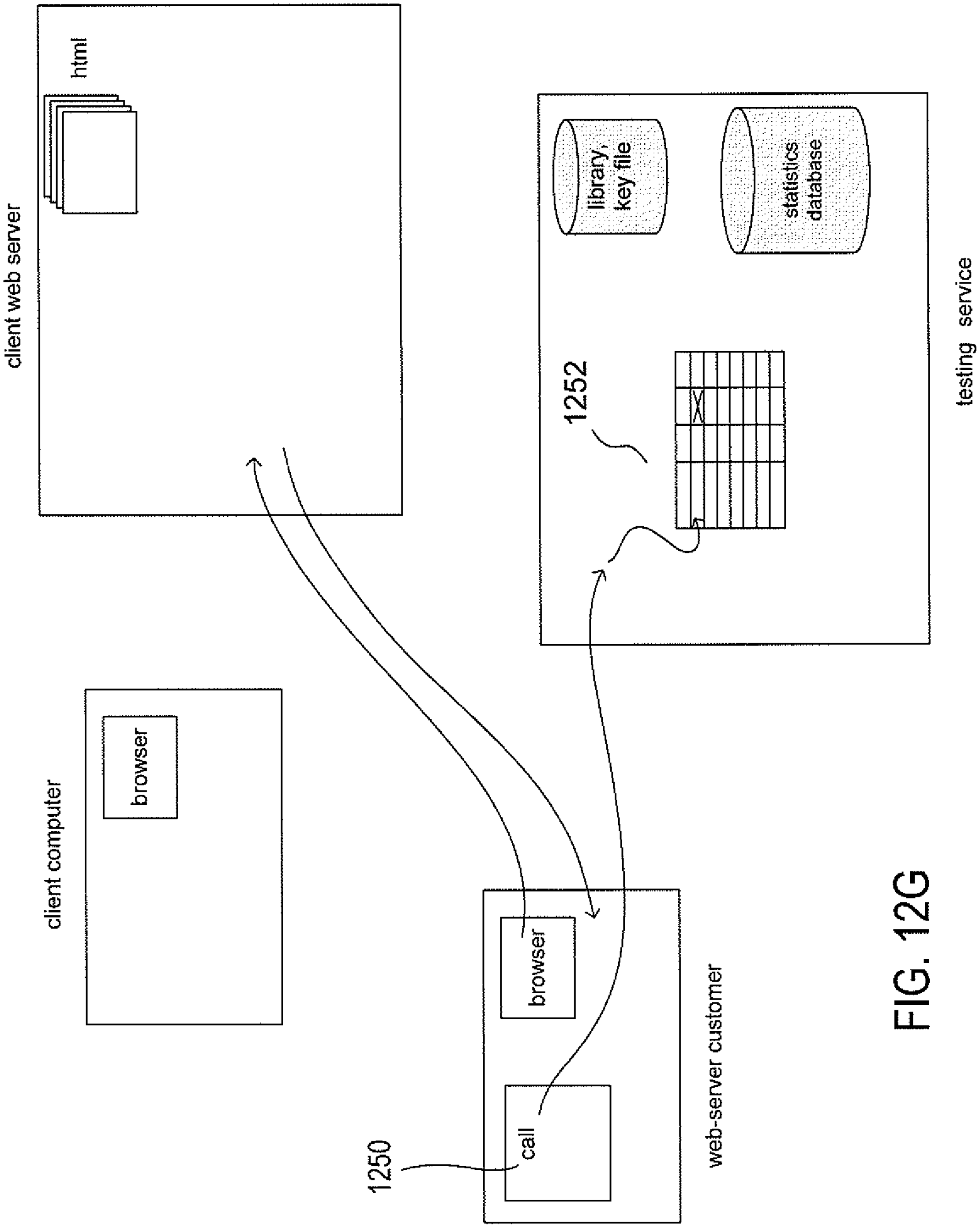

Next, as the browser continues to process the HTML, as shown in FIG. 12F, the browser encounters a call to the library routine "WM.setup" 1241. When executed by the browser, WM.setup initiates one or more information exchanges with the testing service during which the testing service can access cookies and other information associated with the web page on the user's computer, and the user computer receives web-page modifications from the testing service. Cookies can be used, for example, to ensure that a test subject who repeatedly accesses a landing page receives the same experiment, or test page, each time. Only when the web page being processed by the user computer is an active test page, and the user computer is an active test subject, are web-page modifications returned to the user computer by the testing service, and information uploaded by the testing service from the user computer. When this web page and user are validated, the testing service records the page accessed by the user, an identifier of the user, and a time of access in one or more database entries 1242 and returns a snippet, representing one or more nodes or sub-trees of the DOM corresponding to the web page, to the user computer, which modifies the DOM constructed by the browser to incorporate the snippet downloaded by the testing service to the user. In other words, the testing service downloads modifications that transform the web page downloaded by the user to a particular altered web page representing an experiment. Thus, following the information transaction illustrated in FIG. 12F, the user's browser alters the DOM and displays, to the user, the altered web page corresponding to an experiment as part of the test run. The snippet is constructed or retrieved by the testing service based on the orthogonal-array test basis or other test design. The stored test design defines the experiments, from which the testing service selects experiments for provision to users in order to obtain a well-distributed sampling of experiments during the test. Subsequently, as shown in FIG. 12G, should the user download a page, or invoke a feature on a page, corresponding to a conversion event, the user's browser, in processing the HTML file, encounters a library call 1250 that results in an information transaction between the user and testing service. The testing service checks to ensure that the web page is a valid conversion page for an active test, that the user is a valid test subject. When all of these tests are valid, the conversion event is recorded 1252 for the experiment by the testing service.

Figure 12H:
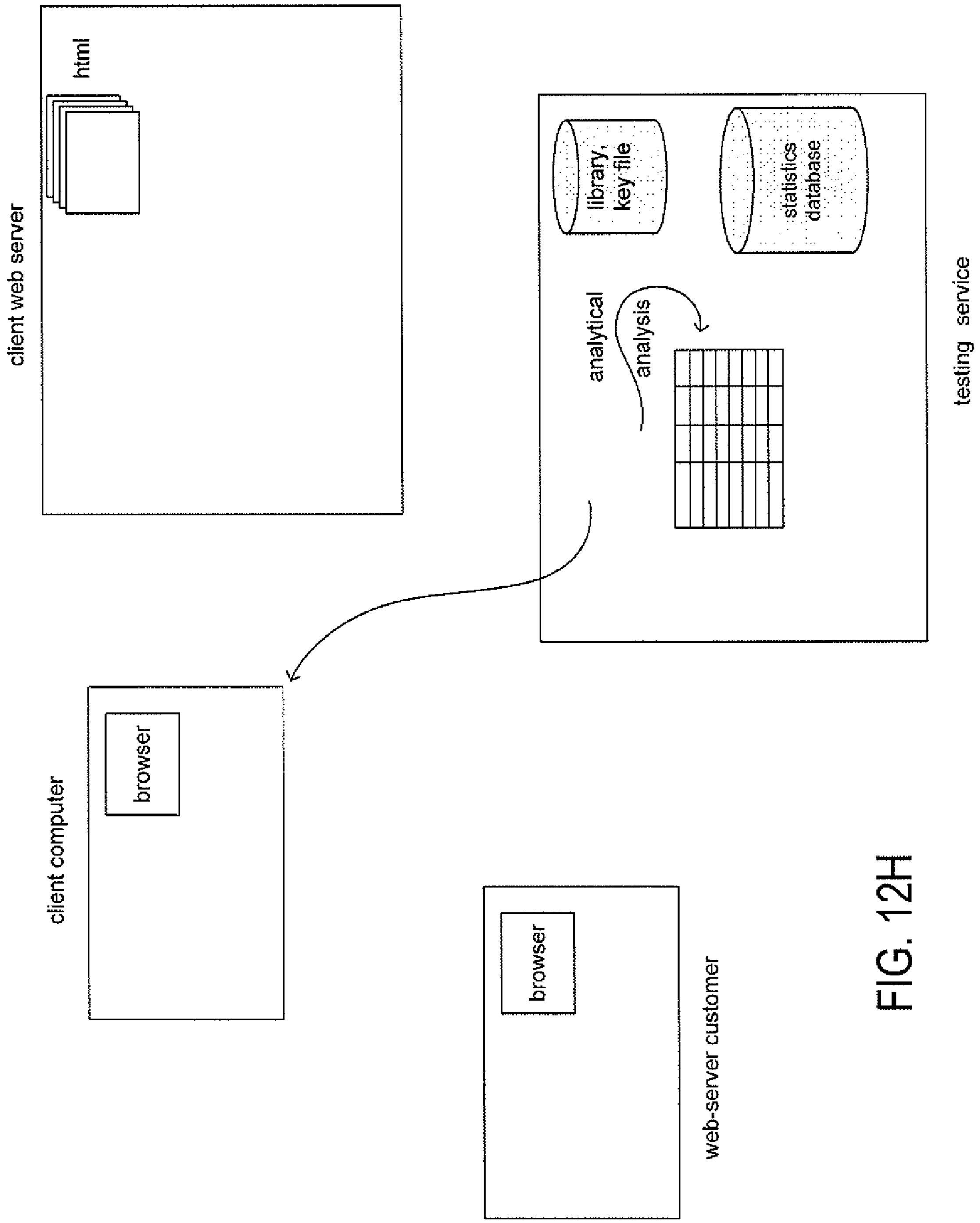

Finally, as shown in FIG. 12H, when the testing service has collected sufficient data to consider the test run to be "complete" the testing service changes the status of the test run to complete, and may then undertake analysis and reporting of the test results. The test results may be automatically returned to the client web server, or may be subsequently returned, on demand, when the client checks the status of the test run and determines that the test run has been completed.

FIG. 13 shows the HTML modifications used to virtually incorporate a testing service into a web site. The HTML code, previously shown in FIG. 9, includes first statement 1302 that directs a browser to download the script-routine library and a second statement 1304 that calls a script-library entry point "WM.setup" that results in sending a message or request to the testing service to indicate a landing-page-access event or page-access-conversion event. A page that includes a displayed object, activation of which is defined to be a conversion even, is similarly modified to include a call to the library routine "WM.convert." By merely adding two statements to an HTML file, or three in the case that the page corresponds both to a landing-page-access event and to a conversion event, the HTML file becomes a potential test web page, and the testing service is virtually incorporated into the client web server. Again, the statements used to modify landing-access-event-associated web pages are identical for all such web pages, as is the statement that is used to modify display-objects associated with conversion events. A client can easily write a script or other program, or use a content-management-system programming interface to introduce these identical statements into web pages. Alternatively, website-testing services may provide software developer kits ("SDKs") that provide a graphical user interface and tool sets that allow clients to easily incorporate testing-service instrumentation into HTML code and other information to allow the testing service to collect data from client web pages and other type of information provided by the clients to users.

Figure 14:
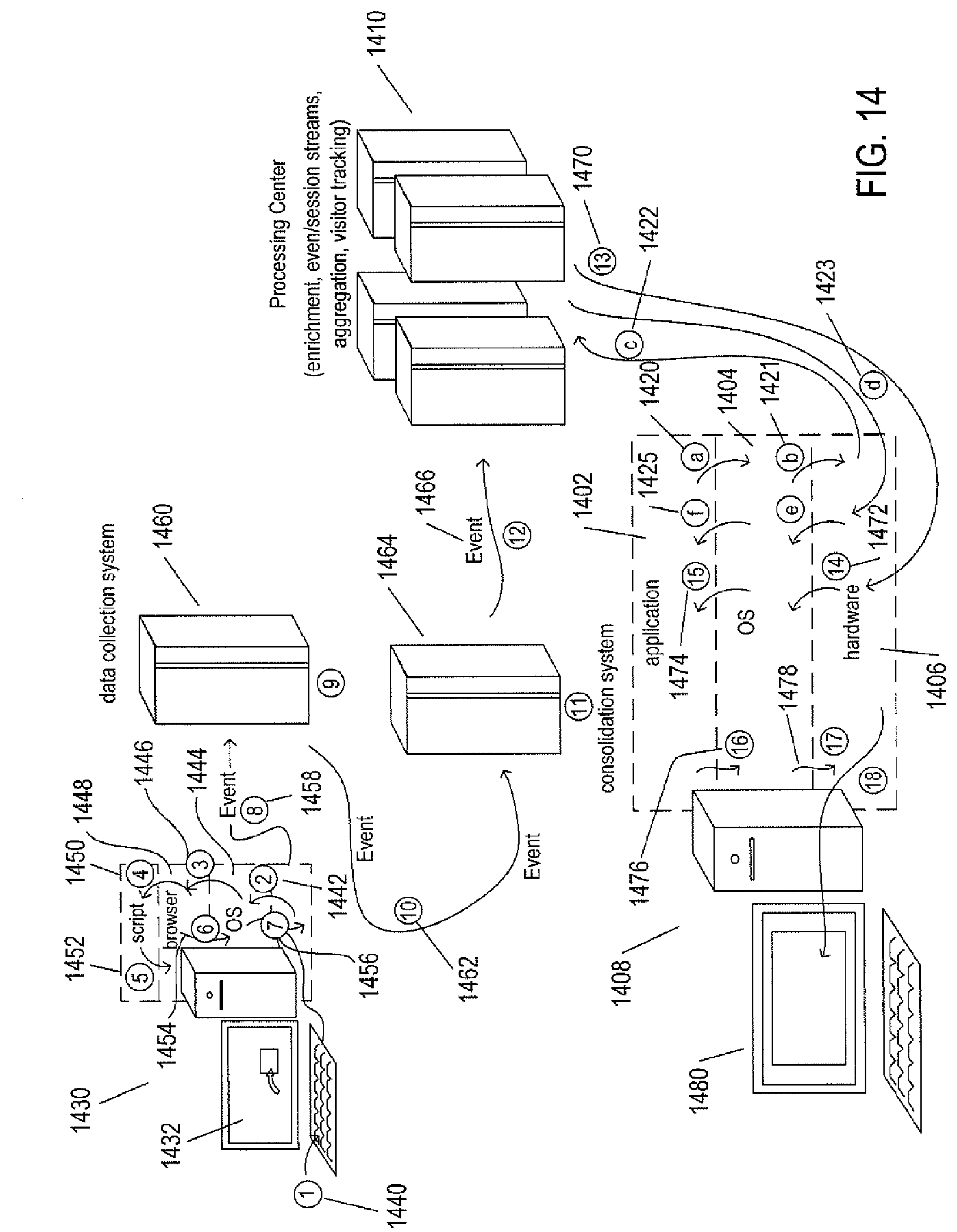
FIG. 14 illustrates the high-level components and data paths within one implementation of a system that collects data from web browsers executing on processor-controlled user appliances.

FIG. 14 illustrates the high-level components and data paths within one implementation of a system that collects data from web browsers executing on processor-controlled user appliances. The collected data may be used for website-testing and web analytics, as in the examples discussed above, but may also be used for real-time display of user activity to clients of a website-data-collection-and-rendering service. In FIG. 14, a website-data-collection-and-rendering service is illustrated, but, in general, the data-collection system may be alternatively or concurrently used for collecting test data for website-testing and web analytics. Initially, when a data-rendering application 1402 begins to execute, the application initializes various data structures and then opens at least one communications socket to a processing center. In FIG. 14, the console-or-monitor-like application 1402 executes within an execution environment provided by an operating system 1404 that executes above the hardware platform 1406 within a client computer system 1408. The processing center 1410 is generally a remote, distributed computer system that includes tens to hundreds of server computers and other types of processor-controlled devices, systems, and subsystems. In order to open a communications socket and communicate with the processing center, the following high-level steps occur: (a) the application executes an open-socket system call 1420; (b) in response to the system call, the operating system creates an open-socket-request message and, via a device driver, queues the message to the input queue of a communications controller and signals the communications controller to transmit the message to the processing center 1421; (c) the communications controller controls a transceiver to transmit the open-socket-request message to a listening process executing on a computer within the processing center 1422; (d) the processing center returns an acknowledgement message to the transceiver 1423 within computer system 1408; (e) the operating system 1404 within computer 1408 is notified of the reception of the acknowledgement message and retrieves the acknowledgement message from a memory buffer 1121; and (f) the acknowledgement message is passed to the application program to indicate successful opening of the communications socket 1425.

Once the socket is opened, or, in other words, a protocol-based communications link is established between the application 1402 and the processing center 1410, the processing center begins to send a stream of data messages to the application program through the communications socket. This stream continues until the occurrence of some type of stream-ending event, such as closing of the socket via a system call by the application program, termination of the application program, or various types of failures and computational discontinuities. The application program may choose to open two or more different sockets to the processing center in order to concurrently receive two or more different streams of data messages.

Continuing with FIG. 14, the process by which a data message is created and transmitted to the application program is next described. The system depends on instrumentation introduced into HTML files and/or other resources that are used by a web browser or other type of application program or control program. In the example shown in FIG. 14, the instrumentation is included in HTML files that are processed by a web browser 1448 to render and display web pages to a remote user on a remote computer system 1430. In the example, a user is viewing a currently displayed web page 1432. The following events occur, in this example: (1) the user depresses a key or clicks a mouse button 1440 in order to input a command, make a selection, or carry out some other such input to the web browser; (2) the user input is sensed by the hardware of the remote computer system 1442, which generates an interrupt or other signal to the operating system 1444 within the remote computer system; (3) the operating system receives the interrupt and notifies 1446 the browser 1448 within the remote computer system of the input event; (4) as a result of receiving the input, the browser executes a script routine 1450 within which instrumentation has been embedded for collecting data; (5) instrumentation within the script collects data programmatically 1452, encodes the data within a uniform resource locater ("URL"), and requests that the browser retrieve a remote resource specified by the URL; (6) the browser executes an HTTP request for the resource 1454 that results in a system call to the operating system 1444; (7) the operating system creates a request message and passes the request message to a communications-device controller 1456 for transmission 1458 to a data-collection system 1460; (8) the data-collection system retrieves the encoded data from the URL request and packages the data in a JSON-encoded event message; (9) the event message is transmitted by the data-collection system 1462 to a consolidation system 1464; (10) the consolidation system consolidates event messages received from many different data-collection systems in temporary storage, with a temporary storage area allocated for the event messages corresponding to each of one or more different clients; (11) upon request from the processing center 1410, the consolidation system forwards 1466 a next set of events to the processing center for processing; (12) a processing center 1410 processes received event messages by adding derived and calculated data to the event messages and, in certain cases, aggregating and coalescing individual event messages into higher-level messages as well as filtering the messages for output to each connection/stream; (13) those processed messages that belong to the stream requested by the application program are forwarded 1470 by the processing center to the computer system 1408; (14) the hardware layer of the computer system notifies the operating system and passes the received processed message or messages to the operating system 1472; (15) the operating system notifies and passes the received processed messages to the application program 1474; (16) the application program then uses the data to generate and update to the monitor display or console display based on the received data and passes this update 1476 to the operating system; (17) the operating system controls a graphics processor and other video components of the hardware level 1478 to update the monitor display or console display; and (18) update operations are transferred from the graphics subsystem to the display device 1480 resulting in an update of the monitor display or console display. The consolidation systems may store collected data for a specified period of time, in certain cases, for a week or more, allowing the stored data to be subsequently streamed or re-streamed for various purposes. Data may be additionally archived for subsequent retrieval, processing, and streaming, either within consolidation systems or processing centers.

Figure 15:
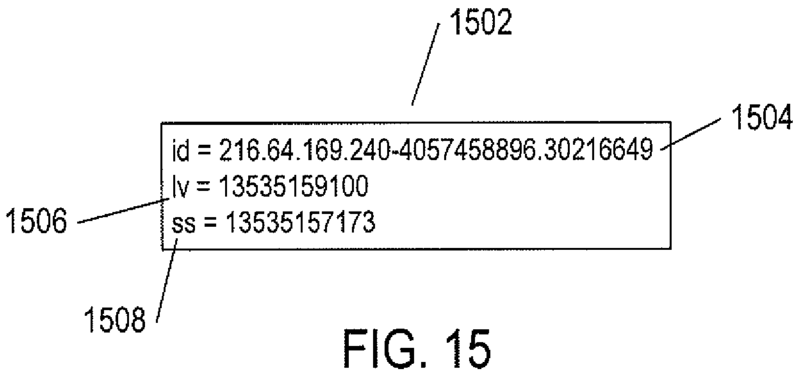
FIG. 15 shows a cookie, or small data structure, that is stored within the memory of each remote computer system that is instrumented for data collection according to one implementation of the currently disclosed methods and systems.

The analytics methods and systems generally maintain state information within remote computer systems to facilitate data collection and processing. FIG. 15 shows a cookie, or small data structure, that is stored within the memory of each remote computer system that is instrumented for data collection according to one implementation of the currently disclosed methods and systems. The cookie 1502 includes a unique identifier for the user/processor-controlled appliance 1504, a system time stamp 1506 that indicates the most recent event detected by the instrumentation, and a session-start time stamp 1508 that indicates the time at which a session that includes the most recent event began. The identification of the user/processor-controlled appliance, id, is generally a combination of an IP address and other numbers that uniquely identify the user/processor-controlled appliance. The time stamps that indicate the last detected event, or last visit, lv, and the start of the session, ss, are generally system time values that indicate the number of seconds or fractions of seconds that have elapsed since some arbitrary point in time. The data contained in the cookie is used by the instrumentation for encoding data within a URL for transmission to a data-collection system and subsequent downstream processing of the data.

Figure 16A:
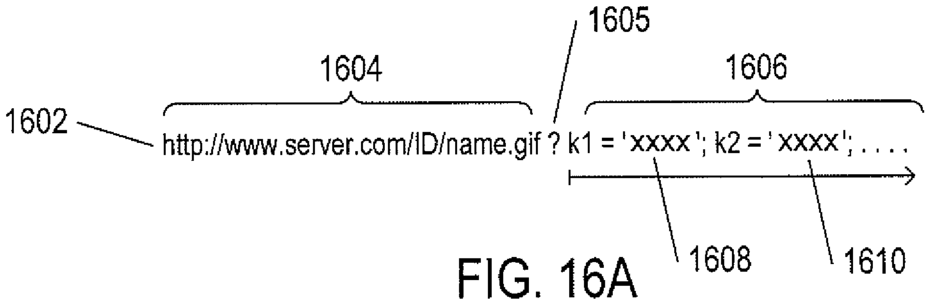

FIGS. 16A-E illustrate the various types of data messages that are transmitted between computers in the example system shown in FIG. 14. The data initially collected by instrumentation within the web browser is encoded as a series of key/value pairs within a URL. FIG. 16A illustrates the encoding of key/value pairs generated by instrumentation within a URL. The URL 1602 includes a path name to a resource stored on a data-collection server 1604 followed by a question mark 1605 and then a series of semi-colon-delimited key/value pairs 1606. In FIG. 16A, and in subsequent figures, the symbol strings "k1," "k2," . . . are used to indicate different keys and the corresponding values are generally indicated by a series of "x" symbols between pairs of single quotes or double quotes, such as "x" symbol strings 1608 and 1610 in FIG. 16A indicating the values corresponding to keys "k1" and "k2." The values may be any alphanumeric symbol string and the key names may also be arbitrary alphanumeric symbol strings.

Figure 16B:
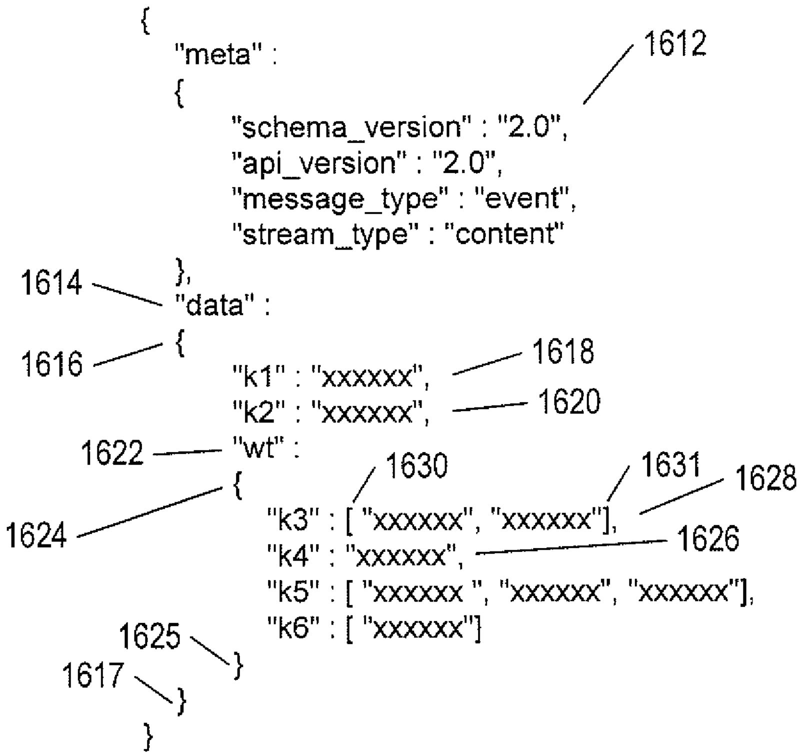
Figure 16E:
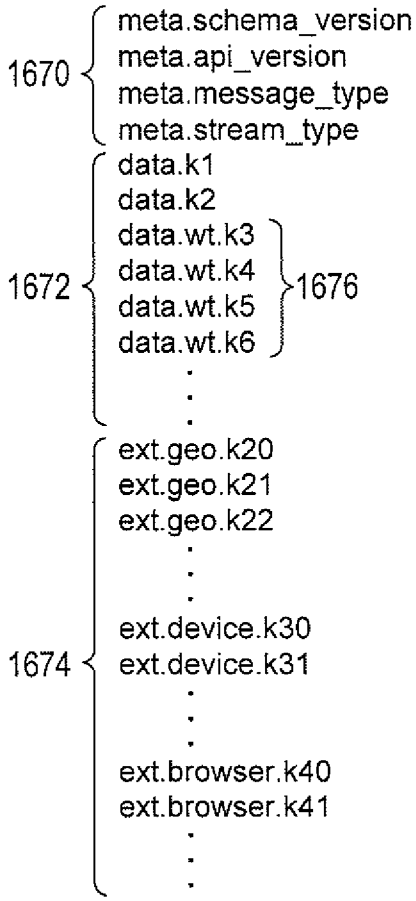

FIG. 16B illustrates a JSON-encoded event message that is generated by a data-collection system, transmitted to a consolidation system for storage, and pulled from storage and transmitted to the processing center. A JSON-encoded event message includes a "meta" object 1612 and a "data" object introduced by the symbol string "data" 1614 and including key/value pairs and objects within the bracket pair 1616-1617. A "data" object may include key/value pairs, such as key/value pairs 1618 and 1620, and objects, such as the object named "wt" 1622 that includes key/value pairs within brackets 1624-1625. Key/value pairs may include two symbol strings separated by a colon, such as key/value pair 1626 or may comprise a key followed by a colon that is in turn followed by an array of symbol strings, such as key/value pair 1628. Arrays of symbol strings are delimited by square brackets, such as the pair of square brackets 1630-1631. Event messages generally include a "meta" object and a "data" object.

FIG. 16C illustrates an enriched event message that is produced within the processing center (1410 in FIG. 14). An enriched event message includes a "meta" object 1640, a "data" object 1642, and an "ext" object 1644. The "ext" object includes three lower-level objects "geo" 1646, "device" 1648, and "browser" 1650. The geo object contains key/value pairs that describe the geographical location of a user/processor-controlled user appliance. The device object 1648 includes key/value pairs that characterize the user/processor-controlled appliance. The browser object 1650 includes key/value pairs that characterize the type of browser used by the user. The data values included in the "ext" object 1644 are derived from the data values included in the "meta" and "data" objects as well as additional calculated values and data sources accessible to the processing center and used for event-message enrichment. Many types of enrichments are possible. For example, an enriched even message may include indications of the current weather at a user's location, the size of the town or city in which the user is located, public data related to the user, and many other types of information.

FIG. 16D illustrates a session message. A session message is a higher-order message that includes session information as well as a "session_summary" object and an array of "event" objects. The "meta" object 1660 is the same as the "meta" object in previously described event messages. A number of key/value pairs 1662 describe session-related information. The "session_summary" object describes the number of events included in the session message and other information related to the session 1664. Finally, the key/array pair "events" 1666 includes the traditional enriched-event data for each of a series of events.

The data within a JSON-encoded data message may alternatively be described using a hierarchical notation. The alternate hierarchical notation for the extended event message shown in FIG. 16C is provided in FIG. 16E. The keys within the "meta" object are specified by strings that begin with the substring "meta" 1670. The keys contained in the data object 1642 are specified with strings that begin with the substring "data" 1672. The keys contained within the "ext" object 1644 are specified by symbol strings that begin with the substring "ext" 1674. Periods are used to delimit hierarchical levels. For example, there is only a single hierarchical level within the meta object and thus all of the keys within the meta object of FIG. 16E include a single period between the substring "meta" and the names of the keys of the key/value pairs contained in the meta object. By contrast, the keys that occur within the "wt" object that, in turn, lies within the "data" object 1642 include two periods 1676 to indicate two hierarchical levels. The hierarchical key names shown in FIG. 16E can be thought of as the names of variables, and the corresponding values are the values stored in the variables.

Almost any type of data value that can be accessed from a script or computed by a script running in the context of a web browser or similar application programs is a candidate for data collection by instrumentation. The data values may be values produced by system calls, such as a call to a system-time routine or a call to retrieve the IP address of the computer within which the web browser is executing. Other values include data values that indicate a particular state of a displayed web page within the context of a web site, such as indications of pages, sections, and subsections currently accessed by a user, indications of various types of input events to web pages, indications of other web sites through which a user passed in navigating to the current web site, information requested by and displayed to a user, and many other types of information related to a user's interaction with the web site. The data values are named hierarchically, as discussed above with reference to FIG. 16E, or, equivalently, associated with key symbol sequences encoded within a JSON-encoded message. In either case, each data value is uniquely named and can be extracted from the parameters within a URL passed to a data-collection system by a web browser executing on a remote user computer.

FIGS. 17A-B provide an example of the instrumentation inserted within a web page that carries out data collection. The data collection is initiated, from a web page, by a script (1702 in FIG. 17B) embedded within an HTML file that specifies a particular web page displayed to a user. The script creates a new tag object 1704 and then calls a "dcsCollect" tag member function to collect data and transfer the data to a data-collection system 1706. The "dcsCollect" member function 1708 calls a "dcsTag" function 1710. The "dcsTag" function 1712 creates a URL for a one-pixel resource image and then embeds in the URL, following the "?" symbol, a list of key/value pairs. The URL is contained within the symbol-string variable P which is passed to the "dcsCreateImage" routine 1714. The "dcsCreateImage" routine 1716 makes an assignment to an image variable 1718 which is processed by the browser by using an HTTP request and the URL created by the "dcsTag" routine to fetch the one-pixel image. The one-pixel image is not used for display, but is merely a vehicle for transmitting the key/value pairs encoding in the parameters within the URL to the data-collection system.

It should be noted that the data collected by the instrumentation is unstructured. The value of a key/value pair can be an arbitrary symbol string or an array of symbol strings. Multiple values may be later combined to create longer symbol strings. The data collected is specified by the instrumentation code. The data processing and data enhancement generally take place downstream, in a processing center or other system remote from where the instrumentation is executed to collect data. There are many advantages to downstream data processing. One advantage is that the instrumentation remains simple and efficient, and does not introduce potentially disruptive computational burdens on processor-controlled user appliances. The data collected via the instrumentation is also relatively independent of the remaining system components. For example, the instrumentation may be modified to collect a new key/value pair, and that key/value automatically ends up passed to data consumers who have not chosen to filter out the key/value pairs using queries. The instrumentation can be, in many cases, modified even while the data is collected and streamed to data consumers.

Figure 18:
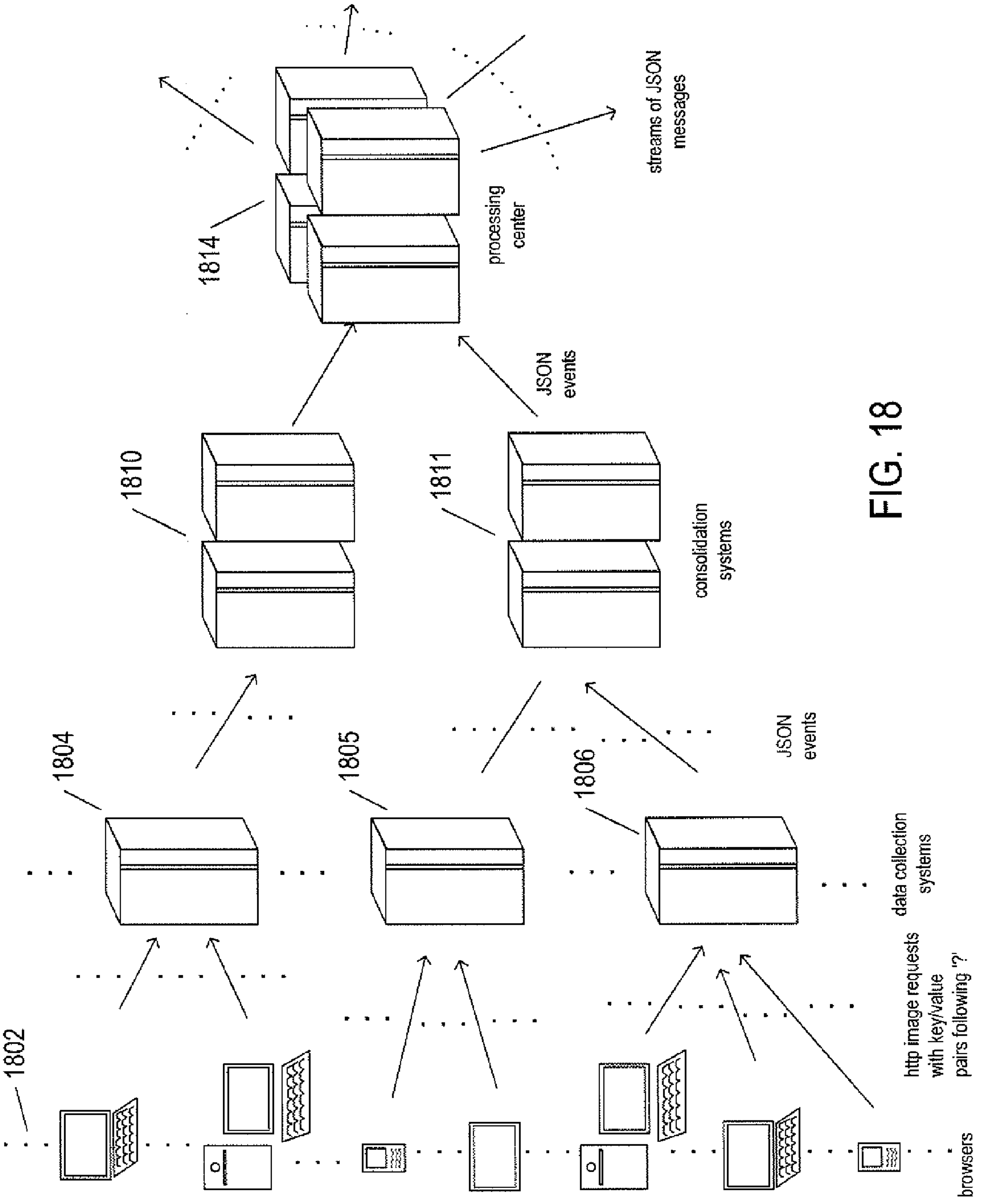
FIG. 18 illustrates, in a fashion similar to FIG. 14, an example of a data-collection system.

FIG. 18 illustrates, in a fashion similar to FIG. 14, an example of a data-collection system. As discussed previously, data collection occurs within HTML files or scripts executed by browsers running within the remote processor-controlled user appliances shown in column 1802. Web browsers make HTTP requests for resources, specified by URLs, that are directed to various different geographically dispersed data-collection systems 1804-1806. Listener processes within the data-collection systems receive the parameter string following the "?" symbol in the URL specification of a resource, generate, from the key/value pairs in the parameter string, a JSON-encoded event message, and transmit the JSON-encoded event messages to a consolidation system 1810 and 1811.

In one implementation, the consolidation systems comprise a large number of servers that execute, in a distributed fashion, the Kafka distributed messaging system. Kafka is a distributed messaging system developed for collecting and delivering high volumes of log data with low latency. Kafka processes streams of incoming messages, dividing the incoming messages into messages belonging to each of a number of categories, referred to as "topics." A testing or analytics system may, for example, partition collected data into topics that each corresponds to a different client organization. Kafka further partitions topics into topic partitions, each of which comprises a set of segment files stored in memory and/or mass-storage devices. Kafka also defines brokers, which are distributed processes, each of which may process incoming messages for a particular set of topics and topic partitions. Messages are input to Kafka by producers, and thus, in the currently disclosed system, the data-collection systems represent the producers. The Kafka system aggregates the incoming messages for each topic and stores the messages in segment files for subsequent retrieval by consumers. In the currently disclosed system, the processing center or processing centers 1814 are the consumers of messages consolidated by the Kafka distributed messaging system. Incoming messages are appended to a current in-memory segment file. Once the segment file fills up, it is flushed to mass storage, at which point the messages are made available to consumers. Kafka stores messages for a defined period of time, often on the order of a week. During that time, consumers may repeatedly access messages. In general, the Kafka distributed message system acts as a kind of very large input/output queue, with the lag time between message input and message consumption on the order of seconds or fractions of seconds, when used in the currently disclosed real-time processed-data streaming system.

In one implementation, the data-collection portion of a testing or analytics system employs a Storm big-data processing system within the processing center. Storm is an open-source system originally developed for handling Twitter messages. Storm is fully distributed and features high performance, fault-tolerance, and guaranteed message processing. The conceptual model for Storm is a graph representing interconnections between spouts, which are data sources, and bolts, which are data-processing entities. Spouts pull data messages from the consolidation systems and pass the data messages on to one or more bolts, each of which performs processing activities, including enrichment, query filtering, and other such processing. The spouts and bolts are interconnected by communications paths, with the furthest-downstream bolts emitting processed data messages through communications sockets to client applications.

Method and System for Assigning Topics to Events Within an Event Stream

As discussed in the previous subsection, events comprising key/value pairs may be generated by instrumentation incorporated in computational entities, including web pages, and collected and processed to derive information to which various types of analysis may be applied. In additional types of data-collection-and-data-processing systems, events generated by instrumentation may be collected and processed, in real time, to provide real-time displays of world-wide website usage. There are many other event-driven types of applications and systems that collect and process events. As also discussed above, events are, in the described systems and implementations, sets of key/value pairs that are generated by instrumentations and collected and transmitted by a browser in response to various user inputs and interactions, including download of web pages, access of web pages through hyperlinks, and user input to input features, such as input features on a commercial web site that allow a user to select items, display additional information about selected items, place items in shopping carts, and purchase items.

FIGS. 19A-B illustrate an event comprising key/value pairs. FIG. 19A shows the event in textual form, with indications of the various categories of key/value pairs included in the event. Each key/value pair is textually represented as a key string separated by a comma from a value string, with both the key string and value string enclosed within parentheses. The parenthesized key/value pairs are comma delineated in the event text shown in FIG. 19A. As can be seen by the various key/value-pair categories, listed in the left-hand column 1902 as annotations to the event text 1904, the key/value pairs include key/value pairs generated from an event-stream-collection/event-stream-processing organization, key/value pairs generated from various third-party organizations, and custom key/value pairs generated by instrumentation introduced by a client of the event-stream-collection/event-stream-processing organization. Many of the keys of the key/value pairs generated by the stream-collection/stream-processing organization begin the prefix "wt." These key/value pairs include key/value pairs describing the web site and web-site-owner client of the stream-collecting/stream-processing entity 1906, key/value pairs related to the remote user 1908, key/value pairs related to particular subject matter accessed by the remote user 1910, and log parameters 1912 used by the event-stream-collection/event-stream-processing organization for populating various log files. In addition, the event text 1904 includes key/value pairs related to third parties, including device vendors and application-program vendors 1914, as well as key/value pairs generated by instrumentation added to web pages by the web-site-owner client of the event-stream-collection/event-stream-processing entity 1916.

FIG. 19B shows an alternative representation of events, such as the event represented textually in FIG. 19A. The alternative representation is a table or matrix representation. Each column in the table, such as column 1920, represents a particular key that may occur in the key/value pairs within events. Each row in the table, such as row 1922, represents a particular event. The event is viewed as a collection of key/value pairs, the row including values for keys associated with columns of the table. A row is generally sparse, because a particular event generally includes key/value pairs for only a relatively small subset of the many possible keys. This view or representation of events is similar to the representation of stored data entities in a relational-database table.

Consider the problem of attempting to process and understand thousands, hundreds of thousands, millions, or more events collected from large numbers of remote users accessing web sites of many different web-site owners. The event-stream-collection/event-stream-processing organization may need to categorize the incoming events in order to distill meaningful information from the events for reporting to, as one example, web-site owners who depend on the event-stream-collection/event-stream-processing organization to collect and compile information received in the stream of incoming events into reports and other types of compilations as well as results of analysis and inference. Interpretation of events and extracting useful information from events is associated with many challenges and problems, as can be appreciated from the event representations discussed above with reference to FIGS. 19A-B. One problem is the high dimensionality of the information contained in events. FIG. 19B shows only a small portion of the columns that may be present within a tabular representation of events. There may be hundreds, thousands, or more keys, or attributes, that may be present in the key/value pairs contained in a collection of events. Because of this high dimensionality, despite collecting millions of events over relatively small time frames, the data is thinly dispersed over a high dimensional event space, making it difficult to extract statistical trends correlated with the information contained in the events. There are also very large numbers of possible values for many of the keys. The values may, for example, contain many substrings added in an ad hoc fashion during instrumentation of web pages as well as substrings corresponding to myriad different types of information extractable from web page and web-page-displaying browsers. The large number of possible values for many of the key/value pairs, like the high dimensionality attendant with the number of possible keys, contributes to the relatively thin distribution of data over a very large possible event space. It is therefore difficult to derive meaningful categories or topics for events based on the relatively sparse data. Another problem is that the keys are not necessarily orthogonal, but may instead be highly correlated with one another. As a result of these correlations, or dependencies, and as a result of the relatively unplanned nature of much of the instrumentation that generates events, much of the information in a given event may be redundant or irrelevant to whatever questions are attempted to be answered by collecting information from the event. Still another issue is the fact that the event-stream-collection/event-stream-processing organization does not control the types or forms of many of the key/value pairs generated by instrumentation introduced by third parties, clients, and other entities. Even were the event-stream-collection/event-stream-processing organization to establish a rational, orthogonal, and systematic instrumentation policy, events would still end up containing many key/value pairs unconstrained by those policies.

Figure 20:
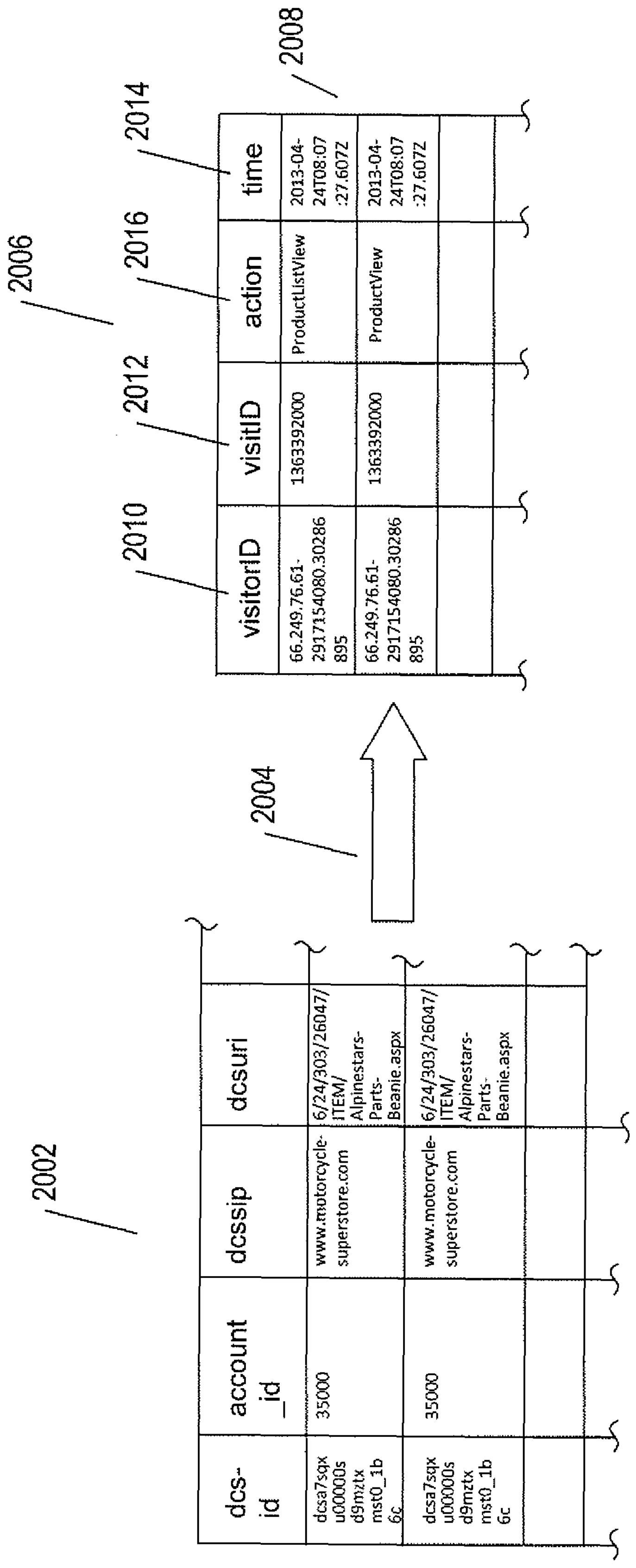
FIG. 20 illustrates an approach to event-stream processing used by the methods and systems to which the current document is directed.

FIG. 20 illustrates an approach to event-stream processing used by the methods and systems to which the current document is directed. In FIG. 20, the table representation 2002 of a collection of events, or event stream, is shown on the left-hand side of the figure. The methods and systems to which the current document is directed carry out a transformation, represented by arrow 2004, of the raw-event information to produce a lower-dimensional tabular representation 2006. The lower-dimensional tabular representation provides a small set of generally orthogonal columns/attributes that encapsulate extracted information from events. Each row in the lower-dimensional table, such as row 2008, can be considered to be a type of summary or collection of meaningful information fields extracted from a corresponding raw-data event represented by a corresponding row in the higher-dimensional, raw-data table 2002. In certain cases, columns in the lower-dimensional table 2006 are equivalent to columns in the higher-dimensional table 2002, with the exception of having a more meaningful title. For example, column 2010 represents a visitor-ID field within the event summaries. The visitor IDs contained in this column, or in the fields corresponding to the column of the rows of the lower-dimensional table, may be visitor-ID fields extracted from, or copied over from, a differently titled column in the higher-dimensional raw-data table 2002. Alternatively, the visitor ID may be selected from two or more raw-data columns based on a mapping or relatively simple process. The visitor-ID column 2012 and the time column 2014 may similarly contain data extracted from equivalent columns in the raw-data higher dimensional table 2002. However, the action column 2016 is a category or topic for the event that is determined, by the methods and systems to which the current document is directed, from a relatively large set of events collected from an even stream. The values in the action field within the event summaries in table 2006 are not copied over, or obtained by simple processing steps, from raw data contained in one or more columns of the higher-dimensional table 2002. Instead, the actions, a type of category or topic, are obtained by a combination of statistical inference and additional processing techniques based on analysis of all of the raw data, or large portions of the raw data, in a large number of raw-data events. The methods and systems used to transform raw-data events into event summaries that each includes an indication of a category or topic of the event are referred to, in certain implementations, as an "abstraction layer."

Figure 21:
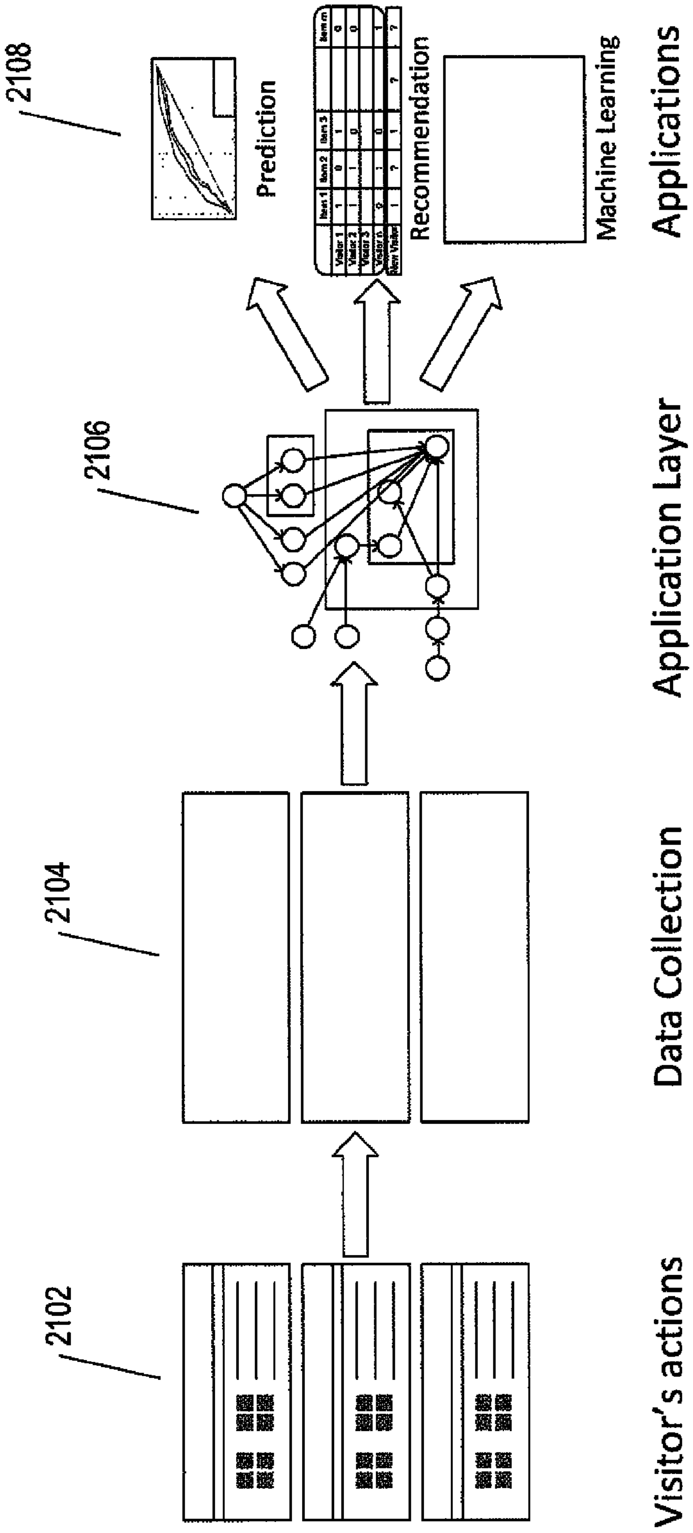
FIG. 21 illustrates the relative position of the abstraction layer within an event-collection/event-processing system.

FIG. 21 illustrates the relative position of the abstraction layer within an event-stream-collection/event-stream-processing system. The event-stream-collection/event-stream-processing system collects events derived from visitor actions 2102 that occur with respect to, and in the context of, display of web pages to remote users. Instrumentation within the web pages generates events comprising key/value pairs, as discussed above, which are transmitted to the event-collection infrastructure within the event-stream-collection/event-stream-processing system 2104. The collected events are sampled and processed in order to derive a set of topics for the events, by the abstraction layer 2106. The topics correspond to different types of actions taken by users who generate the events. In addition, once a sufficient number of events have been collected and sampled to generate the categories or topics, the abstraction layer automatically assigns a topic to each incoming event as well as selecting raw data from raw-data events for incorporation within the event summaries produced by the abstraction layer. The event summaries are then forwarded to various types of applications 2108 that process incoming event streams. These applications may, for example, predict, in real time, remote users' subsequent or upcoming actions allowing real-time modification of the web pages displayed to the remote users. Another application that processes an event stream may be used to generate recommendations to remote users based on the remote users' previous and current actions. For example, a recommendation application may infer, from a user's interaction with a commercial web site, the type of product or products a user is searching for and provide a list of such products to the user to facilitate and encourage the user's eventual purchase of a product. Yet another type of application that consumes an event stream is a machine-learning application that may infer, from the incoming event stream, a variety of different types of knowledge, including knowledge about market segments, the effectiveness of different types of web sites and marketing approaches, trends in user activities and interests, and other such information. All of the event-consuming applications shown in column 2108 of FIG. 21 exhibit much more robust and accurate results when presented with event summaries that include event topics than when provided raw-data events. When events are associated with topics and categories and when the many different types of key/value pairs within events are distilled down into a small number of useful data items, the event-consuming applications far more efficiently and effectively glean needed information from the event summaries than from raw-data events in order to carry out the various types of analyses and inferences particular to the event-consuming applications. The abstraction layer can be considered to be a process common to, or commonly needed by, many different downstream applications. Because the process is common to the many different applications, it is far more efficient for the process to be carried out by a single abstraction layer than for the process to be redundantly developed and incorporated into each of the downstream applications.

In certain implementations, in order to assign categories or topics to events, the abstraction layer employs statistical inference. A type of statistical inference that is commonly used to determine topics to which documents in a document corpus are related is next described with reference to FIGS. 22-29. This document-categorizing method is referred to as "Latent Dirichlet Allocation."

Figure 22:
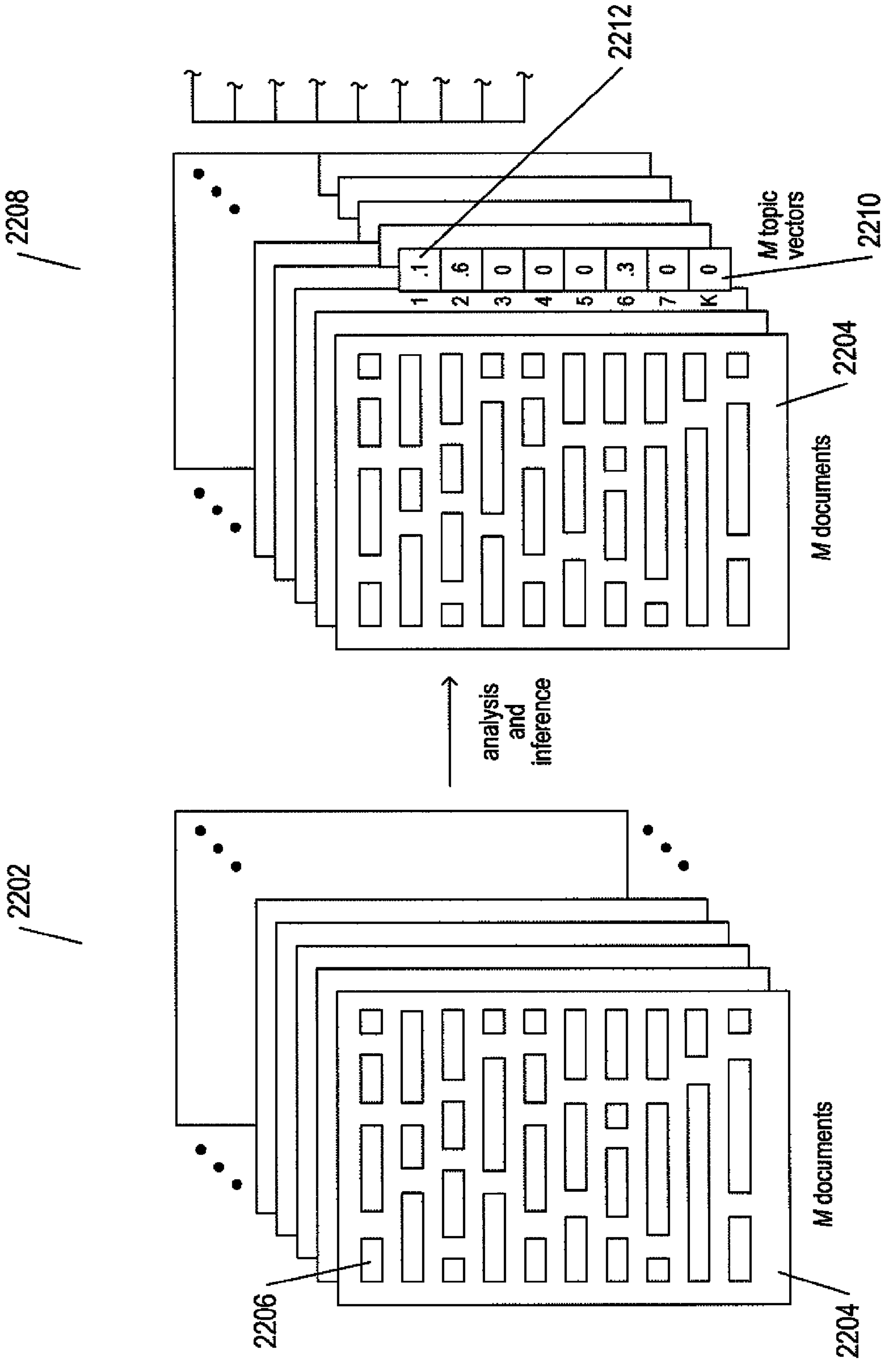
FIG. 22 illustrates document categorization.

FIG. 22 illustrates document categorization. As shown in FIG. 22, a collection of M documents 2202 is collected or received. Each of the M documents, such as the first document 2204, includes a set of words, such as the first word 2206 in document 2204. Using Latent Dirichlet Allocation ("LDA"), an analyst can decide to identify or discover K different topics to which the M documents are related and to assign a relatedness metric, or probability, that each document is related to each of the K topics. In the LDA model, each document can be related to one or more topics. In FIG. 22, the analyzed documents 2208 are shown to each be associated with a topic vector. For example, the first document 2204 is associated with a topic vector 2210 that has K elements. In the illustrated case, K=8. The value in each entry is a probability that the document is related to the topic corresponding to the element. For example, topic vector 2210 indicates that there is a 0.1 probability 2212 that the first document 2204 is related to topic 1. The values in the elements of the topic vector 2210 sum to 1.0. The analysis thus generates M different topic vectors, each topic vector associated with one of the M documents. The topics are not known beforehand. Instead, the analyst chooses the number of topics K, and the LDA method identifies the topics and generates probabilities for each document with respect to association of the document to the topics. The LDA method does not provide titles for, or semantic meanings of, the topics, but instead simply identifies subsets of the documents with common words.

Figure 23:
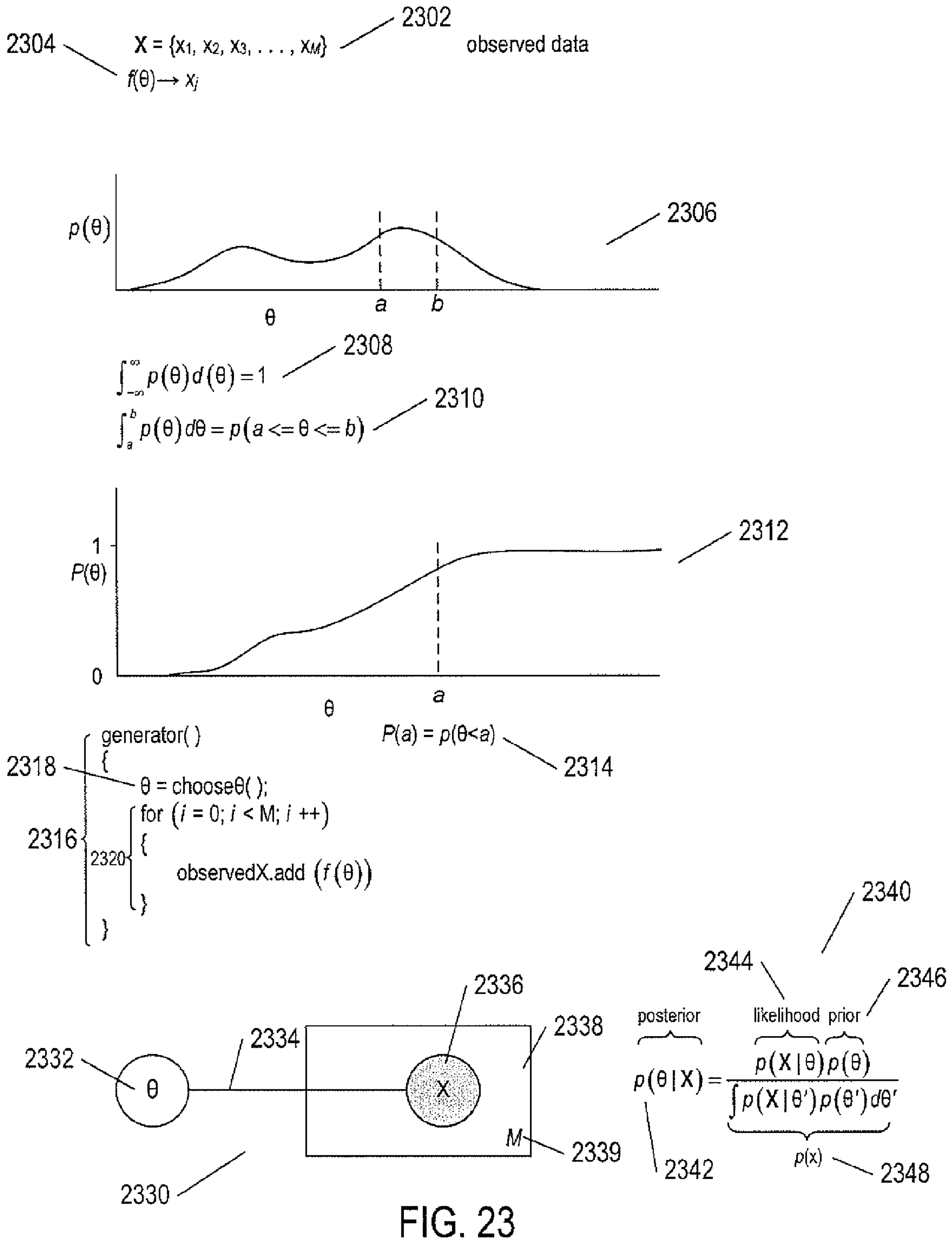
FIG. 23 illustrates a simple example of the type of inference employed by the LDA method.

FIG. 23 illustrates a simple example of the type of inference employed by the LDA method. Consider the case that each document $d_i$ in a corpus of M documents has an associated length, $x_i$, in words. A vector of all of the lengths associated with all of the documents in the set of documents X then represents a set of observed data; namely, the lengths of all the documents in a corpus of documents, as indicated by a first line 2302 in FIG. 23. Consider also the case that the lengths of the documents $x_i$ can be considered to be generated by a function paramterized by a parameter θ 2304. In the simple example illustrated in FIG. 23, θ is a single parameter. The parameter θ can have any value within a range of values. As one example, a function $f(\theta)$ may randomly select a length from a Gaussian distribution of a fixed variance and with a mean of θ. The possible values of θ may range from 50 to 150, as an example. One may use statistical inference to try to infer the value of θ from a set of observed document lengths for a corpus of M documents.

A first plot 2306 in FIG. 23 shows the probability density function p(θ) for the parameter θ. The total area under the probability-density-function curve is 1 (2308) and the probability that 0 lies between the ordered values a and b is the area underneath the probability-density-function curve between a and b (2310). Plot 2312 illustrates the probability distribution function P(θ). The value of P(α) is the probability that the value of the parameter θ is less than a (2314). Were θ selected from a set of ordered, discrete values, the function plotted in plot 2306 would be histogram-like in appearance, and referred to as a "probability mass function." The probability distribution function would also be discrete, and step-like, for a discrete θ.

FIG. 23 provides a small generator routine 2316, in pseudocode, to illustrate how, given a value of θ, the length of a set of M documents is generated. On line 2318, a particular value for θ is chosen. Then, in the for-loop of lines, the function ƒ(θ) is called, with the chosen value of θ as the parameter, to generate lengths for each of the M documents, in succession, with the lengths added to a collection of document lengths "observedX." In other words, knowing the value of 0, one could generate the lengths for a set of documents, and these lengths would correspond to the lengths observed in an actual set of documents more and more closely as the number of documents in the actual set of documents approaches infinity. Of course, the generation of the lengths in the pseudocode example does not assign a particular length to each document, but only generates a set of values that, if described by a histogram, would approximate the histogram generated from a large sample of documents whose lengths were accurately described as having been generated by the function ƒ with the chosen parameter θ. This generator function can be diagrammatically represented by diagram 2330 in FIG. 23. Selection of a particular θ parameter is indicated by the circled θ 2332. Use of this θ to generate a document length x is illustrated by line 2334 and the shaded disk including the symbol x 2336. The fact that the disk containing the symbol x 2336 occurs within the rectangle 2338, labeled with the integer M 2339 and referred to as a "plate," indicates that an x value, or length, is generated for each of M different entities, in this case documents.

A Bayesian statistical inference approach, represented by equation 2340 in FIG. 23, is used to infer the value for the parameter θ from the observed length values X for a corpus of documents. The conditional probability of a particular θ value, given the observed document lengths 2342 is referred to as the "posterior." Because the problem is to find a θ that best explains the observed document lengths, one can compute the posterior probability for a range of θ values and select the θ value with highest probability. Alternately, in many cases, a closed-form function may be obtained for the probability density function p(θ|X), and standard analytical techniques can be employed to find one or a range of θ values with maximum probability. According to Bayes' theorem, the posterior probability is equal to the conditional probability of the observed length values X, given the θ value, referred to as the likelihood 2344, multiplied by the probability of the θ value, referred to as the "prior" 2346, with the product then divided by the probability of the observed length values 2348. In many Bayesian-inference cases, a particular type of parameterized distribution is selected for the prior distribution 2346 in order to render the integration in the denominator of the expression 2340 tractable. Because the likelihood conditional probability is generally well-determined from the generator process, a prior distribution that is conjugate prior to the likelihood function is normally chosen in order that evaluation of the integral is tractable.

Figure 24A:
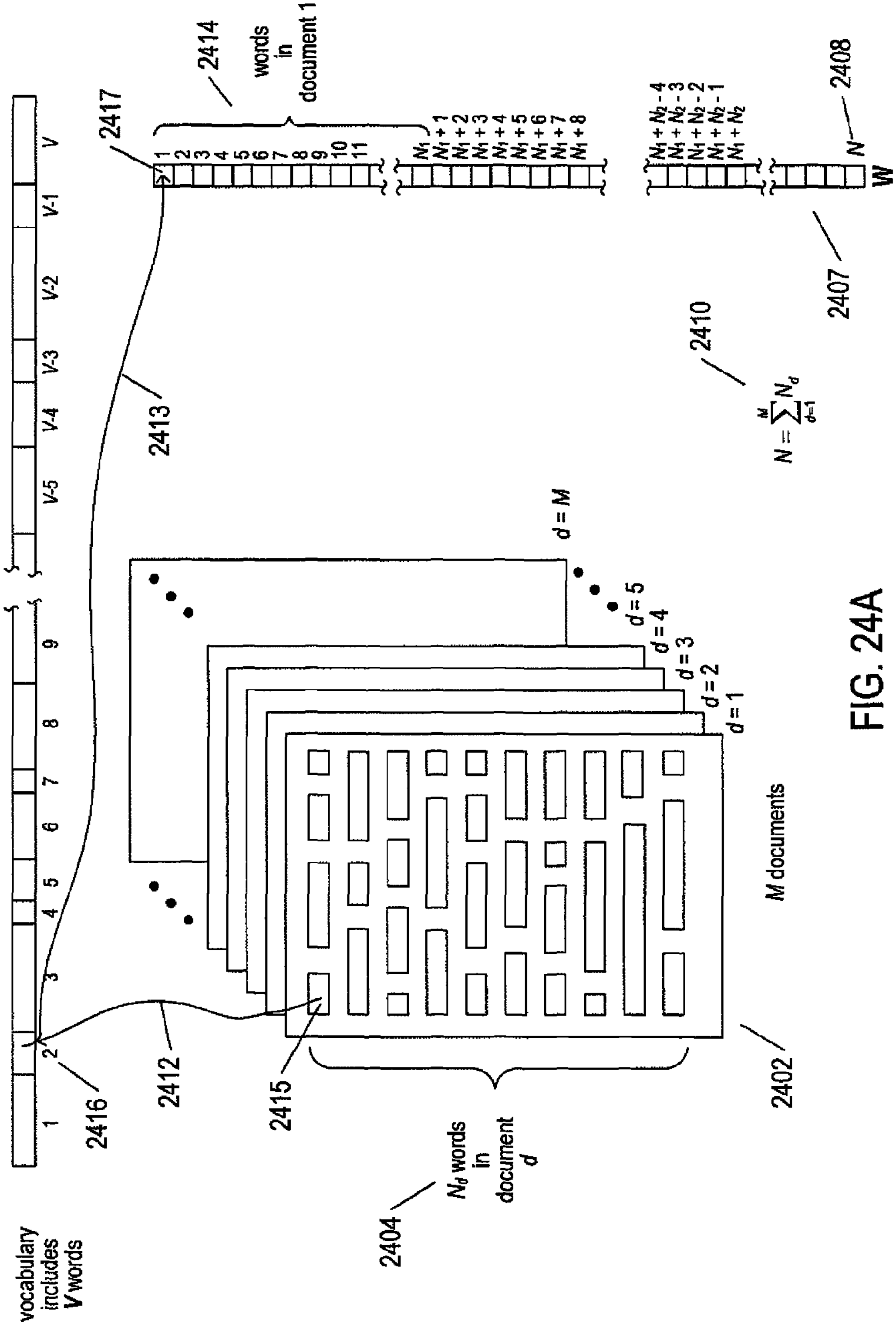
FIG. 24A-E illustrate various observed-data and derived-data components for the LDA approach to assigning topic probabilities to documents, along with nomenclature used to describe the observed data, derived data, and parameters of the observed and derived data.

FIG. 24A-E illustrate various observed-data and derived-data components for the LDA approach to assigning topic probabilities to documents, along with nomenclature used to describe the observed data, derived data, and parameters of the observed and derived data. As shown in FIG. 24A, there are M documents 2402 in a corpus of documents to be analyzed by the LDA method. There are $N_d$ words in document d 2404. Thus, each document is associated with a length, in words. The words within a document are selected from a vocabulary of words 2406 of length V. A vector W encapsulates the observed data; namely, the words that occur in each of the M documents. The vector W has a length N 2408 equal to the sum of the number of words in the M documents 2410. Each word of each document is represented by the index of the word in the vocabulary, as indicated in FIG. 24A by curved arrows 2412-2413. The identities of all the words in the first document are represented in vector W by the first $N_1$ entries in vector W 2414. For example, the first word in the first document 2415 is represented by the number 2 (2416 in FIG. 24A), the index of the word in the vocabulary, in the first element 2417 of vector W.

Figure 24B:
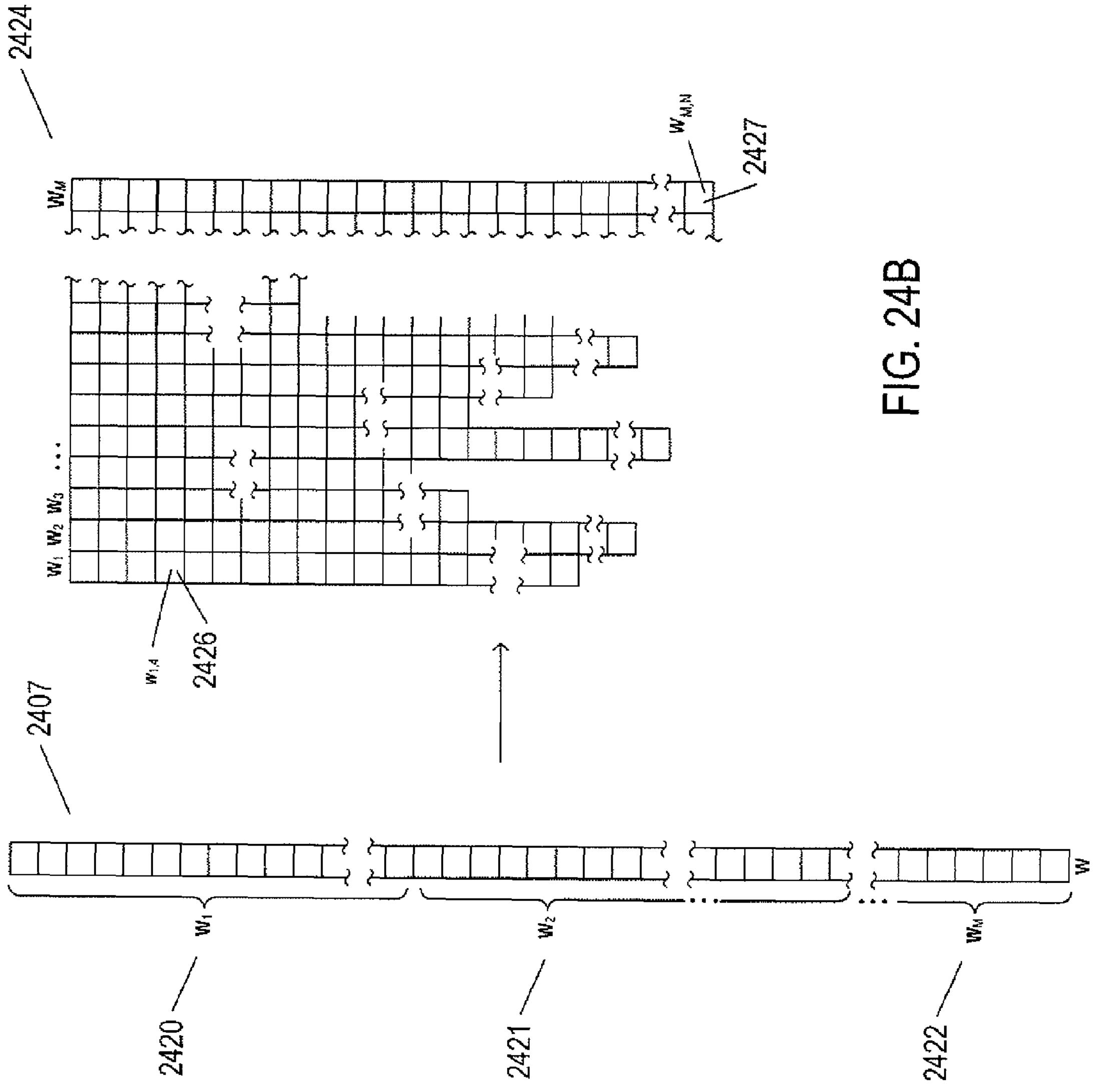

As shown in FIG. 24B, the vector W 2407 can be disassembled into a set of column-vector subsets 2420-2422, each column subset corresponding to the words in a particular document. These column subsets can then be arranged in a kind of ragged two-dimensional matrix 2424. Matrix-element notation can be used to refer to elements of this ragged matrix. For example, element 2426 is referred to as $w_{1,4}$ and element 2427 can be referred to as $W_{M,N}$.

Figure 24C:
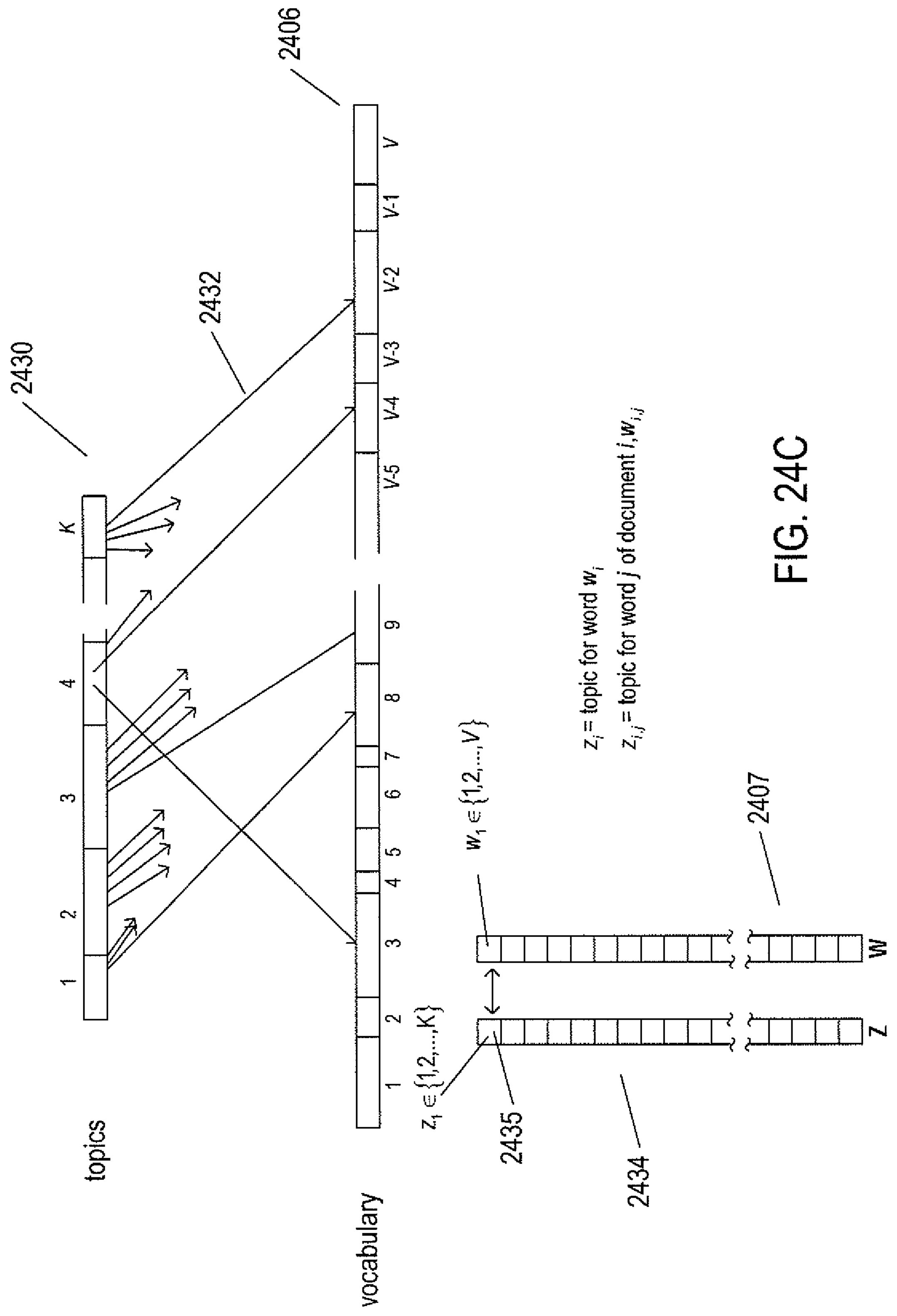

As shown in FIG. 24C, a list of K topics 2430 is determined by the LDA method 2430. Each element of this list, or vector, can be thought of as referring to all of the words in the vocabulary 2406 that belong to the topic. In other words, topics can be thought of as subsets of words of the vocabulary. The LDA process, as a result of analysis and inference, determines the mappings between topics and the words of the vocabulary, illustrated in FIG. 24C by arrows, such as arrow 2432, and generates a vector Z 2434 that represents a mapping of the words in the M documents to topics. In other words, as shown in FIG. 24C, the number in element 2435 of the vector Z 2434 is the topic assigned to the corresponding word represented by element 2436 of vector W 2407.

Figure 24D:
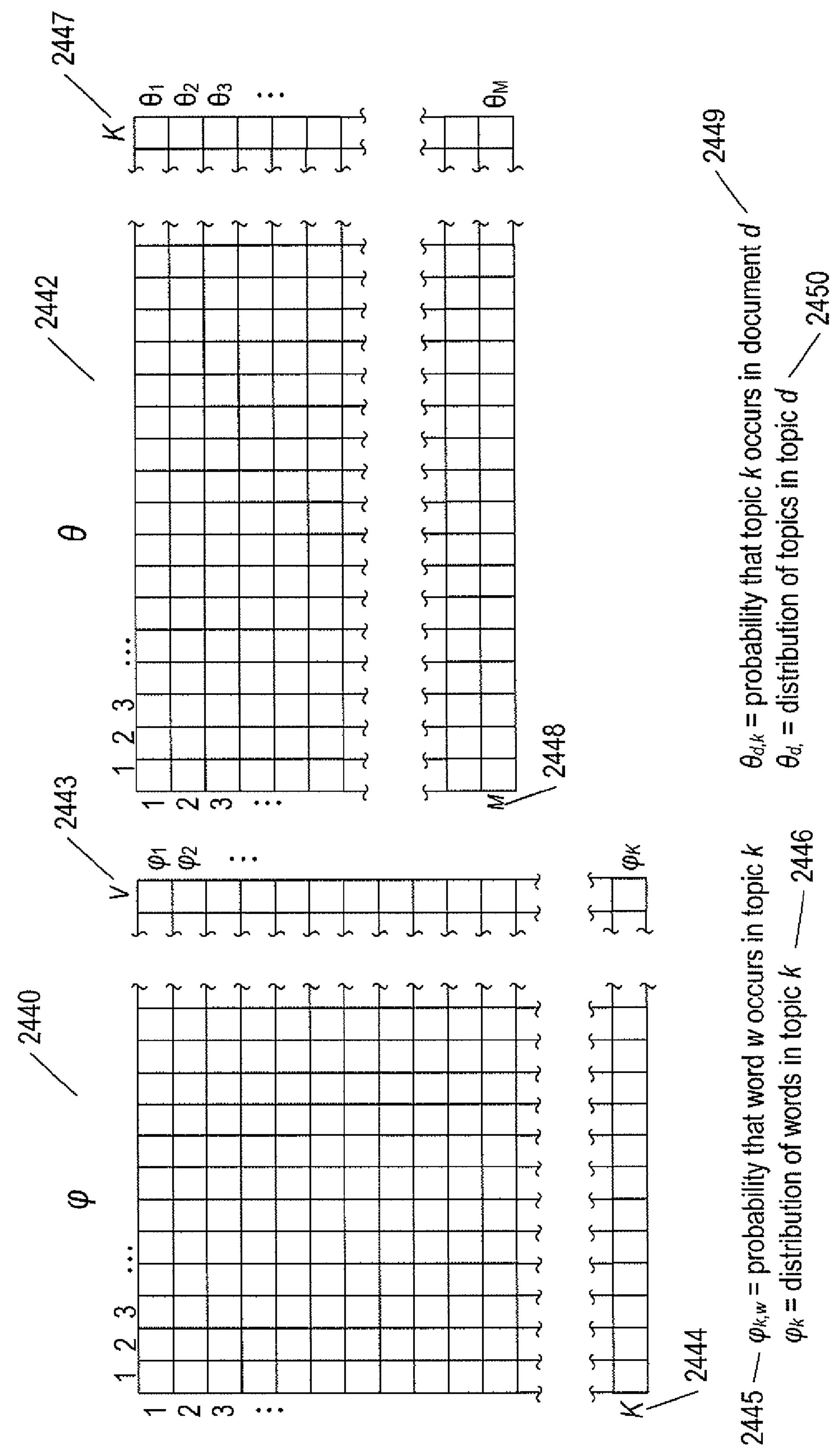

As shown in FIG. 24D, the LDA method employs a ϕ matrix 2440 and a θ matrix 2442. The rows of the ϕ matrix 2440 have V 2443 elements and there are K 2444 rows in the ϕ matrix. An element $\phi_{k,w}$ of the ϕ matrix is the probability that the word w occurs in, or is associated with, topic k 2445. A row $\phi_k$ represents the distribution of words in topic k 2446. The θ matrix 2442 has rows of length K 2447 and has M 2448 rows. An element of the θ matrix, $\theta_{d,k}$ represents the probability that topic k occurs in, or is associated with, document d 2449. A row of the θ matrix, $\theta_d$, represents the distribution of topics in document d 2450.

Figure 24E:
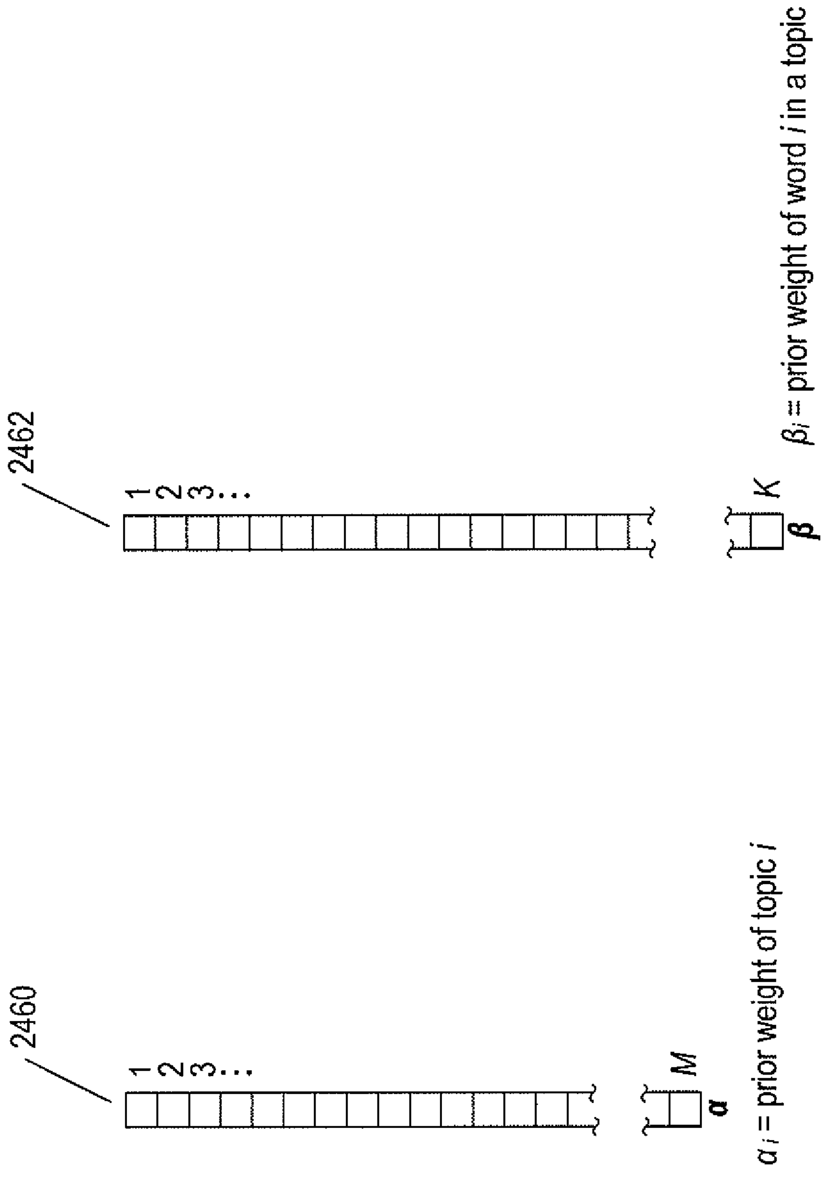

As shown in FIG. 24E, there are two vectors 2460 and 2462, referred to as "α" and "β" respectively. Vector α has M entries and vector β has K entries. These vectors contain the parameters for Dirichlet distributions that are used as the prior distributions for the distributions of words in topics and the distributions of topics in documents, respectively, represented by rows in the matrices ϕ (2440 in FIG. 24D)

and θ (2442 in FIG. 24D), respectively. In many implementations, all of the entries in the α and β vectors have a single, common value, in which case that value may be used, rather than the vector containing the values, to denote the Dirichlet parameters for the distributions represented by rows in the ϕ and θ matrices.

FIGS. 25A-B provide information about the multinomial distribution and its conjugate-prior Dirichlet distribution. Although this information is well known to those who work in automated analysis and inference, it is provided for completeness in the current document. The probability mass function for the multinomial distribution is provided by the first equation 2502 in FIG. 25A. A multinomial distribution involves k observed occurrences for each of k different events and n observations, with $p_1$ through $p_k$ representing the probabilities of observing each of the k different events. Table 2504 provides descriptions of the parameters, support, mean, and variance for the multinomial distribution. In similar, subsequent figures, other of the distributions used in the LDA process are presented in similar fashion. For example, FIG. 25B shows similar information for the Dirichlet distribution.

Figure 26:
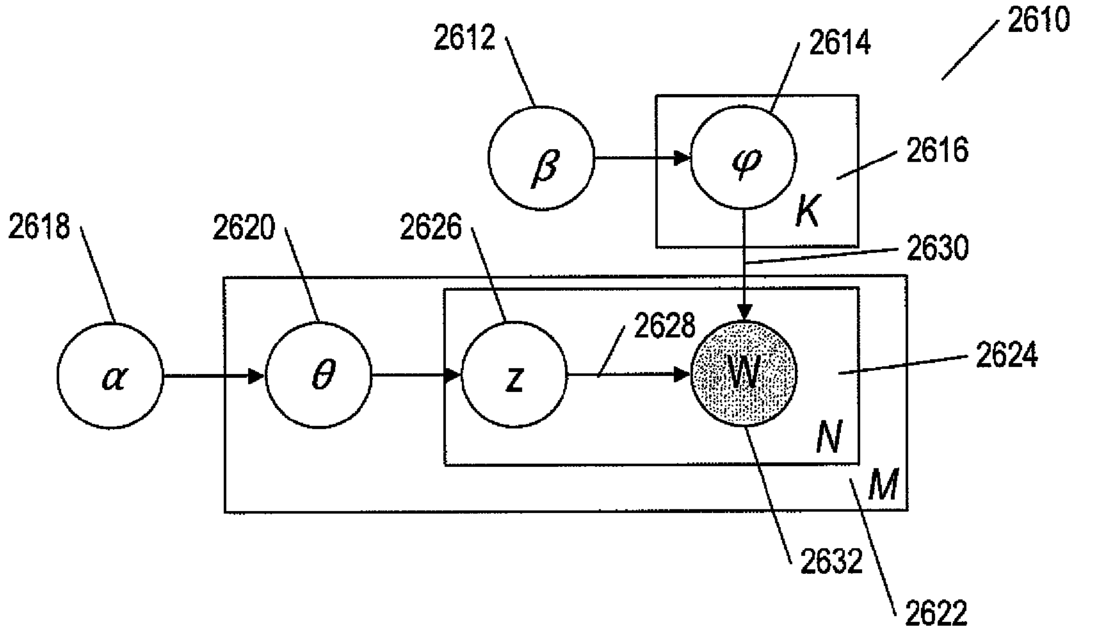
FIG. 26 shows the generator and a generator diagram for the LDA method using pseudocode and diagrammatic conventions similar to generator pseudocode 2316 and diagram 2330 of FIG. 23.

FIG. 26 shows the generator and a generator diagram for the LDA method using pseudocode and diagrammatic conventions similar to generator pseudocode 2316 and diagram 2330 of FIG. 23. As shown in lines 2602 of the generator pseudocode 2604 in FIG. 26, a Dirichlet prior distribution is used to initialize each of the rows of the B matrix. As discussed above, each row of the θ matrix represents a distribution of topics in a particular document. This is the prior for the topic distributions. Similarly, in lines 2606, each row of the ϕ matrix is initialized with a Dirichlet distribution. As discussed above, each row in the co matrix represents a distribution of words within a particular topic. In the outer for-loop of lines 2608, each document in the corpus of documents is considered. For each document, in the inner for-loop of lines 2608, a topic is selected for each word based on the distribution of topics for the document and word is then selected for inclusion in the document based on the distribution of words for the topic. Considering the diagrammatic representation of the generator 2610, the β parameter 2612 is used to generate a prior distribution 2614 of words for each topic 2616 and the α parameter 2618 is used to generate a distribution of topics 2620 for each document 2622. For each word of each document 2624, a topic 2626 is selected based on the distribution of topics for the document and the topic and a distribution of words for the topic are both used, as indicated by arrows 2628 and 2630, to select a word 2632.

FIG. 27 shows joint-probability expressions for the LDA model. Expression 2702, the first expression shown in FIG. 27, is an expression for a particular instance of the LDA model, which constitutes a particular instance of the W and Z vectors, the θ and ϕ matrices, and the α and β parameters for the Dirichlet priors. As shown in expression 2704, a joint probability that involves only Z, W, α, and β can be obtained by integrating the initial expression 2702 with respect to θ and ϕ. This lower-dimensional joint probability can be alternatively expressed, as shown in expression 2706, in teens of only word counts in the M documents, which are the observables in the problem discussed above with reference to FIG. 22. This is the joint probability that is the product of the likelihood and prior in the numerator of the fraction discussed above with reference to the Bayesian expression 2340 in FIG. 23.

FIG. 28 provides additional expressions used by the LDA method to determine topic assignments for the words in each of the M documents. The first expression 2802 in FIG. 28 is a conditional-probability posterior expression for the Bayesian analysis. As with expression 2706 in FIG. 27, the expression for the posterior is computable entirely from the number of observed words in the document corpus. A sampling technique is used to iteratively generate topic selections for each word in the document, with all of the word counts immediately adjusted based on each topic assignment, based on expression 2802. This process continues until convergence. Use of expression 2802 to select a topic for a next considered word is illustrated by the selection pseudocode 2804 in FIG. 28. In line 2806 of the selection pseudocode, a random real number in the range [0,1] is obtained from a random-number generator and stored in local variable u. An iteration variable k and an array of cumulative probabilities of length K+1 are declared on lines 2808. In the for-loop of lines 2810, probabilities are computed for each topic based on the current word counts and cumulatively added to produce a cumulative probability over the K topics in the array p. Then, in the final for-loop of lines 2812, a topic is selected as the topic for which the cumulative probability associated with topic divided by the cumulative probability for all K topics is greater than or equal to u. Equations 2814 in FIG. 28 show how new values for the ϕ and θ matrices can be computed from the current word counts. Thus, new distributions of topics within documents and words within topics can be computed following each iteration of the sampling method.

Figure 29:
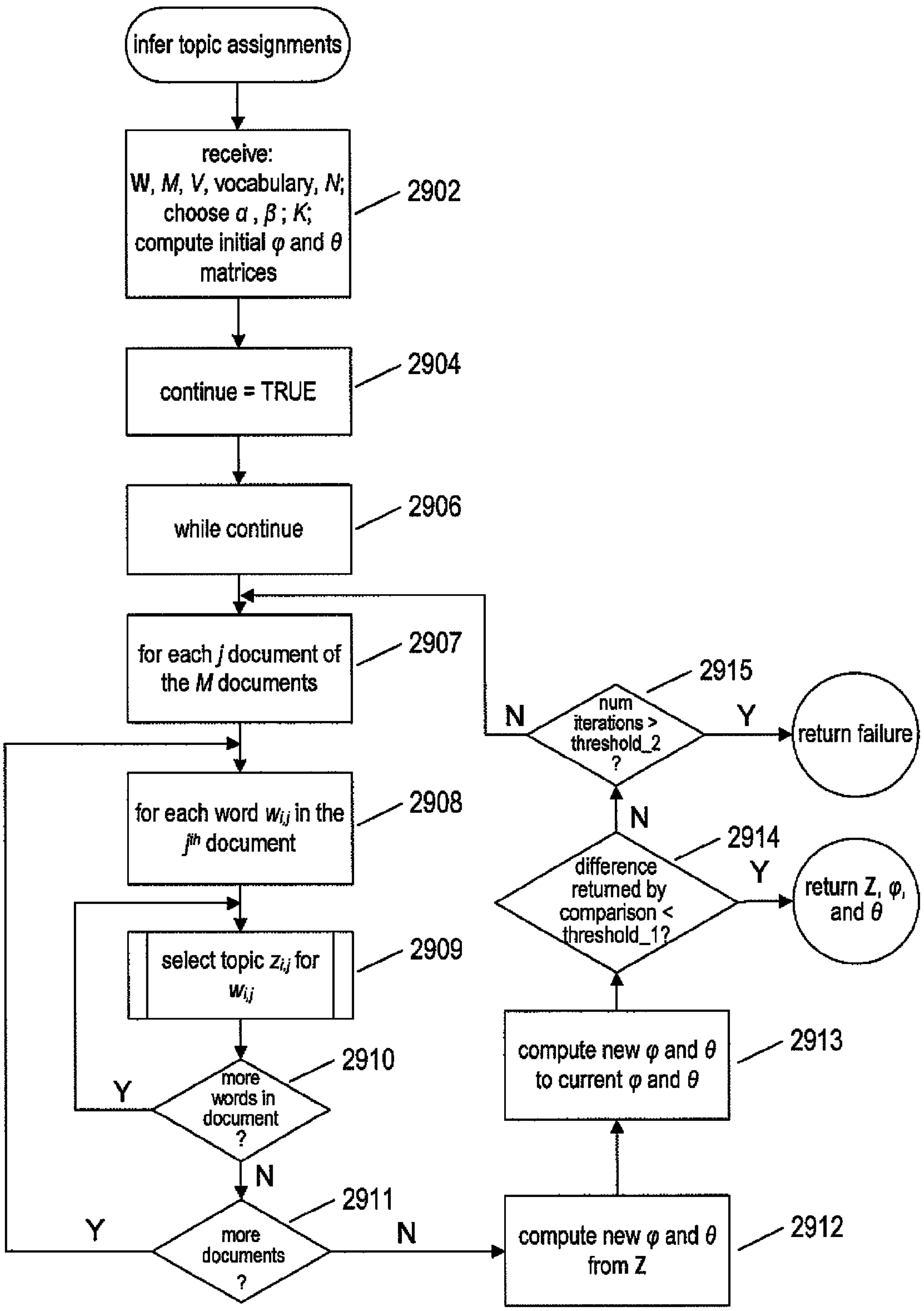
FIG. 29 provides a control-flow diagram for the LDA method for inferring topic assignments for words in each document of a corpus of documents.

FIG. 29 provides a control-flow diagram for the LDA method for inferring topic assignments for words in each document of a corpus of documents. In step 2902, the routine "infer topic assignments" receives the observed word occurrences within the corpus of documents W, the number of documents M, the vocabulary and number of words in the vocabulary V, and the total number of words in the corpus of documents N. Then, the α and β Dirichlet parameters are specified, as well as a number K of topics to identify. Finally, the ϕ and θ matrices are initialized by sampling their values from parameterized Dirichlet distributions. In step 2904, the local variable continue is set to TRUE. The while-loop of steps 2906-2915 continues until convergence is obtained or until a maximum number of iteration of the while-loop have been carried out. In the intermediate-level for-loop of steps 2907-2911, each document in the corpus of documents is considered. In the inner for-loop of steps 2908-2910, each word of the currently considered document is considered. In step 2909, a topic is selected for, and assigned to, the word according to the selection method illustrated by pseudocode 2804 in FIG. 28. Immediately after each topic assignment to a word, all of the word counts employed for calculating the conditional probability via expression 2802 in FIG. 28 are updated. Once topics have been assigned to all of the words in all of the documents, new ϕ and θ matrices are computed from the topic assignments contained in vector Z and current word counts, in step 2912. The new ϕ and θ matrices are compared to the current θ and ϕ matrices, in step 2913. When a difference returned by the comparison is less than a threshold value, as determined in step 2914, then the process has converged, and the topic assignments Z are returned, in certain implementations along with the ϕ and θ matrices. Otherwise, when the number of iterations of the while-loop have exceeded a second threshold, as determined in step 2915, failure is returned. Otherwise, control flows back to the while-loop of steps 2906-2915 for another iteration of topic assignments to document words.

Figure 30:
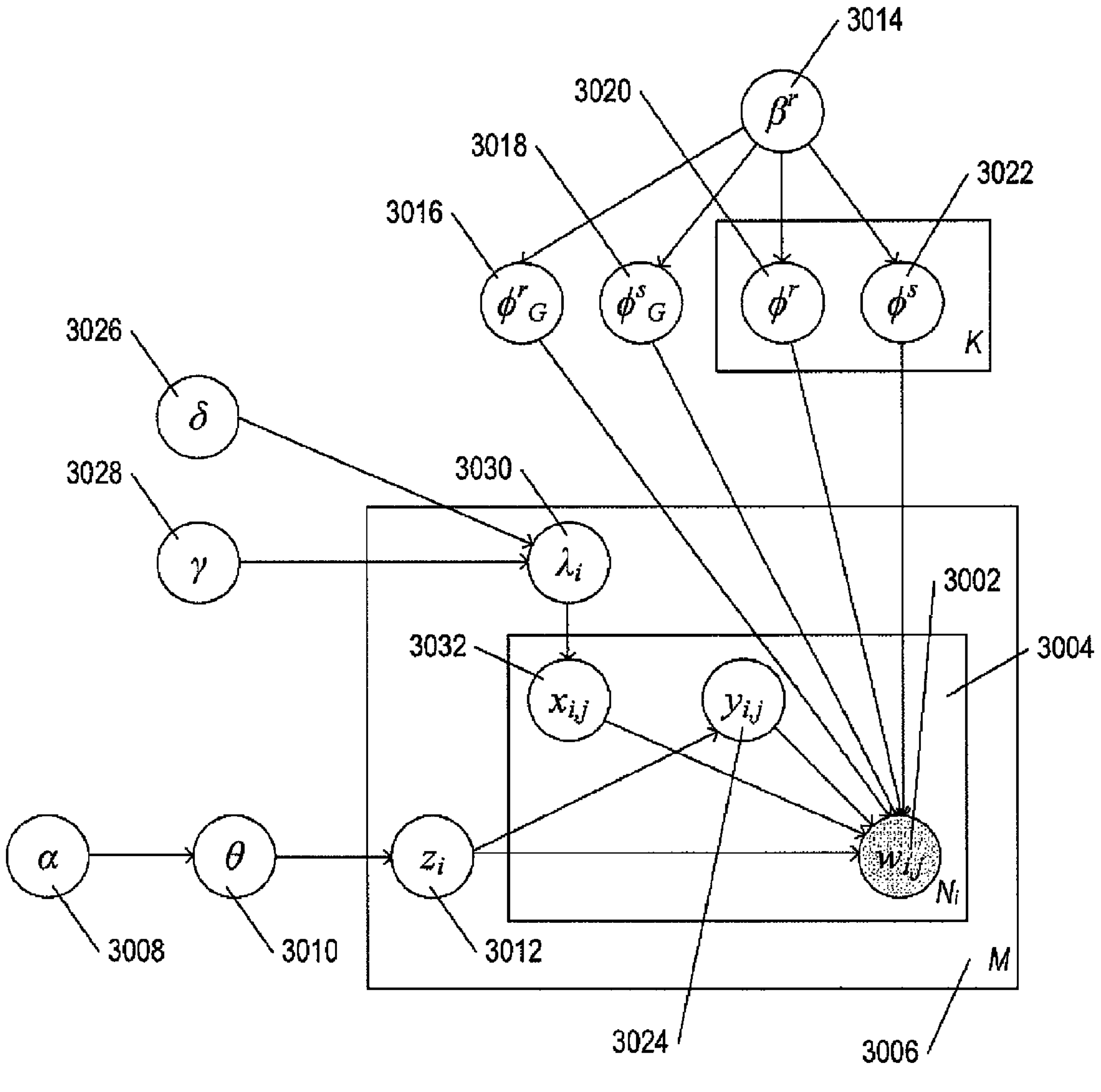
FIG. 30 provides a diagrammatic illustration of the generator for a seeded global/local-topic Latent Dirichlet Allocation ("GLT-LDA") method that is used, in the currently described method and system, for assigning topics, or categories, to events comprising key/value pairs generated by instrumentation within web pages.

FIG. 30 provides a diagrammatic illustration of the generator for a seeded global/local-topic Latent Dirichlet Allocation ("GLT-LDA") method that is used, in the currently described method and system, for assigning topics, or categories, to events comprising key/value pairs generated by instrumentation within web pages. As in the LDA method, words are selected 3002 for each word position 3004 within document of a corpus of M documents 3006. As the GLT-LDA method is applied in the currently described method and systems, words are key/value pairs and documents are events, such as the event shown in FIG. 19A and alternatively represented by a row in the table shown in FIG. 19B. In the GLT-LDA method, a parameter α 3008, as in the previously described LDA method, is used as a prior parameter for an initial θ Dirichlet distribution 3010. However, unlike in the previously described LDA method, θ is a single distribution of topics, based on which a single topic 3012 is selected for each document. Thus, the GLT-LDA method assigns a single category, or topic, to each event in a collection of events. As in the LDA method, a parameter β 3014 is used to generate initial Dirichlet distributions for words within each topic. Unlike the previously described LDA method, in which a single p matrix that includes distributions for each topic is generated, the GLT-LDA method generates a regular distribution for a global topic 3016, a distribution for seed words for the global topic 3018, a regular-word distribution for each of the K topics to be discovered 3020, and a distribution for the seed words of each of the K topics to be discovered 3022. The global-topic words distribution $\phi_G^r$ 3016 and $\phi_G^s$ 3018 are both vectors while $\phi^r$ 3020 and $\phi^s$ 3022 are both matrices, similar to the ϕ matrix (2440 in FIG. 24D) discussed above with reference to FIG. 24D. The vectors $\phi_G^r$ and $\phi_G^s$ are essentially additional rows for the $\phi^r$ and $\phi^s$ matrices. The global topic is a special topic that contains what are commonly referred to as "stop words." These are words, such as "the," "a," that contribute almost no information content to a document. As applied, by the currently described method and systems, to events, the global topic includes, or is associated with, key/value pairs that are generally disregarded when determining the topic or category to which the event belongs. A global topic is used because it is not known, a priori, which key/value pairs are uninformative with respect to learning the abstraction layer. The global topic cannot be assigned, as a topic, to any event. Instead, the global topic is used to account for the occurrence of individual stop words within a document. Seed words, or seed key/value pairs, may be assigned to topics prior to undertaking the discovery of topics and assignment of topics to events. By seeding topics with key/value pairs, an analyst steers the GLT-LDA-based method and system towards discovery of particular topics, or categories, for event messages. Seeding may result in decreased iterations of topic assignment to messages during inference and may result in the GLT-LDA method discovering desirable topics that match the intuitions of analysts. The variable $y_{i,j}$ 3024 is binary valued and chooses between regular words and seed words for a given topic. Thus, the topic selected for a particular document 3012 is used to generate one of two values for the variable $y_{i,j}$ for each word position of each document. In one implementation, when the value of $y_{i,j}$ is 1, a word is selected based on a seed-word distribution and when the value of $y_{i,j}$ is 0, a word is selected based on a regular-word distribution. Thus, the value of $y_{i,j}$ selects between the $\phi_G^r$ and $\phi_G^s$ distributions or from a distribution represented by a row in $\phi^r$ versus a row in $\phi^s$. The parameters δ 3026 and γ are parameters for a beta distribution based on which a noise rate $\lambda_i$ is selected for each document. A noise-indicating variable $x_{i,j}$ 3032 is selected from a Bernoulli distribution parameterized by the document noise rate $\lambda_i$ for each word position. The variable $x_{i,j}$ is also binary valued, and determines whether a word is selected based on a distribution for the global topic or a distribution for the non-global topics discovered by the method. In one implementation, when the value of $x_{i,j}$ is equal to 0, a word is selected from one of the two global-topic distributions 3016 and 3018 and, when the value $x_{i,j}$ is equal to 1, a word is selected from one of the non-global-topic distributions 3020 and 3022. In summary, the GLT-LDA differs from the LDA method in that: (1) GLT-LDA assigns a single topic to each document rather than a mixture of topics; (2) the GLT-LDA method considers a global topic in addition to the K discovered topics, while the LDA method considers only the K discovered topics; and (3) the GLT-LDA method allows for seeding of topics with seed words while the LDA method does not.

FIGS. 31 and 32 provide information about the Beta distribution and the Bernoulli distribution using the same illustration conventions as used for the multinomial distribution and Dirichlet distribution of FIGS. 25A-B. FIG. 33 provides pseudocode for the generator for the GLT-LDA method. On lines 3302, the B parameter for the distribution of topics is sampled from a parameterized Dirichlet distribution and a noise-rate distribution parameter is sampled from a parameterized Beta distribution. In the for-loop of lines 3304, seed words are obtained for each topic. On line 3306, a distribution 7*r* is initialized with a multinomial distribution with K entries. On lines 3308, Dirichlet distributions are used to initialize the two distributions for the global topic and the two distributions for each discovered topic. In the for-loop of lines 3310, each document is considered. On line 3312, a topic is selected for the currently considered document based on the distribution θ. On line 3314, a noise rate $\lambda_i$ is selected for the document based on the distribution λ. In the for-loop 3316, each word position within the currently considered document is assigned a word. First, on line 3318 a noise indicator $x_{i,j}$ is selected for the word position based on a Bernoulli distribution parameterized by $\lambda_i$. On line 3321, a seed-indicator $y_{i,j}$ is selected from the $z^{th}$ entry in the π distribution. When the value of $x_{i,j}$ is 0, then, on lines 3320, a word is selected from one of the discovered-topic distributions. When $y_{i,j}$ is 0, the word is selected from $\phi_{z_i}^r$ and when $y_{i,j}$ is equal to 1, the word is selected from $\phi_{z_i}^s$. Otherwise, when $x_{i,j}$ is equal to 1, then the word is selected, on lines 3322, from one of the two global-topic distributions.

Derivations for the model probability and the conditional topic-assignment probability are provided in FIGS. 34A-E. These derivations are more complex than the corresponding derivations for the LDA methods, discussed above, but produce a conditional probability for sampling topics of documents similar to the conditional probability used in the LDA method to sample topics for words in documents.

Figure 35:
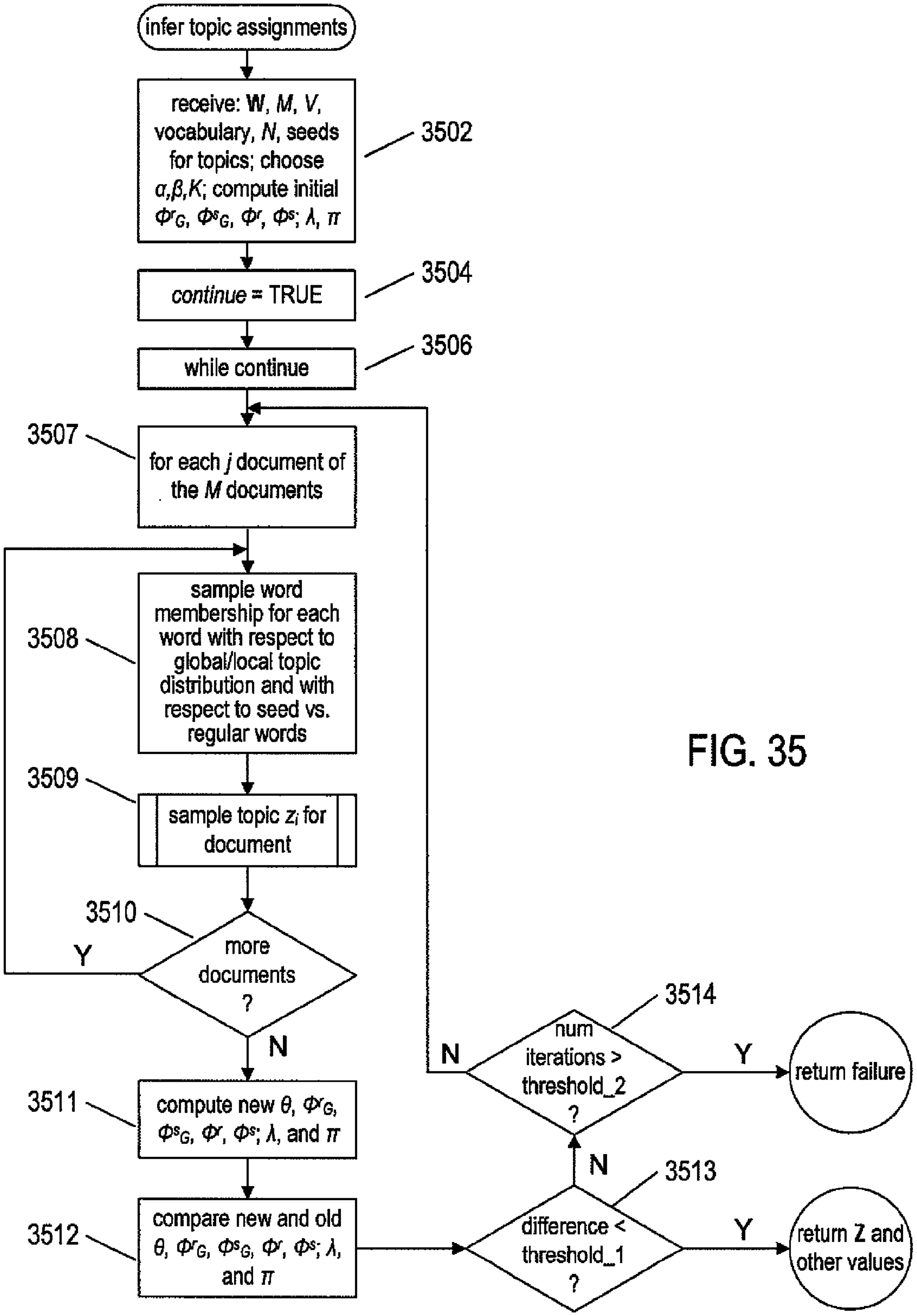
FIG. 35 provides a control-flow diagram for a routine "infer topic assignments" that represents the GLT-LDA method.

FIG. 35 provides a control-flow diagram for a routine "infer topic assignments" that represents the GLT-LDA method. In step 3502, the routine "infer topic assignments" receives the observed word counts W, the constants M, V, and N, and seed words for topics and parameters are chosen for computing initial distributions as well as the parameter K that represents the number of discovered topics. In step 3504, the local variable continue is set to TRUE. Each iteration of the while-loop of steps 3506-3514 represents an iteration of the sampling procedure that generates new topic assignments for each document. In the for-loop of steps 3507-3510, the membership of each word in the document is re-sampled, in step 3508, to determine whether the word is associated with the global topic or a local topic and whether the word is a seed word or a regular word based on the conditional-probability expressions provided above. Then, the topic for the document is re-sampled taking into account the revised word counts, in a similar fashion to the assignment of topics to words of documents in the LDA method. In step 3511, new values for the various distributions used in the GLT-LDA method are re-computed and, in step 3512, the new values are compared to the old values for these distributions. When a difference generated by the comparison is less than a threshold value, as determined in step 3512, then the vector Z is returned as the topic assignments for the documents. Otherwise, when the number of iterations has exceeded a second threshold, as determined in step 3514, then failure is returned. As in the LDA method, selection of topics for documents and updating of distributions is carried out entirely using values derived from the instantaneous word counts based on the current topic selections for documents.

Figure 36:
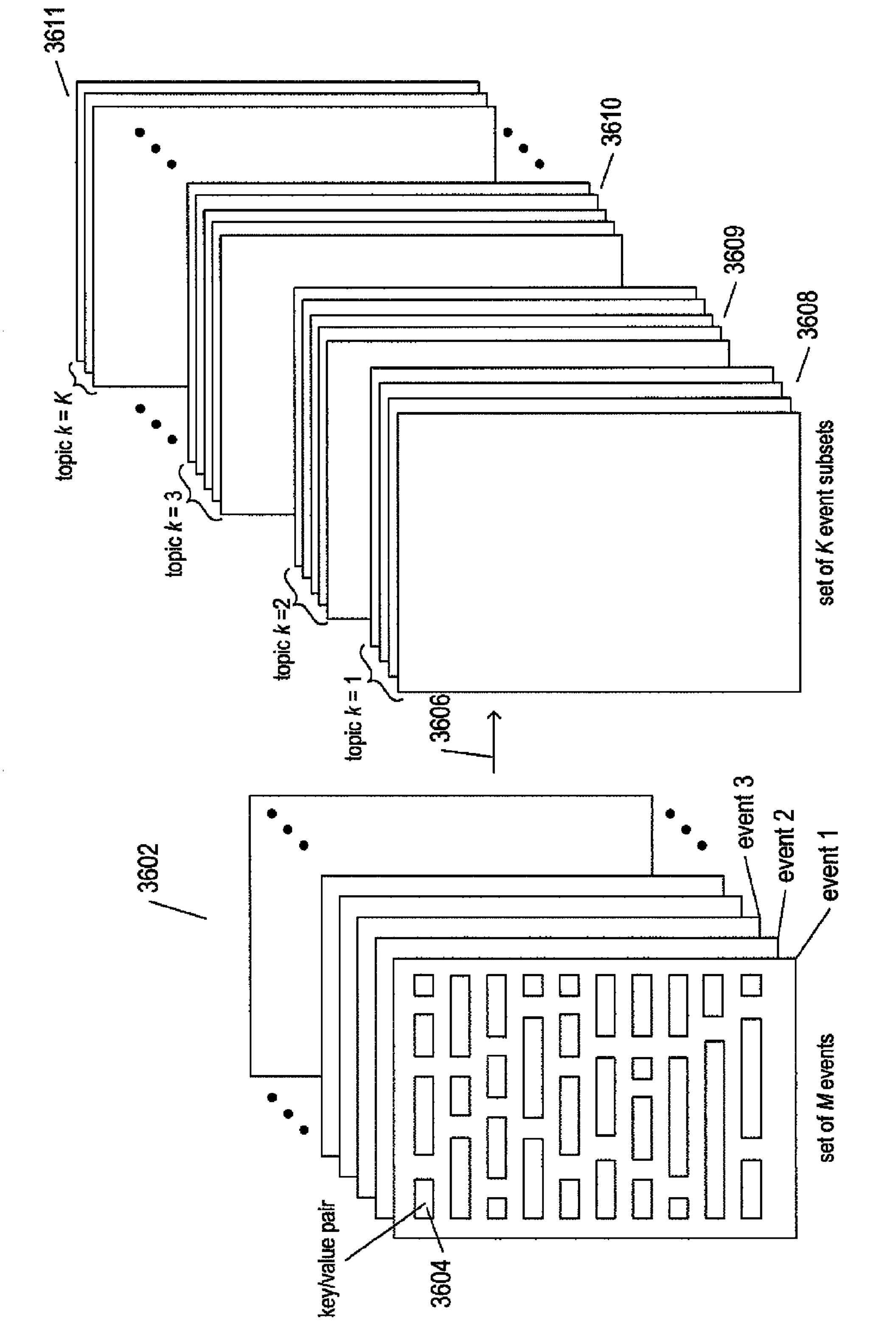
FIG. 36 illustrates use of the GLT-LDA method by currently described methods and systems for assigning topics to events that comprise key/value pairs.

FIG. 36 illustrates use of the GLT-LDA method by currently described methods and systems for assigning topics to events that comprise key/value pairs. As shown in FIG. 36, the data, or observables, is a set of M events 3602, each event including a set of key/value pairs, such as key/value pair 3604. GLT-LDA analysis, represented by arrow 3606 in FIG. 36, leads to the assignment of each of the M events 3602 to one of K topics, or event subsets 3608-3611. The topic associated with an event is a category or topic for the event that constitutes one of the columns in the tabular representation of event summaries, as discussed above with reference to FIG. 20. In one application, the topics or categories discovered by the GLT-LDA method are referred to as "action." Actions are a category of interactions of users with web sites that generate events.

Figure 37:
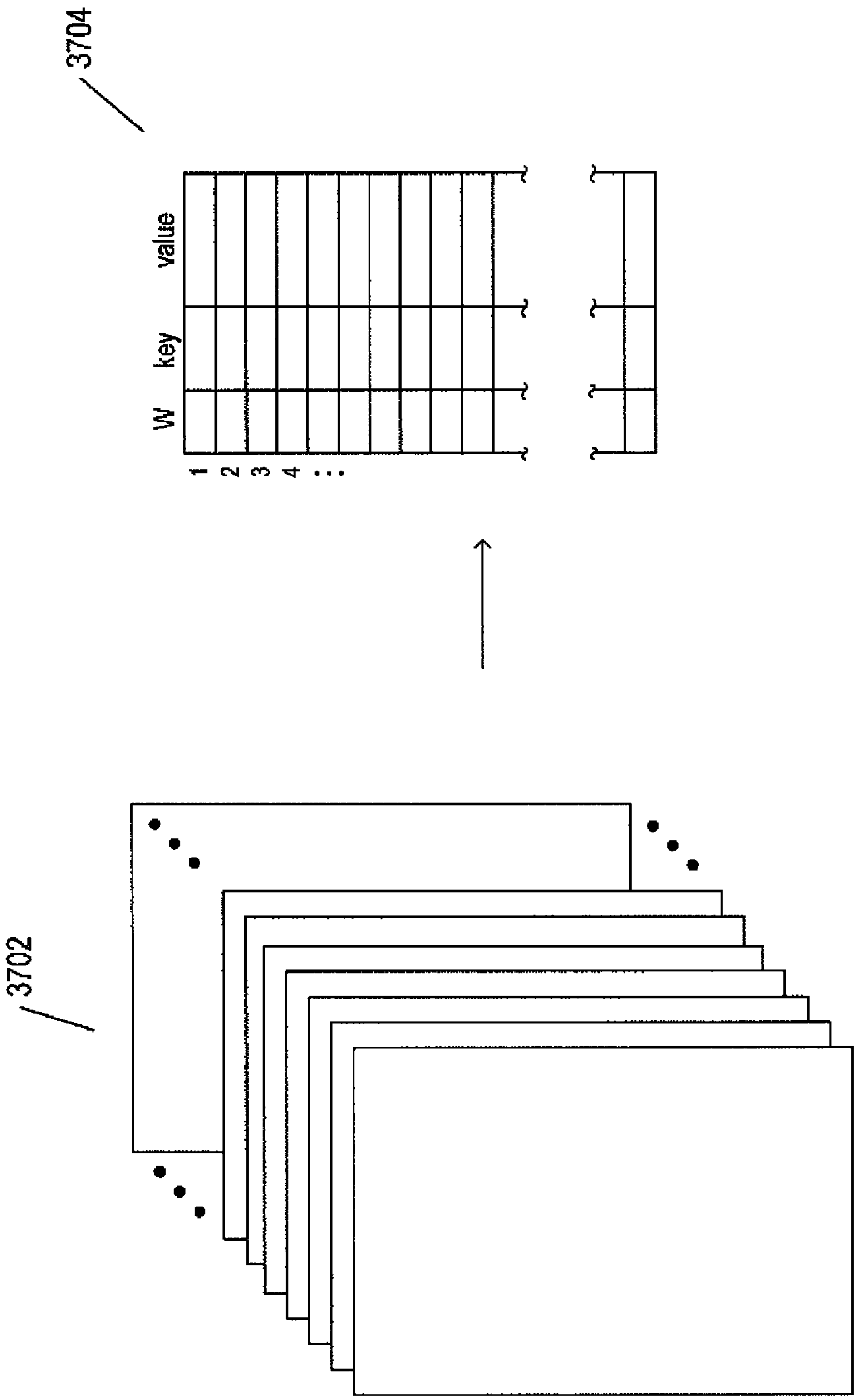
FIG. 37 illustrates how a topic assignment to a subset of events can lead to generation of a topic signature.

FIG. 37 illustrates how a topic assignment to a subset of events can lead to generation of a topic signature. In FIG. 37, a subset of events 3702 is shown on the left side of the figure, and represents one of the K event subsets shown on the right-hand side of FIG. 36. The subset of events can be analyzed to determine the frequencies of occurrence of key/value pairs within the subset of events, the probabilities of occurrence of key/value pairs within the subset of events, and other such characteristics of the subset of events. One or more of the computed characteristics can be used to rank the possible key/value pairs, or, in other words, words of the vocabulary for events, within the subset of events. This ranking is shown by table 3704 in FIG. 37. This table of weight/key/value triples is ordered by the weights, in descending order, computed for the key/value pairs. Each weight may, for example, be related to the probability of occurrence of the corresponding key/value pair within the subset of events. Alternatively, the weight may be related to the observed frequency of occurrence of the corresponding key/value pair within the subset of events. In yet alternative implementations, the weight may include considerations of the probability of the corresponding key/value pair being a seed word for the topic assigned to the subset of events, the probability of the corresponding key/value pair being a regular word for the topic assigned to the subset of events, the probability of the corresponding key/value pair being a seed word for the global topic, and the probability of the corresponding key/value pair being a regular word for the global topic. In certain implementations, only key/value pairs with weights greater than a threshold value may be included in a topic signature, while, in other implementations, a topic signature includes weights for each key/value pair of the vocabulary.

Figure 38:
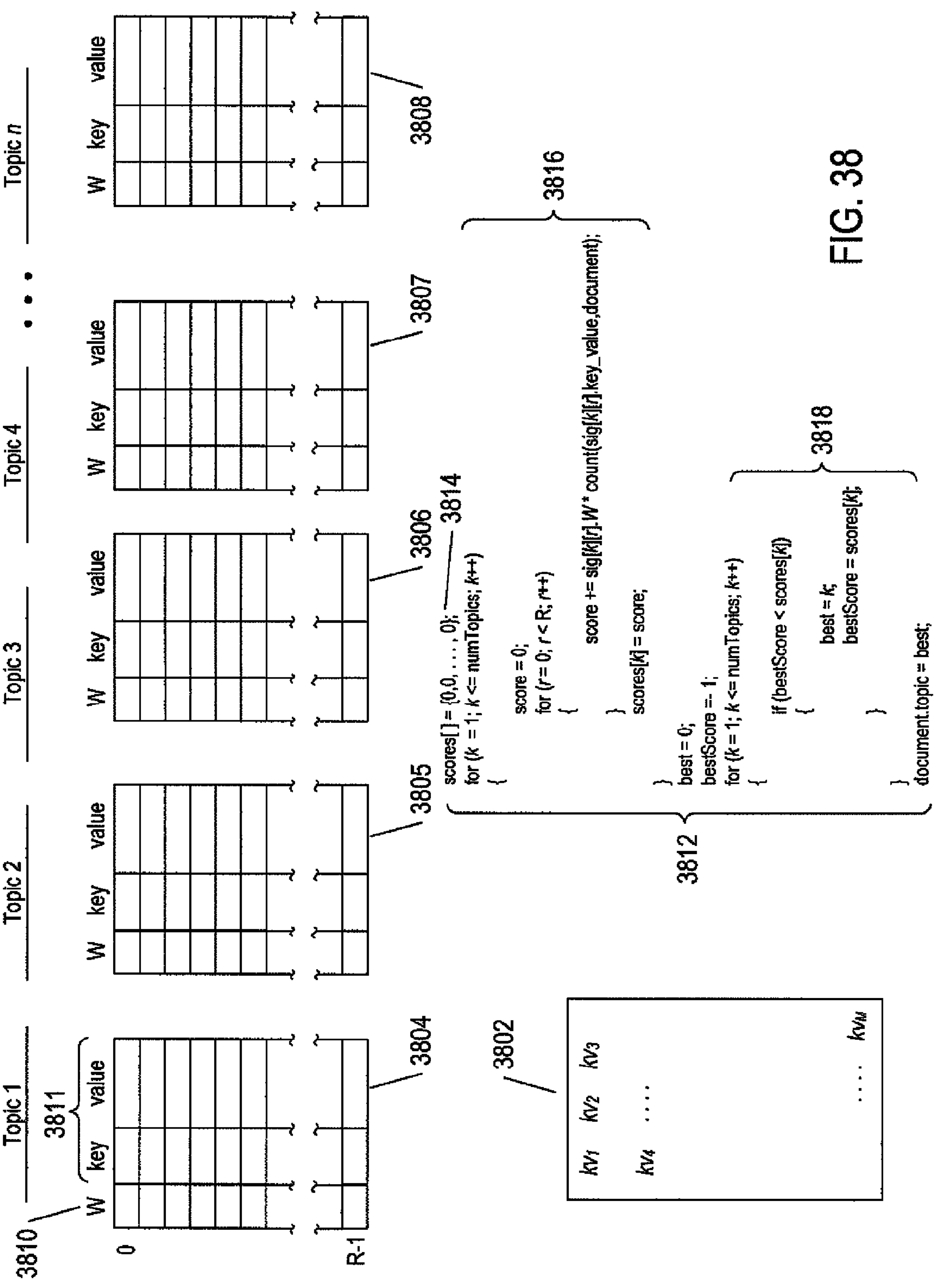
FIG. 38 illustrates how topic signatures can be used to assign a topic to a newly received event.

FIG. 38 illustrates how topic signatures can be used to assign a topic to a newly received event. The newly received event 3802 comprises a set of key/value pairs. GLT-LDA analysis on a set of previously received, similar events has led to the discovery of n topics and generation of a topic signature for each of the n topics 3804-3808. As discussed above, each topic signature includes a column of weights 3810 and a column of key/value pairs 3811. In the current example, each topic signature includes R entries. Pseudocode 3812 illustrates assignment of a topic to the newly received event 3802. On line 3814, an array of scores is initialized to 0. In the for-loop 3816, a score is computed for every topic for the newly received event 3802 and stored in the array scores. The score for topic k is computed as a sum of weighted counts, within the received event, for the R key/value pairs in the topic signature sig[k] for topic k. Then, in for-loop 3818, the top score and corresponding topic is selected from the array scores. Thus, GLT-LDA analysis of a set of events leads to a determination of a number of topics, and analysis of the key/value-pair occurrence frequency, probability of occurrence, and/or other characteristics of each subset of the events associated with each topic leads to a topic signature for the topic. These topic signatures can then be used to score an incoming event with respect to each topic and select, as the topic to assign to the incoming event, the topic with the highest computed score.

Figure 39:
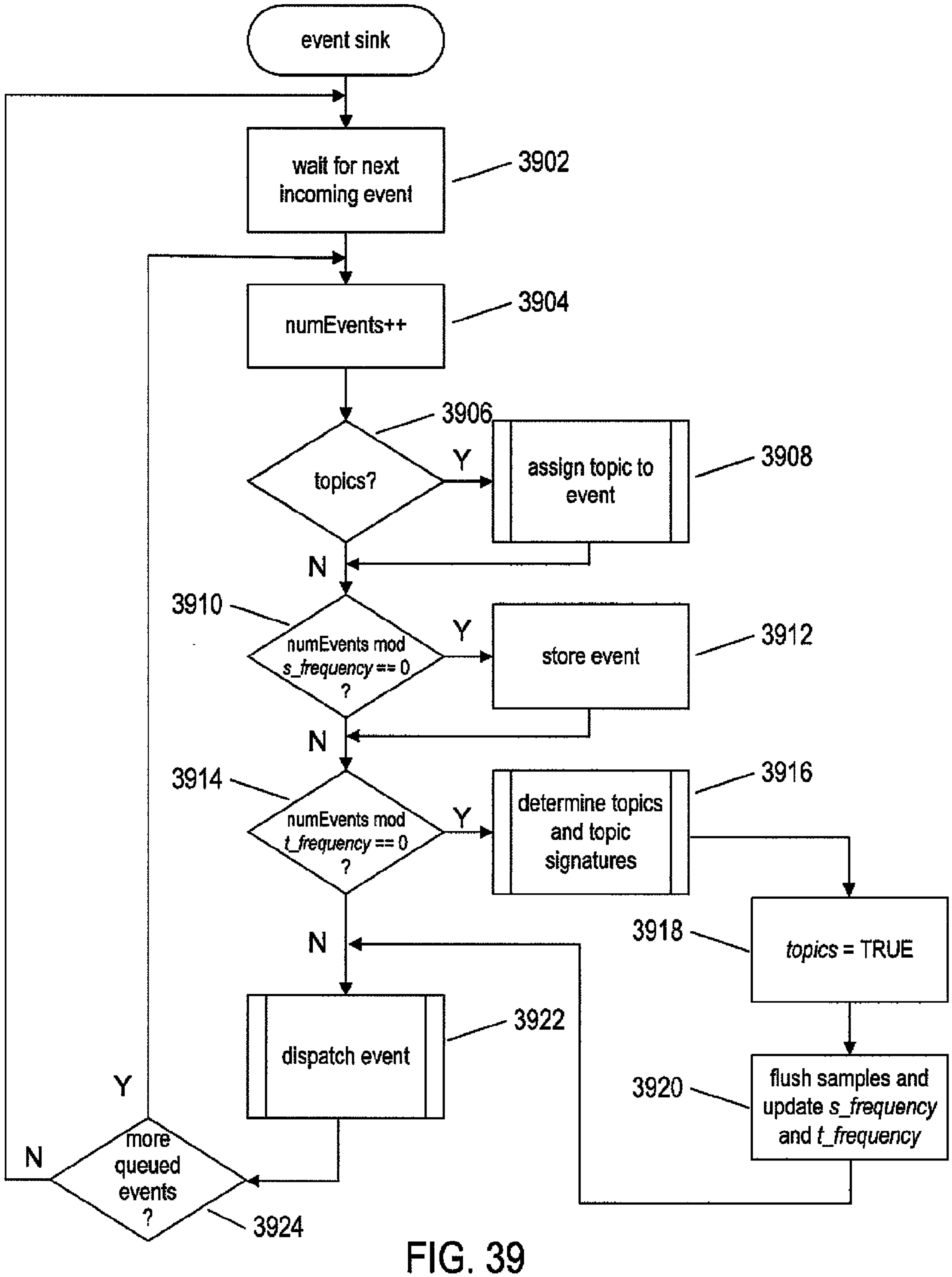
FIG. 39 provides a control-flow diagram for the topic-assigning portion of an abstraction layer.

FIG. 39 provides a control-flow diagram for the topic-assigning portion of an abstraction layer. In step 3902, the routine "event sink" waits for a next incoming event. When a next event is received, then, in step 3904, a counter is incremented. When the Boolean variable topics is TRUE, as determined in step 3906, then topics and topic signatures have been generated for the event stream, as discussed above with reference to FIGS. 30-38. In this case, the above-discussed methods are used to assign a topic to the incoming event in step 3908. When the current value of the counter indicates that the currently received event falls within a sampling frequency, as determined in step 3910, then the event is stored, in step 3912, for subsequent GLT-LDA analysis. When the current value of the counter indicates that the event falls within an analysis frequency, as determined in step 3914, then, in step 3916, GLT-LDA analysis is employed on the collection of stored events in order to generate topics and topic signatures for the event stream. The variable topics is set to TRUE following the analysis, in step 3918, and the stored samples are flushed from storage in step 3920 to prepare for gathering a new collection of events for a subsequent GLT-LDA analysis. In addition, in step 3920, the routine "event sink" may update the values of s_frequency and t_frequency. For example, the routine "event sink" may initially more frequently sample the event stream and more frequently carry out GLT-LDA analysis of the collected sample earlier, but then lower the sampling rate and analysis rate when the topics and topic signatures stabilize, over time. However, after significant instabilities in topics and topic signatures, the sampling and analysis rates may again be increased. Finally, in step 3922, the received event is dispatched to one of many possible event-consuming entities, including event storage, event-summarization portions of an abstraction layer, and other event-consuming components of an event-stream-collection and event-stream-processing system. When more events have been received and queued since execution of step 3904, as determined in step 3924, the control flows back to step 3904.

Otherwise, control flows back to step 3902 where the routine "event sink" waits for a next incoming event.

The topic-discovery and topic-assignment components of an abstraction layer may be distributed in order to spread the computational load over multiple computer systems. In certain implementations, the GLT-LDA method is itself distributed, by decomposing the analysis problem. In alternative implementations, multiple local abstraction layers discover topic and topic signatures for sample events selected from the event stream they receive, and then collaborate to merge the local topics and topic signatures into a global set of event topics and corresponding topic signatures.

Although the present invention has been described in terms of particular embodiments, it is not intended that the invention be limited to these embodiments. Modifications within the spirit of the invention will be apparent to those skilled in the art. For example, any of many different implementations of the GLT-LDA portion of an abstraction layer, as well as the entire abstraction layer, can be obtained by varying any of many different design and implementation parameters, including hardware platforms, operating systems, virtualization layers, programming languages, control structures, data structures, and other such design and implementation parameters. While the GLT-LDA method has many advantages for event-stream analysis, many other LDA-based analysis methods may be used, in place of GLT-LDA, in order to discover topics for events and assign topics to events. A variety of different types of parameterized distributions may be employed for the priors to generate conjugate postulate distributions.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An event-categorizing subsystem within an event-collection-and-event-processing system that includes one or more computer systems, each of the one or more computers having one or more processors, one or more memories, and one or more mass-storage devices, the event-categorizing subsystem executing operations to:

receive a stream of events, each event comprising a set of key/value pairs, the stream of events stored in one or more memories and/or mass-storage devices;

apply a seeded global/local-topic Latent Dirichlet Allocation analysis to a subset of events of the stream of events in order to assign each event of the subset of events to one of K different topics, where K is an integer value greater than 1;

generate K topic signatures, each topic signature of the K topic signatures corresponding to a topic of the K different topics and being generated using the subset of events assigned to the topic; and for each subsequently received event, computing a set of scores for the received event, each score in the set of scores being generated using a topic signature of the K topic signatures, assigning the received event to a topic based on the computed set of scores, storing, in one of the one or more memories, an indication of the topic to which the event is assigned, and forwarding the event, including the indication of the topic to which the event is assigned, to an event-processing subsystem.

2. An event-collection-and-event-processing system comprising:

one or more computer systems, each having one or more processors, one or more memories, and one or more mass-storage devices;

an event-collection subsystem, operating within one or more of the one or more computer systems, which:

receives encoded data from one or more browser applications, executing on one or more remote user computers, the encoded data event generated by instrumentation within one or more instrumented web pages processed and rendered for display by the one or more browser applications;

processes the received encoded data to produce a set of initially processed events, each of the set of initially processed events having an initial number of data entities; and stores the set of initially processed events in one or more of the one or more memories;

an abstraction layer, operating within one or more of the one or more computer systems, that:

receives the set of initially processed events from the event-collection subsystem;

further processes the set of initially processed events to generate a corresponding set of processed events, each processed event in the set of processed events having a data entity that represents a topic assignment output assigned to the processed event, the further processing including:

accessing a set of current distributions, the set of current distributions including:

a regular-word distribution associated with a global topic;

a seed-word distribution associated with the global topic;

for each of a set of topics, a regular-word distribution associated with the topic; and for each of the set of topics, a seed-word distribution associated with the topic, the seed-word distribution associated with the topic including, for each seed word a plurality of seed words, a quantity indicating a number of observations where the seed word was included in an event and was associated with the topic;

performing a set of iteration operations that include:

for each word of a plurality of words in the set of initially processed events:

determining, based on the set of current distributions, whether the word corresponds to a regular word or a seed word;

determining, based on the set of current distributions, whether the word corresponds to a global topic or a discovered topic; and updating the set of current distributions based on, for each word of the plurality of words, the determination as to whether the word corresponds to a regular word or a seed word and the determination as to whether the word corresponds to a global topic or a discovered topic; and based on one or more iterations of the set of iteration operations, identifying, for each initially processed event in the set of initially processed events, the topic-assignment output to be represented in a processed event in the set of processed events corresponding to the initially processed event, and an event-consuming application, operating within one or more of the one or more computer systems, that receives the topic-assignment outputs of the set of initially processed events from the abstraction layer and uses the topic-assignment outputs processed events to produce one or more results.

3. The event-collection-and-event-processing system of claim 2, wherein the event-collection subsystem further includes:

a data-collection system that receives encoded data from the remote user computers and packages the received encoded data into event messages;

a consolidation system that receives event messages from the data-collection system and consolidates the event messages from the data-collection system with other event messages received from one or more other data-collection systems in temporary storage; and a processing center to which the consolidation system forwards sets of event messages, the processing center including the abstraction layer and a portion of the event-collection-and-event-processing system that initially processes event messages to produce initially processed events from the event messages forwarded by the consolidation system, initial processing including one or more of:

adding derived and calculated data to the event messages;

aggregating and coalescing individual event messages into higher-level messages;

removing data from the event messages; and filtering event messages for output to the event-consuming application.

4. The event-collection-and-event-processing system of claim 2, wherein the further processing includes using a seeded global/local-topic Latent Dirichlet Allocation analysis method.

5. The event-collection-and-event-processing system of claim 2, wherein a word of the plurality of words in the event comprises a key/value pair.

6. The event-collection-and-event-processing system of claim 2, wherein the abstraction layer further:

identifies a subset of the set of initially processed events, each initially processed event in the subset being associated with a topic-assignment output that indicates that the initially processed event is assigned to a particular topic;

determines one or more characteristics of the subset that indicate, for each key/value pair of a set of key/value pairs:

a frequency of occurrence of the key/value pair within the subset; or a probability of occurrence of the key/value pair within the subset;

ranks the set of key/value pairs according to a weight computed for each of the set of key/value pairs based on the one or more characteristics; and stores weight/key/value triples for the subset in one or more memories and mass-storage devices.

7. The event-collection-and-event-processing system of claim 6, wherein the abstraction layer generates a corresponding processed event having a data entity that represents a topic assigned to the event by the abstraction layer by:

constructing a processed event by one or more of:

including one or more data entities from the initially processed event in the processed event, and adding one or more new data entities to the processed event;

assigning the processed event to an event topic; and adding an indication of the event topic to the processed event.

8. The event-collection-and-event-processing system of claim 2, wherein identifying the topic-assignment output for the initially processed event comprises:

for each event-topic signature computed for each event topic, identifying one or more weights, each weight of the one or more weights corresponding to a word of the plurality of words in the initially processed event and being identified using the event-topic signature; and computing a score based on the one or more weights;

assigning the processed event to an event topic corresponding to the event-topic signature corresponding to a largest computed score.

9. The event-collection-and-event-processing system of claim 2, wherein the further processing further includes:

determining, after the updating the set of current distributions, whether another iteration is to be performed;

redefining, in response to determining that another iteration is to be performed, the set of current distributions to be the updated set of distributions and repeating the set of iteration operations; and wherein the topic-assignment output is identified in response to not determining that another iteration is to be performed, the topic-assignment output being based on the determination as to whether the word corresponds to a regular word or a seed word and the determination as to whether the word corresponds to a global topic or a discovered topic.

10. The event-collection-and-event-processing system of claim 2, wherein the further processing further includes:

for each iteration of at least one iteration:

determining, after a most recent updating the set of current distributions, that another iteration is to be performed; and redefining, in response to determining that another iteration is to be performed, the set of current distributions to be the updated set of distributions and repeating the set of iteration operations; and determining, after a most recent updating the set of current distributions, that another iteration is not to be performed; and wherein the topic-assignment output is identified in response to determining that another iteration is not to be performed, the topic-assignment output being based on the determination as to whether the word corresponds to a regular word or a seed word and the determination as to whether the word corresponds to a global topic or a discovered topic.

11. The event-collection-and-event-processing system of claim 10, wherein the set of iteration operations include:

generating a difference metric that represents a degree of difference between the set of current distributions and the updated set of distributions, wherein determining that another iteration is to be performed includes determining that the difference metric exceeds a predefined difference-metric threshold, wherein determining whether another iteration is to be performed includes:

determining that another iteration is to be performed when the difference metric exceeds a predefined difference-metric threshold and when an iteration count is below an iteration-count threshold; and determining that another iteration is not to be performed when the difference metric does not exceed the predefined difference-metric threshold or when the iteration count is not below the iteration-count threshold.

12. The event-collection-and-event-processing system of claim 2, wherein the topic-assignment output includes an indication of a topic to which the initially processed event is to be defined or an error indication.

13. A method comprising:

receiving encoded data from one or more browser applications, executing on one or more remote user computers, the encoded data generated by instrumentation within one or more instrumented web pages processed and rendered for display by the one or more browser applications;

processing the received encoded data to produce a set of initially processed events, each of the set of initially processed events having an initial number of data entities; and further processing the set of initially processed events to generate a corresponding set of processed events, each processed event in the set of processed events having a data entity that represents a topic-assignment output assigned to the processed event, the further processing including:

accessing a set of current distributions, the set of current distributions including:

a regular-word distribution associated with a global topic;

a seed-word distribution associated with the global topic;

for each of a set of topics, a regular-word distribution associated with the topic; and for each of the set of topics, a seed-word distribution associated with the topic, the seed-word distribution associated with the topic including, for each seed word a plurality of seed words, a quantity indicating a number of observations where the seed word was included in an event and was associated with the topic;

performing a set of iteration operations that include:

for each word of a plurality of words in the set of initially processed events:

determining, based on the set of current distributions, whether the word corresponds to a regular word or a seed word;

determining, based on the set of current distributions, whether the word corresponds to a global topic or a discovered topic; and updating the set of current distributions based on, for each word of the plurality of words, the determination as to whether the word corresponds to a regular word or a seed word and the determination as to whether the word corresponds to a global topic or a discovered topic; and identifying, based on one or more iterations of the set of iteration operations and for each initially processed event in the set of initially processed events, the topic-assignment output to be represented in a processed event in the set of processed events corresponding to the initially processed event.

14. The method of claim 13, wherein the further processing further includes:

for each iteration of at least one iteration:

determining, after a most recent updating the set of current distributions, that another iteration is to be performed; and redefining, in response to determining that another iteration is to be performed, the set of current distributions to be the updated set of distributions and repeating the set of iteration operations; and determining, after a most recent updating the set of current distributions, that another iteration is not to be performed; and wherein the topic-assignment output is identified in response to determining that another iteration is not to be performed, the topic-assignment output being based on the determination as to whether the word corresponds to a regular word or a seed word and the determination as to whether the word corresponds to a global topic or a discovered topic.

15. The method of claim 14, wherein the set of iteration operations include:

generating a difference metric that represents a degree of difference between the set of current distributions and the updated set of distributions, wherein determining that another iteration is to be performed includes determining that the difference metric exceeds a predefined difference-metric threshold, wherein determining whether another iteration is to be performed includes:

determining that another iteration is to be performed when the difference metric exceeds a predefined difference-metric threshold and when an iteration count is below an iteration-count threshold; and determining that another iteration is not to be performed when the difference metric does not exceed the predefined difference-metric threshold or when the iteration count is not below the iteration-count threshold.

16. The method of claim 13, wherein the topic-assignment output includes an indication of a topic to which the initially processed event is to be defined or an error indication.

17. A computer-program product tangibly embodied in a non-transitory machine-readable storage medium, including instructions configured to cause one or more data processors to perform actions including:

receiving encoded data from one or more browser applications, executing on one or more remote user computers, the encoded data generated by instrumentation within one or more instrumented web pages processed and rendered for display by the one or more browser applications;

processing the received encoded data to produce a set of initially processed events, each of the set of initially processed events having an initial number of data entities; and further processing the set of initially processed events to generate a corresponding set of processed events, each processed event in the set of processed events having a data entity that represents a topic-assignment output assigned to the processed event, the further processing including:

accessing a set of current distributions, the set of current distributions including:

a regular-word distribution associated with a global topic;

a seed-word distribution associated with the global topic;

for each of a set of topics, a regular-word distribution associated with the topic; and for each of the set of topics, a seed-word distribution associated with the topic, the seed-word distribution associated with the topic including, for each seed word a plurality of seed words, a quantity indicating a number of observations where the seed word was included in an event and was associated with the topic;

performing a set of iteration operations that include:

for each word of a plurality of words in the set of initially processed events:

determining, based on the set of current distributions, whether the word corresponds to a regular word or a seed word;

determining, based on the set of current distributions, whether the word corresponds to a global topic or a discovered topic; and updating the set of current distributions based on, for each word of the plurality of words, the determination as to whether the word corresponds to a regular word or a seed word and the determination as to whether the word corresponds to a global topic or a discovered topic; and identifying based on one or more iterations of the set of iteration operations and for each initially processed event in the set of initially processed events, the topic-assignment output to be represented in a processed event in the set of processed events corresponding to the initially processed event.

18. The computer-program product of claim 17, wherein the further processing further includes:

for each iteration of at least one iteration:

determining, after a most recent updating the set of current distributions, that another iteration is to be performed; and redefining, in response to determining that another iteration is to be performed, the set of current distributions to be the updated set of distributions and repeating the set of iteration operations;

determining, after a most recent updating the set of current distributions, that another iteration is not to be performed; and wherein the topic-assignment output is identified in response to determining that another iteration is not to be performed, the topic-assignment output being based on the determination as to whether the word corresponds to a regular word or a seed word and the determination as to whether the word corresponds to a global topic or a discovered topic.

19. The computer-program product of claim 18, wherein the set of iteration operations include:

generating a difference metric that represents a degree of difference between the set of current distributions and the updated set of distributions, wherein determining that another iteration is to be performed includes determining that the difference metric exceeds a predefined difference-metric threshold, wherein determining whether another iteration is to be performed includes:

determining that another iteration is to be performed when the difference metric exceeds a predefined difference-metric threshold and when an iteration count is below an iteration-count threshold; and determining that another iteration is not to be performed when the difference metric does not exceed the predefined difference-metric threshold or when the iteration count is not below the iteration-count threshold.

20. The computer-program product of claim 17, wherein the topic-assignment output includes an indication of a topic to which the initially processed event is to be defined or an error indication.

* * * * *

UNITED STATES PATENT AND TRADEMARK OFFICE
CERTIFICATE OF CORRECTION

PATENT NO. : 9,911,143 B2
APPLICATION NO. : 14/585063
DATED : March 6, 2018
INVENTOR(S) : Ethan Dereszynski et al.

It is certified that error appears in the above-identified patent and that said Letters Patent is hereby corrected as shown below:

On the Title Page

Add item (60), --Related U.S. Application Data
Provisional application No. 61/920,965 filed on December 26, 2013--, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*